United States Patent
Lee et al.

(10) Patent No.: US 12,200,464 B2
(45) Date of Patent: Jan. 14, 2025

(54) APPARATUS AND METHOD FOR PROCESSING MULTI-CHANNEL AUDIO SIGNAL

(71) Applicant: SAMSUNG ELECTRONICS CO., LTD., Suwon-si (KR)

(72) Inventors: Tammy Lee, Suwon-si (KR); Sangchul Ko, Suwon-si (KR); Kyungrae Kim, Suwon-si (KR); Sunmin Kim, Suwon-si (KR); Jungkyu Kim, Suwon-si (KR); Woohyun Nam, Suwon-si (KR); Yoonjae Son, Suwon-si (KR); Hyunkwon Chung, Suwon-si (KR); Sunghee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 17/728,037

(22) Filed: Apr. 25, 2022

(65) Prior Publication Data

US 2022/0286799 A1 Sep. 8, 2022

Related U.S. Application Data

(63) Continuation of application No. PCT/KR2022/001314, filed on Jan. 25, 2022.

(30) Foreign Application Priority Data

Jan. 25, 2021 (KR) .................. 10-2021-0010435
Jan. 27, 2021 (KR) .................. 10-2021-0011914
(Continued)

(51) Int. Cl.
*H04S 3/00* (2006.01)
*G10L 19/008* (2013.01)

(52) U.S. Cl.
CPC ............ *H04S 3/008* (2013.01); *G10L 19/008* (2013.01); *H04S 2400/01* (2013.01); *H04S 2400/03* (2013.01)

(58) Field of Classification Search
CPC ................. H04S 3/008; H04S 2400/01; H04S 2400/03; G10L 19/008
See application file for complete search history.

(56) References Cited

U.S. PATENT DOCUMENTS 5,689,641 A  11/1997  Ludwig et al.
5,802,294 A   9/1998  Ludwig et al.
(Continued)

FOREIGN PATENT DOCUMENTS

EP  3435375 B1  3/2020
EP  3958259 A1  2/2022
(Continued)

OTHER PUBLICATIONS

Communication dated Apr. 26, 2022, issued by the International Searching Authority in counterpart International Application No. PCT/KR2022/001314 (PCT/ISA/220, 210, 237).
(Continued)

*Primary Examiner* — Andrew Sniezek
(74) *Attorney, Agent, or Firm* — Sughrue Mion, PLLC

(57) ABSTRACT

According to various embodiments of the disclosure, an audio processing apparatus includes at least one processor configured to execute one or more instructions to obtain a second audio signal down-mixed from at least one first audio signal, obtain information related to error removal for the at least one first audio signal, de-mix the at least one first audio signal from the down-mixed second audio signal, and reconstruct the at least one first audio signal by applying the information related to the error removal for the at least one first audio signal to the at least one first audio signal (Continued)

de-mixed from the second audio signal. The information related to the error removal having been generated using at least one of an original signal power of the at least one first audio signal or a second signal power of the at least one first audio signal after decoding.

21 Claims, 46 Drawing Sheets

(30) Foreign Application Priority Data

| May 28, 2021 | (KR) | ........................ 10-2021-0069531 |
| Jun. 3, 2021 | (KR) | ........................ 10-2021-0072326 |
| Oct. 20, 2021 | (KR) | ........................ 10-2021-0140579 |

(56) References Cited

U.S. PATENT DOCUMENTS

| 5,884,039 | A | 3/1999 | Ludwig et al. |
| 6,029,126 | A | 2/2000 | Malvar |
| 6,115,689 | A | 9/2000 | Malvar |
| 6,356,945 | B1 | 3/2002 | Shaw et al. |
| 6,404,776 | B1 | 6/2002 | Voois et al. |
| 6,801,604 | B2 | 10/2004 | Maes et al. |
| 6,934,679 | B2 | 8/2005 | Zhou et al. |
| 7,272,556 | B1 | 9/2007 | Aguilar et al. |
| 7,272,567 | B2 | 9/2007 | Fejzo |
| 7,308,402 | B2 | 12/2007 | Zhou et al. |
| 7,346,007 | B2 | 3/2008 | Curcio et al. |
| 7,356,082 | B1 | 4/2008 | Kuhn |
| 7,382,886 | B2 | 6/2008 | Henn et al. |
| 7,526,178 | B2 | 4/2009 | Harradine et al. |
| 7,548,853 | B2 | 6/2009 | Shmunk et al. |
| 7,668,723 | B2 | 2/2010 | Fejzo |
| 7,931,198 | B2 | 4/2011 | Hall |
| 7,974,839 | B2 | 7/2011 | Sung et al. |
| 8,014,534 | B2 | 9/2011 | Henn et al. |
| 8,032,385 | B2 | 10/2011 | Smithers et al. |
| 8,059,826 | B2 | 11/2011 | Henn et al. |
| 8,073,144 | B2 | 12/2011 | Henn et al. |
| 8,081,763 | B2 | 12/2011 | Henn et al. |
| 8,116,460 | B2 | 2/2012 | Henn et al. |
| 8,171,016 | B2 | 5/2012 | Van de Sluis et al. |
| 8,204,740 | B2 | 6/2012 | Bruhn |
| 8,218,619 | B2 | 7/2012 | Park et al. |
| 8,243,936 | B2 | 8/2012 | Henn et al. |
| 8,289,370 | B2 | 10/2012 | Civanlar et al. |
| 8,374,858 | B2 | 2/2013 | Fejzo |
| 8,375,283 | B2 | 2/2013 | Fei et al. |
| 8,386,266 | B2 | 2/2013 | Feng et al. |
| 8,386,271 | B2 | 2/2013 | Koishida et al. |
| 8,433,575 | B2 | 4/2013 | Eves et al. |
| 8,482,593 | B2 | 7/2013 | Periyannan et al. |
| 8,490,123 | B2 | 7/2013 | Bodlaender et al. |
| 8,515,083 | B2 | 8/2013 | Villemoes et al. |
| 8,515,742 | B2 | 8/2013 | Gao |
| 8,515,767 | B2 | 8/2013 | Reznik |
| 8,521,744 | B2 | 8/2013 | Yang et al. |
| 8,527,265 | B2 | 9/2013 | Reznik et al. |
| 8,560,328 | B2 | 10/2013 | Yamanashi et al. |
| 8,571,852 | B2 | 10/2013 | Bruhn |
| 8,605,911 | B2 | 12/2013 | Henn et al. |
| 8,631,060 | B2 | 1/2014 | Reznik et al. |
| 8,775,169 | B2 | 7/2014 | Gao |
| 8,824,688 | B2 | 9/2014 | Schreiner et al. |
| 8,831,932 | B2 | 9/2014 | Feng et al. |
| 9,003,558 | B1 | 4/2015 | Dorwin et al. |
| 9,037,466 | B2 | 5/2015 | Bodin et al. |
| 9,047,865 | B2 | 6/2015 | Aguilar et al. |
| 9,053,753 | B2 | 6/2015 | Wu et al. |
| 9,094,527 | B2 | 7/2015 | Setton et al. |
| 9,130,651 | B2 | 9/2015 | Tabe |
| 9,218,818 | B2 | 12/2015 | Henn et al. |
| 9,224,311 | B2 | 12/2015 | Yeh et al. |
| 9,237,211 | B2 | 1/2016 | Tabe |
| 9,241,122 | B2 | 1/2016 | Kim et al. |
| 9,258,392 | B2 | 2/2016 | Park et al. |
| 9,288,466 | B2 | 3/2016 | Kim et al. |
| 9,299,354 | B2 | 3/2016 | Takeuchi et al. |
| 9,305,602 | B2 | 4/2016 | Jang et al. |
| 9,479,886 | B2 | 10/2016 | Xiang et al. |
| 9,516,446 | B2 | 12/2016 | Xiang et al. |
| 9,576,585 | B2 | 2/2017 | Bleidt |
| 9,578,072 | B2 | 2/2017 | Walker |
| 9,621,990 | B2 | 4/2017 | Purnhagen et al. |
| 9,686,234 | B1 | 6/2017 | Dorwin |
| 9,792,919 | B2 | 10/2017 | Henn et al. |
| 9,793,244 | B2 | 10/2017 | Ganesan et al. |
| 9,799,340 | B2 | 10/2017 | Henn et al. |
| 9,799,341 | B2 | 10/2017 | Henn et al. |
| 9,812,136 | B2 | 11/2017 | Kjoerling et al. |
| 9,865,271 | B2 | 1/2018 | Henn et al. |
| 9,883,213 | B2 | 1/2018 | Roessler et al. |
| 9,977,577 | B2 | 5/2018 | Kanda et al. |
| 10,136,236 | B2 | 11/2018 | Chon et al. |
| 10,297,261 | B2 | 5/2019 | Henn et al. |
| 10,511,825 | B2 | 12/2019 | Presler |
| 10,540,982 | B2 | 1/2020 | Henn et al. |
| 10,631,063 | B2 | 4/2020 | Hines |
| 10,713,340 | B2 | 7/2020 | Levy et al. |
| 10,785,569 | B2 | 9/2020 | Baumgarte |
| 10,854,213 | B2 | 12/2020 | Fueg et al. |
| 10,902,859 | B2 | 1/2021 | Henn et al. |
| 10,992,276 | B2 | 4/2021 | Holman et al. |
| 11,188,195 | B2 | 11/2021 | Karuturi et al. |
| 2007/0054615 | A1 | 3/2007 | Marshall et al. |
| 2009/0063159 | A1 | 3/2009 | Crockett |
| 2010/0008640 | A1 | 1/2010 | Casaccia |
| 2010/0063828 | A1 | 3/2010 | Ishikawa et al. |
| 2010/0145487 | A1 | 6/2010 | Oh et al. |
| 2010/0198589 | A1 | 8/2010 | Ishikawa et al. |
| 2011/0046964 | A1 | 2/2011 | Moon et al. |
| 2011/0093492 | A1 | 4/2011 | Sull et al. |
| 2012/0060093 | A1 | 3/2012 | Lee |
| 2012/0143613 | A1 | 6/2012 | Herre et al. |
| 2013/0054253 | A1 | 2/2013 | Shirakawa et al. |
| 2013/0064377 | A1 | 3/2013 | Lee et al. |
| 2013/0259236 | A1* | 10/2013 | Chon ........................ H04S 3/00 381/1 |
| 2013/0272525 | A1 | 10/2013 | Yoo et al. |
| 2014/0310010 | A1 | 10/2014 | Seo et al. |
| 2014/0343954 | A1 | 11/2014 | Villemoes |
| 2015/0162012 | A1 | 6/2015 | Kastner et al. |
| 2017/0092280 | A1 | 3/2017 | Hirabayashi et al. |
| 2017/0339506 | A1 | 11/2017 | Chen et al. |
| 2019/0311743 | A1 | 10/2019 | Shen et al. |
| 2020/0066289 | A1 | 2/2020 | Seo et al. |
| 2020/0342886 | A1 | 10/2020 | Baumgarte |
| 2021/0104252 | A1 | 4/2021 | Villemoes et al. |
| 2021/0144505 | A1 | 5/2021 | Yoo et al. |
| 2021/0217425 | A1 | 7/2021 | Henn et al. |
| 2021/0326415 | A1 | 10/2021 | Lyske |
| 2022/0019404 | A1 | 1/2022 | Riedmiller et al. |

FOREIGN PATENT DOCUMENTS

| JP | 6051621 B2 | 12/2016 |
| KR | 10-2005-0087835 A | 8/2005 |
| KR | 10-2005-0094416 A | 9/2005 |
| KR | 10-0649299 B1 | 11/2006 |
| KR | 10-0673282 B1 | 1/2007 |
| KR | 10-0686521 B1 | 2/2007 |
| KR | 10-0788628 B1 | 12/2007 |
| KR | 10-2008-0024876 A | 3/2008 |
| KR | 10-0825191 B1 | 4/2008 |
| KR | 10-0827215 B1 | 5/2008 |
| KR | 10-0849274 B1 | 7/2008 |
| KR | 10-2009-0088454 A | 8/2009 |
| KR | 10-0910817 B1 | 8/2009 |
| KR | 10-2010-0024477 A | 3/2010 |
| KR | 10-2010-0061759 A | 6/2010 |
| KR | 10-2010-0114450 A | 10/2010 |
| KR | 10-2010-0122840 A | 11/2010 |

(56) References Cited

FOREIGN PATENT DOCUMENTS

| | | |
|---|---|---|
| KR | 10-2011-0018728 A | 2/2011 |
| KR | 10-2011-0053190 A | 5/2011 |
| KR | 10-1051252 B1 | 7/2011 |
| KR | 10-1075846 B1 | 10/2011 |
| KR | 10-1112565 B1 | 2/2012 |
| KR | 10-1116071 B1 | 2/2012 |
| KR | 10-1149956 B1 | 6/2012 |
| KR | 10-1237559 B1 | 2/2013 |
| KR | 10-2013-0029254 A | 3/2013 |
| KR | 10-1242664 B1 | 3/2013 |
| KR | 10-1253225 B1 | 4/2013 |
| KR | 10-1283771 B1 | 7/2013 |
| KR | 10-1325402 B1 | 11/2013 |
| KR | 10-1329266 B1 | 11/2013 |
| KR | 10-2013-0132886 A | 12/2013 |
| KR | 10-2014-0075825 A | 6/2014 |
| KR | 10-2014-0121399 A | 10/2014 |
| KR | 10-1473035 B1 | 12/2014 |
| KR | 10-2015-0032169 A | 3/2015 |
| KR | 10-2015-0083734 A | 7/2015 |
| KR | 20-0478147 Y1 | 9/2015 |
| KR | 10-2016-0011490 A | 2/2016 |
| KR | 10-1614160 B1 | 4/2016 |
| KR | 10-1637897 B1 | 7/2016 |
| KR | 10-2016-0112177 A | 9/2016 |
| KR | 10-1673131 B1 | 11/2016 |
| KR | 10-2017-0012229 A | 2/2017 |
| KR | 10-1717006 B1 | 3/2017 |
| KR | 10-2017-0095105 A | 8/2017 |
| KR | 10-1800382 B1 | 11/2017 |
| KR | 10-1843010 B1 | 3/2018 |
| KR | 10-1849612 B1 | 4/2018 |
| KR | 10-2018-0071418 A | 6/2018 |
| KR | 10-1861941 B1 | 7/2018 |
| KR | 10-2018-0088755 A | 8/2018 |
| KR | 10-1915258 B1 | 11/2018 |
| KR | 10-1920356 B1 | 11/2018 |
| KR | 10-1935020 B1 | 1/2019 |
| KR | 10-2019-0055272 A | 5/2019 |
| KR | 10-1985185 B1 | 6/2019 |
| KR | 10-1992475 B1 | 6/2019 |
| KR | 10-1993348 B1 | 6/2019 |
| KR | 10-2019-0076934 A | 7/2019 |
| KR | 10-2019-0116943 A | 10/2019 |
| KR | 10-2019-0125536 A | 11/2019 |
| KR | 10-2019-0132339 A | 11/2019 |
| KR | 10-2041098 B1 | 11/2019 |
| KR | 10-2049603 B1 | 11/2019 |
| KR | 10-2019-0139831 A | 12/2019 |
| KR | 10-2020-0011522 A | 2/2020 |
| KR | 10-2020-0022547 A | 3/2020 |
| KR | 10-2071431 B1 | 3/2020 |
| KR | 10-2020-0067908 A | 6/2020 |
| KR | 10-2120258 B1 | 6/2020 |
| KR | 10-2128359 B1 | 6/2020 |
| KR | 10-2020-0079155 A | 7/2020 |
| KR | 10-2138525 B1 | 7/2020 |
| KR | 10-2153278 B1 | 9/2020 |
| KR | 10-2158002 B1 | 9/2020 |
| KR | 10 2172279 B1 | 10/2020 |
| KR | 10-2178231 B1 | 11/2020 |
| KR | 10-2183712 B1 | 11/2020 |
| KR | 10-2020-0134343 A | 12/2020 |
| KR | 10-2192755 B1 | 12/2020 |
| WO | 2012/092247 A1 | 7/2012 |

OTHER PUBLICATIONS

Communication issued Mar. 15, 2024 by the European Patent Office for EP Patent Application No. 22742919.8.

"Digital Audio Compression (AC-4) Standard Part 1: Channel based coding," ETSI TS 103 190-1 V1.3.1, European Telecommunications Standards Institute (ETSI), Jul. 14, 2017, xp014303414, Total 2680pages.

Communication issued on Jun. 19, 2024 by European Patent Office in European Patent Application No. 22742919.8.

* cited by examiner

[STEREO CHANNEL LAYOUT]

[ 3.1.2 CHANNEL LAYOUT ]
SCREEN-CENTERED
(LISTENER FRONT)

[ 7.1.4 CHANNEL LAYOUT ]
LISTENER-CENTERED
(LISTENER OMNIDIRECTION)

○ STEREO CHANNEL LAYOUT — 100

○ LISTENER FRONT 3D AUDIO CHANNEL LAYOUT — 110

○ LISTENER OMNIDIRECTION 3D AUDIO CHANNEL LAYOUT — 120

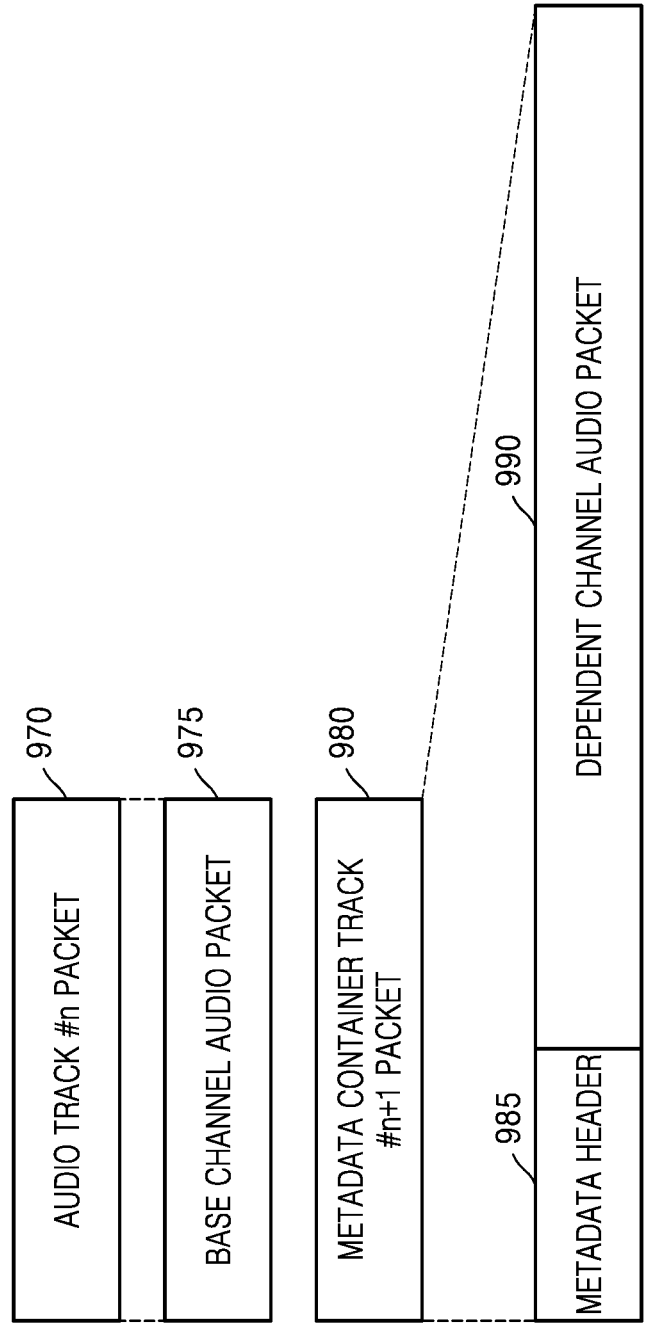

FIG. 19

|  | BCG | DCG #1 | DCG #2 — 1910 |
|---|---|---|---|
| Case 1 | 2ch | 4ch | 6ch |
| | C1 | C1 M1 M2 | C3 C4 C5 |
| | 3.1.2ch | | |
| | 7.1.4ch | | |

C1 = L2 / R2
C2 = Hfl3 / Hfr3
M1 = C
M2 = LFE
C3 = L / R
C4 = Ls / Rs
C5 = Hfl / Hfr

|  | BCG | DCG #1 | DCG #2 — 1920 |
|---|---|---|---|
| Case 2 | 2ch | 6ch | 4ch |
| | C1 | C2 C3 M1 M2 | C4 C5 |
| | 7.1.0ch | | |
| | 7.1.4ch | | |

C1 = L2 / R2
C2 = L / R
C3 = Ls / Rs
M1 = C
M2 = LFE
C4 = Hfl / Hfr
C5 = Hbl / Hbr

|  | BCG | DCG #1 — 1930 |
|---|---|---|
| Case 3 | 2ch | 10ch |
| | C1 | C2 C3 C4 C5 M1 M2 |
| | 7.1.4ch | |

C1 = L2 / R2
C2 = L / R
C3 = Ls / Rs
C4 = Hfl / Hfr
C5 = Hbl / Hbr
M1 = C
M2 = LFE

※ ----→ Dropping Height Channels

APPARATUS AND METHOD FOR PROCESSING MULTI-CHANNEL AUDIO SIGNAL

CROSS-REFERENCE TO RELATED APPLICATIONS

This application is a Continuation Application of International Application No. PCT/KR2022/001314, filed on Jan. 25, 2022, which claims benefit of priority to Korean Pat. App. No. 10-2021-0010435, filed on Jan. 25, 2021, Korean Pat. App. No. 10-2021-0011914, filed on Jan. 27, 2021, Korean Pat. App. No. 10-2021-0069531, filed on May 28, 2021, Korean Pat. App. No. 10-2021-0072326, filed on Jun. 3, 2021, and Korean Pat. App. No. 10-2021-0140579, filed on Oct. 20, 2021, in the Korean Intellectual Property Office, the disclosures of which are incorporated herein in their entireties by reference.

BACKGROUND

1. Technical Field

The disclosure relates to the field of processing a multi-channel audio signal. In particular, the disclosure relates to the field of processing an audio signal of a three-dimensional (3D) audio channel layout in front of a listener from a multi-channel audio signal.

2. Description of the Related Art

An audio signal is generally a two-dimensional (2D) audio signal, such as a 2 channel audio signal, a 5.1 channel audio signal, a 7.1 channel audio signal, and a 9.1 channel audio signal.

However, a 2D audio signal may need to generate a three-dimensional (3D) audio signal (e.g., an n-channel audio signal or a multi-channel audio signal, in which n is an integer greater than 2) to provide a spatial 3D effect of sound due to uncertainty of audio information in a height direction.

In a conventional channel layout for a 3D audio signal, a channel is arranged omni-directionally around a listener. However, there are increasing needs for a viewer who wants to experience an immersive sound, such as theater content in a home environment, according to expansion of an Over-The-Top (OTT) service, an increase in the resolution of a television (TV), and enlargement of a screen of an electronic device such as a tablet. Accordingly, there is a need to process an audio signal of a 3D audio channel layout (e.g., a 3D audio channel layout in front of the listener) in which a channel is arranged in front of the listener in consideration of sound image representation of an object (e.g., a sound source) on the screen.

In addition, in the case of a conventional 3D audio signal processing system, an independent audio signal for each independent channel of a 3D audio signal has been encoded/decoded, and in particular, to recover a two-dimensional (2D) audio signal, such as a conventional stereo audio signal, after a 3D audio signal is reconstructed, the reconstructed 3D audio signal needs to be down-mixed.

SUMMARY

One or more embodiments of the disclosure provide for processing of a multi-channel audio signal for supporting a three-dimensional (3D) audio channel layout in front of a listener.

To overcome the technical problem, various embodiments of the present disclosure provide an audio processing method that includes generating a second audio signal by down-mixing at least one first audio signal.

The audio processing method further includes generating first information related to error removal for the at least one first audio signal, using at least one of an original signal power of the at least one first audio signal or a second signal power of the at least one first audio signal after decoding.

The audio processing method further includes transmitting the first information related to the error removal for the at least one first audio signal and the down-mixed second audio signal.

In some embodiments, the first information related to the error removal for the at least one first audio signal may include second information about a factor for the error removal. In such embodiments, the generating of the first information related to the error removal for the at least one first audio signal may include, when the original signal power of the at least one first audio signal is less than or equal to a first value, generating the second information about the factor for the error removal. In such embodiments, the second information may indicate that a value of the factor for the error removal is 0. In other embodiments, the first information related to the error removal for the at least one first audio signal may include second information about a factor for the error removal. In such embodiments, the generating of the first information related to the error removal for the at least one first audio signal may include, when a first ratio of the original signal power of the at least one first audio signal to an original signal power of the second audio signal is less than a second value, generating the second information about the factor for the error removal, based on the original signal power of the at least one first audio signal and the second signal power of the at least one first audio signal after decoding. In other embodiments, the generating of the second information about the factor for the error removal may include, generating the second information about the factor for the error removal. In such embodiments, the second information may indicate that a value of the factor for the error removal is a second ratio of the original signal power of the at least one first audio signal to the second signal power of the at least one first audio signal after decoding.

In other embodiments, the generating of the second information about the factor for the error removal may include, when the second ratio of the original signal power of the at least one first audio signal to the second signal power of the at least one first audio signal after decoding is greater than 1, generating the second information about the factor for the error removal. In such embodiments, the second information may indicate that the value of the factor for the error removal is 1. In other embodiments, the first information related to the error removal for the at least one first audio signal may include second information about a factor for the error removal. In such embodiments, the generating of the first information related to the error removal for the at least one first audio signal may include, when a ratio of the original signal power of the at least one first audio signal to the original signal power of the second audio signal is greater than or equal to a second value, generating the second information about the factor for the error removal. In such embodiments, the second information may indicate that the value of the factor for the error removal is 1.

In other embodiments, the generating of the second information about the factor for the error removal may include generating, for each frame of the second audio signal, the first information related to the error removal for the at least one first audio signal.

In other embodiments, the down-mixed second audio signal may include a third audio signal of a base channel group and a fourth audio signal of a dependent channel group. In such embodiments, the fourth audio signal of the dependent channel group may include a fifth audio signal of a first dependent channel including a sixth audio signal of an independent channel included in a first 3D audio channel in front of a listener. In such embodiments, a seventh audio signal of a second 3D audio channel on a side and a back of the listener may have been obtained by mixing the fifth audio signal of the first dependent channel.

In other embodiments, the third audio signal of the base channel group may include an eighth audio signal of a second channel and a ninth audio signal of a third channel. In such embodiments, the eighth audio signal of the second channel may have been generated by mixing a tenth audio signal of a left stereo channel with a decoded audio signal of a center channel in front of the listener. In such embodiments, the audio ninth signal of the third channel may have been generated by mixing an eleventh audio signal of a right stereo channel with the decoded audio signal of the center channel in front of the listener.

In other embodiments, the down-mixed second audio signal may include a third audio signal of a base channel group and a fourth audio signal of a dependent channel group. In such embodiments, the transmitting of the first information related to the error removal for the at least one first audio signal and the down-mixed second audio signal may include generating a bitstream including the first information related to the error removal for the at least one first audio signal and second information about the down-mixed second audio signal. The transmitting of the first information related to the error removal for the at least one first audio signal and the down-mixed second audio signal may further include transmitting the bitstream.

In such embodiments, the bitstream may include a file stream of a plurality of audio tracks. In such embodiments, the generating of the bitstream may include generating a first audio stream of a first audio track including a compressed third audio signal of the base channel group. The generating of the bitstream may further include generating a second audio stream of a second audio track including dependent channel audio signal identification information, the second audio track being adjacent to the first audio track. The generating of the bitstream may further include, when the fourth audio signal of the dependent channel group, which corresponds to the third audio signal of the base channel group, exists, generating the dependent channel audio signal identification information indicating that the fourth audio signal of the dependent channel group exists.

In other embodiments, when the dependent channel audio signal identification information indicates that the fourth audio signal of the dependent channel group exists, the second audio stream of the second audio track may include a compressed fourth audio signal of the dependent channel group.

In other embodiments, when the dependent channel audio signal identification information indicates that the fourth audio signal of the dependent channel group does not exist, the second audio stream of the second audio track may include a fifth audio signal of a next track of the base channel group.

In other embodiments, the down-mixed second audio signal may include a third audio signal of a base channel group and a fourth audio signal of a dependent channel group. In such embodiments, the third audio signal of the base channel group may include a fifth audio signal of a stereo channel. In such embodiments, the transmitting of the first information related to the error removal for the at least one first audio signal and the down-mixed second audio signal may include generating a bitstream including the first information related to the error removal for the at least one first audio signal and second information about the down-mixed second audio signal and transmitting the bitstream. In such embodiments, the generating of the bitstream may include generating a base channel audio stream including a compressed fifth audio signal of the stereo channel. The generating may further include generating a plurality of dependent channel audio streams including a plurality of audio signals of a plurality of dependent channel groups. The plurality of dependent channel audio streams may include a first dependent channel audio stream and a second dependent channel audio stream. In such embodiments, when for a first multi-channel audio signal used to generate the base channel audio stream and the first dependent channel audio stream, a first number of surround channels is $S_{n-1}$, a second number of subwoofer channels is $W_{n-1}$, and a third number of height channels is $H_{n-1}$, and for a second multi-channel audio signal used to generate the first dependent channel audio stream and the second dependent channel audio stream, a fourth number of surround channels is $S_n$, a fifth number of subwoofer channels is $W_n$, and a sixth number of height channels is $H_n$, $S_{n-1}$ may be less than or equal to $S_n$, $W_{n-1}$ may be less than or equal to $W_n$, and $H_{n-1}$ may be less than or equal to $H_n$, but all of $S_{n-1}$, $W_{n-1}$, and $H_{n-1}$ may not be equal to $S_n$, $W_n$, and $H_n$, respectively.

In other embodiments, the audio processing method may further include generating an audio object signal of a 3D audio channel in front of a listener, which indicates at least one of an audio signal, a location, or a direction of an audio object. In such embodiments, the transmitting of the first information related to the error removal for the at least one first audio signal and the down-mixed second audio signal may include generating a bitstream including the first information related to the error removal for the at least one first audio signal, the audio object signal of the 3D audio channel in front of the listener, and second information about the down-mixed second audio signal.

The transmitting of the first information related to the error removal for the at least one first audio signal and the down-mixed second audio signal may further include transmitting the bitstream.

To overcome the technical problem, various embodiments of the present disclosure provide an audio processing method that includes obtaining, from a bitstream, a second audio signal down-mixed from at least one first audio signal. The audio processing method further includes obtaining, from the bitstream, first information related to error removal for the at least one first audio signal. The audio processing method further includes de-mixing the at least one first audio signal from the down-mixed second audio signal. The audio processing method further includes reconstructing the at least one first audio signal by mixing the first information related to the error removal for the at least one first audio signal to the de-mixed at least one first audio signal. The first information related to the error removal for the at least one first audio signal having been generated using at least one of an original signal power of the at least one first audio signal or a second signal power of the at least one first audio signal after decoding. In some embodiments, the first information related to the error removal for the at least one first audio signal may include second information about a factor for the error removal. In such embodiments, the factor for the error removal may be greater than or equal to 0 and may be less than or equal to 1.

In other embodiments, the reconstructing of the at least one first audio signal may include reconstructing the at least one first audio signal to have a third signal power equal to a product of a fourth signal power of the de-mixed at least one first audio signal and a factor for the error removal.

In other embodiments, the bitstream may include second information about a third audio signal of a base channel group and third information about a fourth audio signal of a dependent channel group. In such embodiments, the third audio signal of the base channel group may have been obtained by decoding the second information about the third audio signal of the base channel group, included in the bitstream, without being de-mixed with another audio signal of another channel group. The audio processing method may further comprise reconstructing, using the fourth audio signal of the dependent channel group, a fifth audio signal of an up-mixed channel group including at least one up-mixed channel through de-mixing with the third audio signal of the base channel group.

In other embodiments, the fourth audio signal of the dependent channel group may include a first dependent channel audio signal and a second dependent channel audio signal. In such embodiments, the first dependent channel audio signal may include a sixth audio signal of an independent channel in front of a listener, and the second dependent channel audio signal may include a mixed audio signal of audio signals of channels on a side and a back of the listener.

In other embodiments, the third audio signal of the base channel group may include a sixth audio signal of a first channel and a seventh audio signal of a second channel. In such embodiments, the sixth audio signal of the first channel may have been generated by mixing an eighth audio signal of a left stereo channel and a decoded audio signal of a center channel in front of a listener, and the seventh audio signal of the second channel may have been generated by mixing a ninth audio signal of a right stereo channel and a compressed and decompressed audio signal of the center channel in front of the listener.

In other embodiments, the base channel group may include a mono channel or a stereo channel, and the at least one up-mixed channel may be a discrete audio channel that is at least one channel except for a channel of the base channel group among a 3D audio channel in front of the listener or a 3D audio channel located omnidirectionally around the listener.

In other embodiments, the 3D audio channel in front of the listener may be a 3.1.2 channel. The 3.1.2 channel may include three surround channels in front of the listener, one subwoofer channel in front of the listener, and two height channels. The 3D audio channel located omnidirectionally around the listener may include at least one of a 5.1.2 channel or a 7.1.4 channel. The 5.1.2 channel may include three surround channels in front of the listener, two surround channels on a side and a back of the listener, one subwoofer channel in front of the listener, and two height channels in front of the listener. The 7.1.4 channel may include three surround channels in front of the listener, four surround channels on the side and the back of the listener, one subwoofer channel in front of the listener, two height channels in front of the listener, and two height channels on the side and the back of the listener.

In other embodiments, the de-mixed first audio signal may include a sixth audio signal of at least one up-mixed channel and a seventh audio signal of an independent channel. In such embodiments, the seventh audio signal of the independent channel may include a first portion of the third audio signal of the base channel group and a second portion of the fourth audio signal of the dependent channel group.

In other embodiments, the bitstream may include a file stream of a plurality of audio tracks including a first audio track and a second audio track that are adjacent to each other. In such embodiments, a third audio signal of a base channel group may have been obtained from the first audio track, and dependent channel audio signal identification information may have been obtained from the second audio track.

In other embodiments, when the obtained dependent channel audio signal identification information indicates that a dependent channel audio signal exists in the second audio track, a fourth audio signal of a dependent channel group may have been obtained from the second audio track.

In other embodiments, when the obtained dependent channel audio signal identification information indicates that a dependent channel audio signal does not exist in the second audio track, a fourth audio signal of a next track of the base channel group may have been obtained from the second audio track.

In other embodiments, the bitstream may include a base channel audio stream and a plurality of dependent channel streams. The plurality of dependent channel audio streams may include a first dependent channel audio stream and a second dependent channel audio stream. The base channel audio stream may include an audio signal of a stereo channel. In such embodiments, when for a multi-channel first audio signal reconstructed through the base channel audio stream and the first dependent channel audio stream, a first number of surround channels is $S_{n-1}$, a second number of subwoofer channels is $W_{n-1}$, and a third number of height channels is $H_{n-1}$, and for a multi-channel second audio signal reconstructed through the first dependent channel audio stream and the second dependent channel audio stream, a fourth number of surround channels of the multi-channel audio signal is $S_n$, a fifth number of subwoofer channels is $W_n$, and a sixth number of height channels is $H_n$, $S_{n-1}$ may be less than or equal to $S_n$, $W_{n-1}$ may be less than or equal to $W_n$, and $H_{n-1}$ may be less than or equal to $H_n$, but all of $S_{n-1}$, $W_{n-1}$, and $H_{n-1}$ may not be equal to $S_n$, $W_n$, and $H_n$, respectively.

In other embodiments, the audio processing method may further include obtaining, from the bitstream, an audio object signal of a 3D audio channel in front of a listener, which indicates at least one of an audio signal, a location, or a direction of an audio object. An audio signal of the 3D audio channel in front of the listener may have been reconstructed based on a sixth audio signal of the 3D audio channel in front of the listener, generated from the third audio signal of the base channel group and the fourth audio signal of the dependent channel group, and an audio object signal of the 3D audio channel in front of the listener.

In other embodiments, the audio processing method may further include obtaining, from the bitstream, multi-channel audio-related additional information, in which the multi-channel audio-related additional information may include at least one of second information about a total number of audio streams including a base channel audio stream and a dependent channel audio stream, down-mix gain information, channel mapping table information, volume information, low frequency effect (LFE) gain information, dynamic range control (DRC) information, channel layout rendering information, third information about a number of coupled audio streams, fourth information indicating a multi-channel layout, fifth information about whether a dialogue exists in an audio signal and a dialogue level, sixth information indicating whether to output an LFE, seventh information about whether an audio object exists on a screen, eighth information about whether a continuous channel audio signal exists or a discrete channel audio signal exists, or de-mixing information including at least one de-mixing parameter of a de-mixing matrix for generating the multi-channel audio signal.

To overcome the technical problem, various embodiments of the present disclosure provide an audio processing apparatus that includes a memory storing one or more instructions and at least one processor communicatively coupled to the memory, and configured to execute the one or more instructions to obtain, from a bitstream, a second audio signal down-mixed from at least one first audio signal.

The at least one processor may be further configured to obtain, from the bitstream, information related to error removal for the at least one first audio signal. The at least one processor may be further configured to de-mix the at least one first audio signal from the down-mixed second audio signal. The at least one processor may be further configured to reconstruct the at least one first audio signal by applying the information related to the error removal for the at least one first audio signal to the at least one first audio signal de-mixed from the second audio signal. The information related to the error removal for the at least one first audio signal may have been generated using at least one of an original signal power of the at least one first audio signal or a second signal power of the at least one first audio signal after decoding.

To overcome the technical problem, various embodiments of the present disclosure provide an audio processing method that includes generating a second audio signal by down-mixing at least one first audio signal. The audio processing method further includes generating information related to error removal for the at least one first audio signal using at least one of an original signal power of the second audio signal or a second signal power of the at least one first audio signal after decoding. The audio processing method further includes generating an audio signal of a low frequency effect (LFE) channel using a neural network for generating the audio signal of the LFE channel, for the information related to the error removal. The audio processing method further includes transmitting the down-mixed second audio signal and the audio signal of the LFE channel.

To overcome the technical problem, various embodiments of the present disclosure provide an audio processing method that includes obtaining, from a bitstream, a second audio signal down-mixed from at least one first audio signal. The audio processing method further includes obtaining, from the bitstream, an audio signal of an LFE channel. The audio processing method further includes obtaining information related to error removal for the at least one first audio signal, using a neural network for obtaining additional information, for the obtained audio signal of the LFE channel. The audio processing method further includes reconstructing the at least one first audio signal by applying the information related to the error removal to the at least one first audio signal up-mixed from the second audio signal. The information related to the error removal may have been generated using at least one of an original signal power of the at least one first audio signal or a second signal power of the at least one first audio signal after decoding.

To overcome the technical problem, various embodiments of the present disclosure provide a computer-readable storage medium storing instructions that, when executed by at least one processor of an audio processing apparatus, cause the audio processing apparatus to perform the audio processing method.

With a method and apparatus for processing a multi-channel audio signal according to various embodiments of the disclosure, while supporting backward compatibility with a conventional stereo (e.g., 2 channel) audio signal, an audio signal of a 3D audio channel layout in front of a listener may be encoded and an audio signal of a 3D audio channel layout omnidirectionally around the listener may be encoded.

With a method and apparatus for processing a multi-channel audio signal according to various embodiments of the disclosure, while supporting backward compatibility with a conventional stereo (e.g., 2 channel) audio signal, an audio signal of a 3D audio channel layout in front of a listener may be decoded and an audio signal of a 3D audio channel layout omnidirectionally around the listener may be decoded.

However, effects achieved by the apparatus and method for processing a multi-channel audio signal according to various embodiments of the disclosure are not limited to those described above, and other effects that are not mentioned will be clearly understood by those of ordinary skill in the art to which this disclosure belongs from the following description.

BRIEF DESCRIPTION OF THE DRAWINGS

FIG. 7B is a flowchart of a method of reproducing an audio signal by an audio decoding apparatus according to the file structure of FIG. 7D.

FIG. 9C is a view for describing a packet of an audio track according to the file structure of FIG. 8A.

FIG. 19 is a view for describing a transmission order and a rule of an audio stream in each channel group by audio encoding apparatuses, according to various embodiments of the disclosure.

DETAILED DESCRIPTION

Figure 1A:
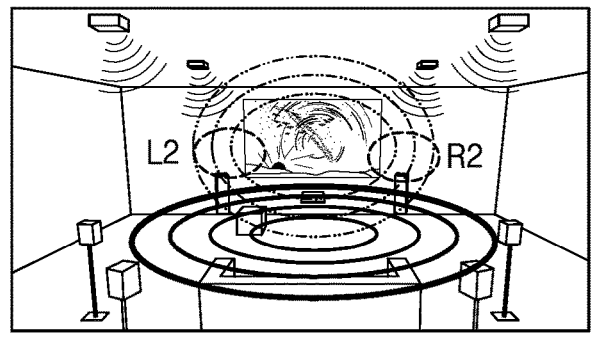
FIG. 1A is a view for describing a scalable channel layout structure according to various embodiments of the disclosure.
Figure 1A:
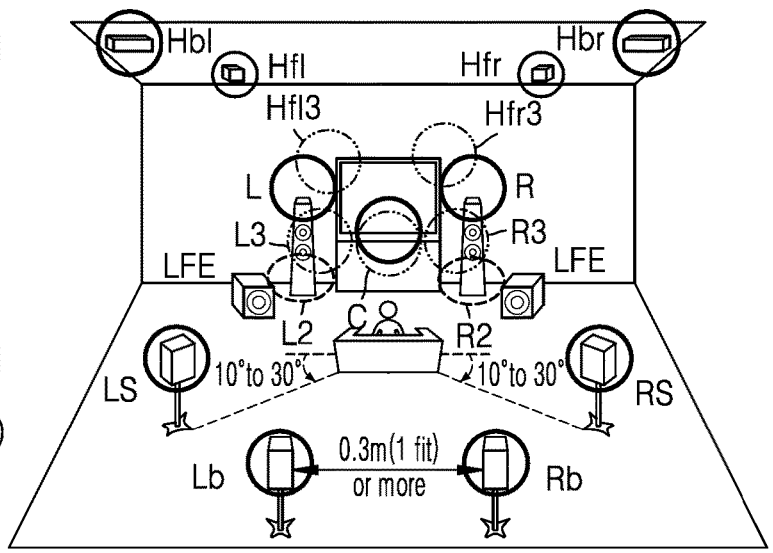

Throughout the disclosure, the expressions "at least one of a, b, or c" and "at least one of a, b, and c" indicate only a, only b, only c, both a and b, both a and c, both b and c, all of a, b, and c, or variations thereof.

The disclosure may have various modifications thereto and various embodiments of the disclosure, and thus particular embodiments of the disclosure will be illustrated in the drawings and described in detail in a detailed description. It should be understood, however, that this is not intended to limit the disclosure to a particular embodiment of the disclosure, and should be understood to include all changes, equivalents, and alternatives falling within the spirit and scope of the disclosure.

In describing an embodiment of the disclosure, when it is determined that the detailed description of the related art unnecessarily obscures the subject matter, a detailed description thereof will be omitted. Moreover, a number (e.g., a first, a second, etc.) used in a process of describing an embodiment of the disclosure is merely an identification symbol for distinguishing one component from another component.

Moreover, herein, when a component is mentioned as being "connected" or "coupled" to another component, it may be directly connected or directly coupled to the another component, but unless described otherwise, it should be understood that the component may also be connected or coupled to the another component via still another component therebetween.

In addition, for a component represented by 'unit', 'module', etc., two or more components may be integrated into one component or one component may be divided into two or more for each detailed function. Each component to be described below may additionally perform a function of some or all of functions in charge of other components in addition to a main function of the component, and some of the main functions of the components may be dedicated to and performed by other components.

Herein, a 'deep neural network (DNN)' may be a representative example of an artificial neural network model simulating a brain nerve, and is not limited to an artificial neural network model using a specific algorithm.

Herein, a 'parameter' may be a value used in an operation process of each layer constituting a neural network, and may include, for example, a weight (and a bias) used in application of an input value to a predetermined calculation formula. The parameter may be expressed in the form of a matrix. The parameter may be a value set as a result of training and may be updated through separate training data according to a need.

Herein, a 'multi-channel audio signal' may refer to an audio signal of n channels (where n is an integer greater than 2). A 'mono channel audio signal' may be a one-dimensional (1D) audio signal, a 'stereo channel audio signal' may be a two-dimensional (2D) audio signal, and a 'multi-channel audio signal' may be a three-dimensional (3D) audio signal.

Herein, a 'channel (or speaker) layout' may represent a combination of at least one channel, and may specify spatial arrangement of channels (or speakers). A channel used herein is a channel through which an audio signal is actually output, and thus may be referred to as a presentation channel.

For example, a channel layout may be a "X.Y.Z channel layout". Herein, X may be the number of surround channels, Y may be the number of subwoofer channels, and Z may be the number of height channels. The channel layout may specify a spatial location of a surround channel/subwoofer channel/height channel.

Examples of the 'channel (or speaker) layout' may include a 1.0.0 channel (or a mono channel) layout, a 2.0.0 channel (or a stereo channel) layout, a 5.1.0 channel layout, a 5.1.2 channel layout, a 5.1.4 channel layout, a 7.1.0 layout, a 7.1.2 layout, and a 3.1.2 channel layout, but the channel layout is not limited thereto, and there may be various other channel layouts.

Channels specified by the channel (or speaker) layout may be referred to as various names, but may be uniformly named for convenience of explanation.

Channels constituting the channel (speaker) layout may be named based on respective spatial locations of the channels.

For example, a first surround channel of the 1.0.0 channel layout may be named as a mono channel. For the 2.0.0 channel layout, a first surround channel may be named as an L2 channel and a second surround channel may be named as an R2 channel.

Herein, "L" represents a channel located on the left side of a listener, "R" represents a channel located on the right side of the listener, and "2" represents that the number of surround channels is 2.

For the 5.1.0 channel layout, a first surround channel may be named as an L5 channel, a second surround channel may be named as an R5 channel, a third surround channel may be named as a C channel, a fourth surround channel may be named as a Ls5 channel, and a fifth surround channel may be named as an Rs5 channel. Herein, "C" represents a channel located at the center of the listener, and "s" refers to a channel located on a side. The first subwoofer channel of the 5.1.0 channel layout may be named as a low frequency effect (LFE) channel. Herein, LFE may refer to a low frequency effect. In other words, the LFE channel may be a channel for outputting a low frequency effect sound.

The surround channels of the 5.1.2 channel layout and the 5.1.4 channel layout may be named identically with the surround channels of the 5.1.0 channel layout. Similarly, the subwoofer channels of the 5.1.2 channel layout and the 5.1.4 channel layout may be named identically with the subwoofer channel of the 5.1.0 channel layout.

A first height channel of the 5.1.2 channel layout may be named as an Hl5 channel. A second height channel may be named as a Hr5 channel. Herein, "H" represents a height channel, "l" represents a channel located on the left side of a listener, and "r" represents a channel located on the right side of the listener.

For the 5.1.4 channel layout, a first height channel may be named as an Hfl channel, a second height channel may be named as an Hfr channel, a third height channel may be named as an Hbl channel, and a fourth height channel may be named as an Hbr channel. Herein, "f" indicates a front channel with respect to the listener, and "b" indicates a back channel with respect to the listener.

For the 7.1.0 channel layout, a first surround channel may be named as an L channel, a second surround channel may be named as an R channel, a third surround channel may be named as a C channel, a fourth surround channel may be named as a Ls channel, a fifth surround channel may be named as an Rs channel, a sixth surround channel may be named as an Lb channel, and a seventh surround channel may be named as an Rb channel.

The surround channels of the 7.1.2 channel layout and the 7.1.4 channel layout may be named identically with the surround channel of the 7.1.0 channel layout. Similarly, respective subwoofer channels of the 7.1.2 channel layout and the 7.1.4 channel layout may be named identically with a subwoofer channel of the 7.1.0 channel layout.

For the 7.1.2 channel layout, a first height channel may be named as an Hl7 channel, and a second height channel may be named as a Hr7 channel.

For the 7.1.4 channel layout, a first height channel may be named as an Hfl channel, a second height channel may be named as an Hfr channel, a third height channel may be named as an Hbl channel, and a fourth height channel may be named as an Hbr channel.

For the 3.1.2 channel layout, a first surround channel may be named as an L3 channel, a second surround channel may be named as an R3 channel, and a third surround channel may be named as a C channel. A first subwoofer channel of the 3.1.2 channel layout may be named as an LFE channel. For the 3.1.2 channel layout, a first height channel may be named as an Hfl3 channel (or a TI channel), and a second height channel may be named as an Hfr3 channel (or a Tr channel).

Herein, some channels may be named differently according to channel layouts, but may represent the same channel. For example, the Hl5 channel and the Hl7 channel may be the same channels. Likewise, the Hr5 channel and the Hr7 channel may be the same channels.

In some embodiments, channels are not limited to the above-described channel names, and various other channel names may be used.

For example, the L2 channel may be named as an L" channel, the R2 channel may be named as an R" channel, the L3 channel may be named as an ML3 (or L') channel, the R3 channel may be named as an MR3 (or R') channel, the Hfl3 channel may be named as an MHL3 channel, the Hfr3 channel may be named as an MHR3 channel, the Ls5 channel may be named as an MSLS (or Ls') channel, the Rs5 channel may be named as an MSR5 channel, the Hl5 channel may be named as an MHL5 (or Hl') channel, the Hr5 channel may be named as an MHRS (or Hr') channel, and the C channel may be named as a MC channel.

Channels of the channel layout for the above-described layout may be named as in Table 1.

TABLE 1

| channel layout | channel name |
|---|---|
| 1.0.0 | Mono |
| 2.0.0 | L2/R2 |
| 5.1.0 | L5/C/R5/Ls5/Rs5/LFE |
| 5.1.2 | L5/C/R5/Ls5/Rs5/Hl5/Hr5/LFE |
| 5.1.4 | L5/C/R5/Ls5/Rs5/Hfl/Hfr/Hbl/Hbr/LFE |
| 7.1.0 | L/C/R/Ls/Rs/Lb/Rb/LFE |
| 7.1.2 | L/C/R/Ls/Rs/Lb/Rb/Hl7/Hr7/LFE |
| 7.1.4 | L/C/R/Ls/Rs/Lb/Rb/Hfl/Hfr/Hbl/Hbr/LFE |
| 3.1.2 | L3/C/R3/Hfl3/Hfr3/LFE |

A 'transmission channel' is a channel for transmitting a compressed audio signal, and a portion of the 'transmission channel' may be the same as the 'presentation channel', but is not limited thereto, and another portion of the 'transmission channel' may be a channel (mixed channel) of an audio signal in which an audio signal of the presentation channel is mixed. In other words, the 'transmission channel' may be a channel containing the audio signal of the 'presentation channel', but may be a channel of which a portion is the same as the presentation channel and the residual portion is a mixed channel different from the presentation channel. The 'transmission channel' may be named to be distinguished from the 'presentation channel'. For example, when the transmission channel is an NB channel, the A/B channel may contain audio signals of L2/R2 channels. When the transmission channel is a T/P/Q channel, the T/P/Q channel may contain audio signals of C/LFE/Hfl3, and Hfr3 channels. When the transmission channel is an S/U/V channel, the S/U/V channel may contain audio signals of L, and R/Ls, and Rs/Hfl, and Hfr channels. In the present disclosure, a '3D audio signal' may refer to an audio signal for detecting the distribution of sound and the location of sound sources in a 3D space.

In the present disclosure, a 'listener front 3D audio channel' may refer to a 3D audio channel based on a layout of an audio channel in front of the listener. The 'listener front 3D audio channel' may be referred to as a 'front 3D audio channel'. In particular, the 'listener front 3D audio channel' may be referred to as a 'screen-centered 3D audio channel' because the 'listener front 3D audio channel' is a 3D audio channel based on a layout of an audio channel arranged around the screen located in front of the listener.

In the present disclosure, a 'listener omni-direction 3D audio channel' may refer to a 3D audio channel based on a layout of an audio channel arranged omnidirectionally around the listener. The 'listener omni-direction 3D audio channel' may be referred to as a 'full 3D audio channel'. Herein, the omni-direction may refer to a direction including all of front, side, and rear directions. In particular, the 'listener omni-direction 3D audio channel' may also be referred to as a listener-centered 3D audio channel because the 'listener omni-direction 3D audio channel' is a 3D audio channel based on a layout of an audio channel arranged omnidirectionally around the listener.

In the present disclosure, a 'channel group', which is a type of data unit, may include an audio signal of at least one channel.

In some embodiments, the audio signal of the at least one channel included in the channel group may be compressed. For example, the channel group may include at least one of a base channel group that is independent of another channel group or a dependent channel group that is dependent on at least one channel group. In this case, a target channel group on which a dependent channel group depends may be another dependent channel group, and may be a dependent channel group related to a lower channel layout. Alternatively or additionally, a channel group on which the dependent channel group depends may be a base channel group. The 'channel group' may be referred to as a 'coding group' because of including data of a channel group. The dependent channel group, which is used to further extend the number of channels from channels included in the base channel group, may be referred to as a scalable channel group or an extended channel group.

An audio signal of the 'base channel group' may include an audio signal of a mono channel or an audio signal of a stereo channel. Without being limited thereto, the audio signal of the 'base channel group' may include an audio signal of the listener front 3D audio channel.

For example, the audio signal of the 'dependent channel group' may include an audio signal of a channel other than the audio signal of the 'base channel group' between the audio signal of the listener front 3D audio channel and the audio signal of the listener omni-direction 3D audio channel. In this case, a portion of the audio signal of the other channel may be an audio signal (e.g., an audio signal of a mixed channel in which audio signals of at least one channel are mixed).

For example, the audio signal of the 'base channel group' may be an audio signal of a mono channel or an audio signal of a stereo channel. The 'multi-channel audio signal' reconstructed based on the audio signals of the 'base channel group' and the 'dependent channel group' may be the audio signal of the listener front 3D audio channel or the audio signal of the listener omni-direction 3D audio channel.

In the present disclosure, 'up-mixing' may refer to an operation in which the number of presentation channels of an output audio signal increases in comparison to the number of presentation channels of an input audio signal through de-mixing.

In the present disclosure, 'de-mixing' may refer to an operation of separating an audio signal of a particular channel from an audio signal (e.g., an audio signal of a mixed channel) in which audio signals of various channels are mixed, and may refer to one of mixing operations. In this case, 'de-mixing' may be implemented as a calculation using a 'de-mixing matrix' (or a 'down-mixing matrix' corresponding thereto), and the 'de-mixing' matrix may include at least one 'de-mixing weight parameter' (or a 'down-mixing weight parameter' corresponding thereto) as a coefficient of a de-mixing matrix (or a 'down-mixing matrix' corresponding thereto). Alternatively or additionally, the 'de-mixing' may be implemented as an arithmetic calculation based on a portion of the 'de-mixing matrix' (or the 'down-mixing matrix' corresponding thereto), and may be implemented in various manners, without being limited thereto. As described above, 'de-mixing' may be related to 'up-mixing'.

Herein, 'mixing' may refer to any operation of generating an audio signal of a new channel (e.g., a mixed channel) by summing values obtained by multiplying each of audio signals of a plurality of channels by a corresponding weight (e.g., by mixing the audio signals of the plurality of channels).

Herein, 'mixing' may be divided into 'mixing' performed by an audio encoding apparatus in a narrow sense and 'de-mixing' performed by an audio decoding apparatus.

Herein, 'mixing' performed in the audio encoding apparatus may be implemented as a calculation using '(down) mixing matrix', and '(down)mixing matrix' may include at least one '(down)mixing weight parameter' as a coefficient of the (down)mixing matrix. Alternatively or additionally, the '(down)mixing' may be implemented as an arithmetic calculation based on a portion of the '(down)mixing matrix', and may be implemented in various manners, without being limited thereto.

In the present disclosure, an 'up-mixed channel group' may refer to a group including at least one up-mixed channel, and the 'up-mixed channel' may refer to a de-mixed channel separated through de-mixing with respect to an audio signal of an encoded/decoded channel. The 'up-mixed channel group' in a narrow sense may include an 'up-mixed channel'. However, the 'up-mixed channel group' in a broad sense may further include an 'encoded/decoded channel' as well as the 'up-mixed channel'. Herein, the 'encoded/decoded channel' may refer to an independent channel of an audio signal encoded (compressed) and included in a bitstream or an independent channel of an audio signal obtained by being decoded from a bitstream. In this case, to obtain the audio signal of the encoded/decoded channel, a separate mixing and/or de-mixing operation is not required.

The audio signal of the 'up-mixed channel group' in the broad sense may be a multi-channel audio signal, and an output multi-channel audio signal may be one of at least one multi-channel audio signal (e.g., an audio signal of at least one up-mixed channel group) as an audio signal output through a device such as a speaker.

In the present disclosure, 'down-mixing' may refer to an operation in which the number of presentation channels of an output audio signal decreases in comparison to the number of presentation channels of an input audio signal through mixing.

In the present disclosure, a 'factor for error removal' (or an error removal factor (ERF)) may be a factor for removing an error of an audio signal, which occurs due to lossy coding.

The error of the audio signal, which occurs due to lossy coding, may include, for example, an error, etc., caused by encoding (quantization) based on psycho-acoustic characteristics. The 'factor for error removal' may be referred to as a 'coding error removal (CER) factor', an 'error cancelation ratio', etc. In particular, the 'error removal factor' may be referred to as a 'scale factor' because an error removal operation substantially corresponds to a scale operation.

Hereinbelow, embodiments of the disclosure according to the technical spirit of the disclosure are described in detail.

FIG. 1A is a view for describing a scalable channel layout structure according to various embodiments of the disclosure.

A conventional 3D audio decoding apparatus receives a compressed audio signal of independent channels of a particular channel layout from a bitstream. The conventional 3D audio decoding apparatus reconstructs an audio signal of a listener omni-direction 3D audio channel using the compressed audio signal of the independent channels received from the bitstream. In this case, only the audio signal of the particular channel layout may be reconstructed.

Alternatively or additionally, the conventional 3D audio decoding apparatus receives the compressed audio signal of the independent channels (e.g., a first independent channel group) of the particular channel layout from the bitstream. For example, the particular channel layout may be a 5.1 channel layout, and in this case, the compressed audio signal of the first independent channel group may be a compressed audio signal of five surround channels and one subwoofer channel.

Herein, to increase the number of channels, the conventional 3D audio decoding apparatus further receives a compressed audio signal of other channels (a second independent channel group) that are independent of the first independent channel group. For example, the compressed audio signal of the second independent channel group may be a compressed audio signal of two height channels.

That is, the conventional 3D audio decoding apparatus reconstructs an audio signal of a listener omni-direction 3D audio channel using the compressed audio signal of the second independent channel group received from the bitstream, separately from the compressed audio signal of the first independent channel group received from the bitstream. Thus, an audio signal of an increased number of channels is reconstructed. Herein, the audio signal of the listener omni-direction 3D audio channel may be an audio signal of a 5.1.2. channel.

On the other hand, a conventional audio decoding apparatus that supports only reproduction of the audio signal of the stereo channel does not properly process the compressed audio signal included in the bitstream.

The conventional 3D audio decoding apparatus supporting reproduction of a 3D audio signal first decompresses (e.g., decodes) the compressed audio signals of the first independent channel group and the second independent channel group to reproduce the audio signal of the stereo channel. Then, the conventional 3D audio decoding apparatus up-mixes the audio signal generated by decompression. However, in order to reproduce the audio signal of the stereo channel, an operation such as up-mixing has to be performed.

Therefore, a scalable channel layout structure capable of processing a compressed audio signal in a conventional audio decoding apparatus is required. Alternatively or additionally, in audio decoding apparatuses 300 and 500 of FIGS. 3A and 5A, respectively, that support reproduction of a 3D audio signal, according to various embodiments of the disclosure, a scalable channel layout structure capable of processing a compressed audio signal according to a reproduction-supported 3D audio channel layout is required. Herein, the scalable channel layout structure may refer to a layout structure where the number of channels may freely increase from the base channel layout.

The audio decoding apparatuses 300 and 500, according to various embodiments of the disclosure, may reconstruct an audio signal of the scalable channel layout structure from the bitstream. With the scalable channel layout structure according to various embodiments of the disclosure, the number of channels may increase from a stereo channel layout 100 to a 3D audio channel layout 110 in front of the listener (or a listener front 3D audio channel layout 110). Moreover, with the scalable channel layout structure, the number of channels may increase from the listener front 3D audio channel layout 110 to a 3D audio channel layout 120 located omnidirectionally around the listener (or a listener omni-direction 3D audio channel layout 120). For example, the listener front 3D audio channel layout 110 may be a 3.1.2 channel layout. The listener omni-direction 3D audio channel layout 120 may be a 5.1.2 or 7.1.2 channel layout. However, the scalable channel layout that may be implemented in the disclosure is not limited thereto.

As the base channel group, the audio signal of the conventional stereo channel may be compressed. The conventional audio decoding apparatus may decompress the compressed audio signal of the base channel group from the bitstream, thus smoothly reproducing the audio signal of the conventional stereo channel.

Alternatively or additionally, as a dependent channel group, an audio signal of a channel other than the audio signal of the conventional stereo channel out of the multi-channel audio signal may be compressed.

However, in a process of increasing the number of channels, a portion of the audio signal of the channel group may be an audio signal in which signals of some independent channels of the audio signals of the particular channel layout are mixed.

Accordingly, in the audio decoding apparatuses 300 and 500, a portion of the audio signal of the base channel group and a portion of the audio signal of the dependent channel group may be de-mixed to generate the audio signal of the up-mixed channel included in the particular channel layout.

In some embodiments, one or more dependent channel groups may exist. For example, the audio signal of the channel other than the audio signal of the stereo channel out of the audio signal of the listener front 3D audio channel layout 110 may be compressed as an audio signal of the first dependent channel group.

The audio signal of the channel other than the audio signal of channels reconstructed from the base channel group and the first dependent channel group, out of the audio signal of the listener omni-direction 3D audio channel layout 120, may be compressed as the audio signal of the second dependent channel group.

The audio decoding apparatus 300 and 500 according to various embodiments of the disclosure may support reproduction of the audio signal of the listener omni-direction 3D audio channel layout 120.

Thus, the audio decoding apparatuses 300 and 500 according to various embodiments of the disclosure may reconstruct the audio signal of the listener omni-direction 3D audio channel layout 120, based on the audio signal of the base channel group and the audio signal of the first dependent channel group and the second dependent channel group.

The conventional audio signal processing apparatus may ignore a compressed audio signal of a dependent channel group that may not be reconstructed from the bitstream, and reproduce the audio signal of the stereo channel reconstructed from the bitstream.

Similarly, the audio decoding apparatuses 300 and 500 may process the compressed audio signal of the base channel group and the dependent channel group to reconstruct the audio signal of the supportable channel layout out of the scalable channel layout. The audio decoding apparatuses 300 and 500 may not reconstruct the compressed audio signal regarding a non-supported upper channel layout from the bitstream. Accordingly, the audio signal of the supportable channel layout may be reconstructed from the bitstream, while ignoring the compressed audio signal related to the upper channel layout that is not supported by the audio decoding apparatuses 300 and 500.

In particular, conventional audio encoding and decoding apparatuses compress and decompress an audio signal of an independent channel of a particular channel layout. Thus, compression and decompression of an audio signal of a limited channel layout are possible.

Figure 2A:
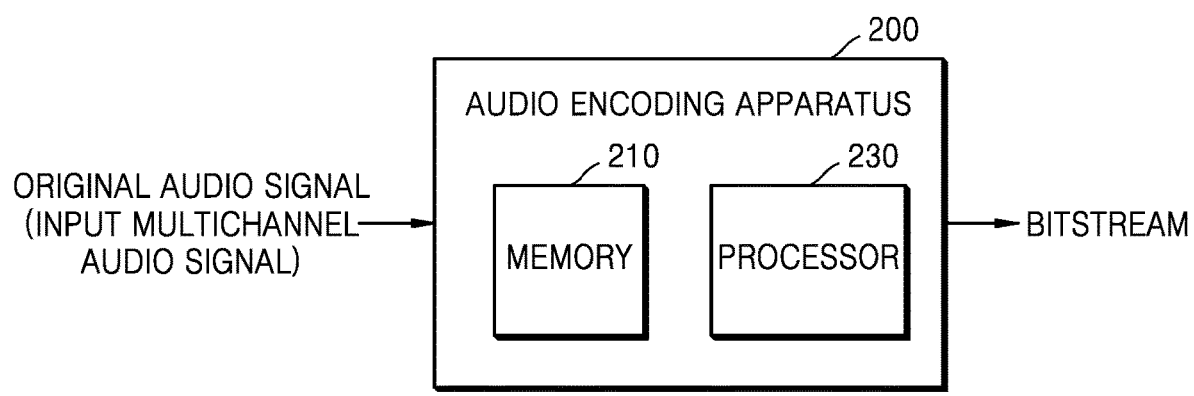
FIG. 2A is a block diagram of a structure of an audio encoding apparatus according to various embodiments of the disclosure.
Figure 4A:
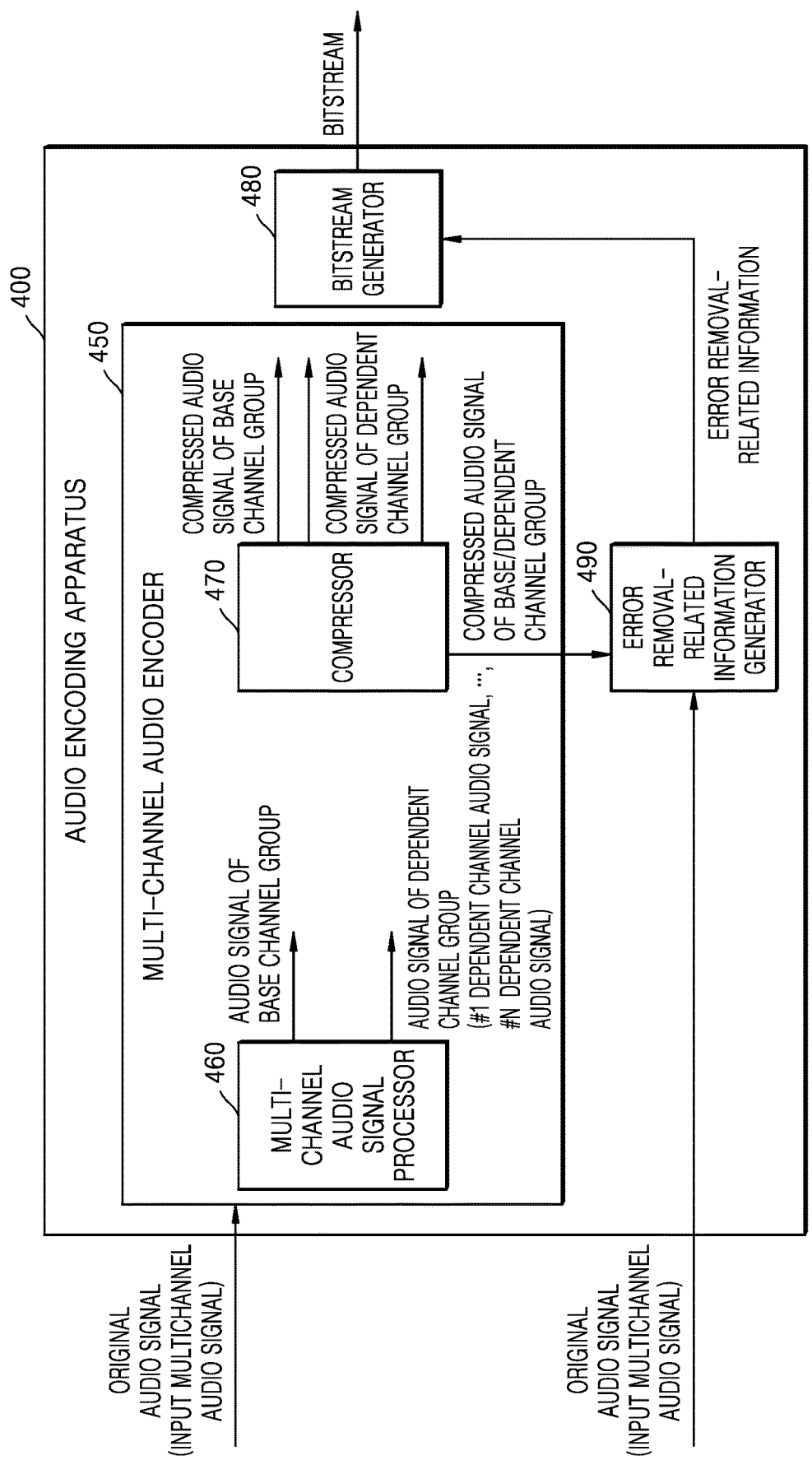
FIG. 4A is a block diagram of an audio encoding apparatus according to various embodiments of the disclosure.

However, by audio encoding apparatuses 200 and 400 of FIGS. 2A and 4A, respectively, and the audio decoding apparatus 300 and 500, according to various embodiments of the disclosure, which support a scalable channel layout, transmission and reconstruction of an audio signal of a stereo channel may be possible. With the audio encoding apparatuses 200 and 400 and the audio decoding apparatuses 300 and 500, according to various embodiments of the disclosure, transmission and reconstruction of an audio signal of a listener front 3D channel layout may be possible. Moreover, with the audio encoding apparatuses 200 and 400 and the audio decoding apparatuses 300 and 500 according to various embodiments of the disclosure, an audio signal of a listener omni-directional 3D channel layout may be transmitted and reconstructed.

That is, the audio encoding apparatuses 200 and 400 and the audio decoding apparatuses 300 and 500, according to various embodiments of the disclosure, may transmit and reconstruct an audio signal according to a layout of a stereo channel. Moreover, the audio encoding apparatuses 200 and 400 and the audio decoding apparatuses 300 and 500, according to various embodiments of the disclosure, may freely convert audio signals of the current channel layout into audio signals of another channel layout. Through mixing/de-mixing between audio signals of channels included in different channel layouts, conversion between channel layouts may be possible. The audio encoding apparatuses 200 and 400 and the audio decoding apparatuses 300 and 500, according to various embodiments of the disclosure, may support conversion between various channel layouts and thus transmit and reproduce audio signals of various 3D channel layouts. That is, between a listener front channel layout and a listener omni-direction channel layout or between a stereo channel layout and the stereo front channel layout, channel dependency is not guaranteed, but free conversion may be possible through mixing/de-mixing of audio signals.

The audio encoding apparatuses 200 and 400 and the audio decoding apparatuses 300 and 500, according to various embodiments of the disclosure, support processing of an audio signal of a listener front channel layout and thus transmit and reconstruct an audio signal corresponding to a speaker arranged around the screen, thereby improving a sensation of immersion of the listener.

Detailed operations of the audio encoding apparatuses 200 and 400 and the audio decoding apparatuses 300 and 500, according to various embodiments of the disclosure, are described with reference to FIGS. 2A to 5B.

Figure 1B:
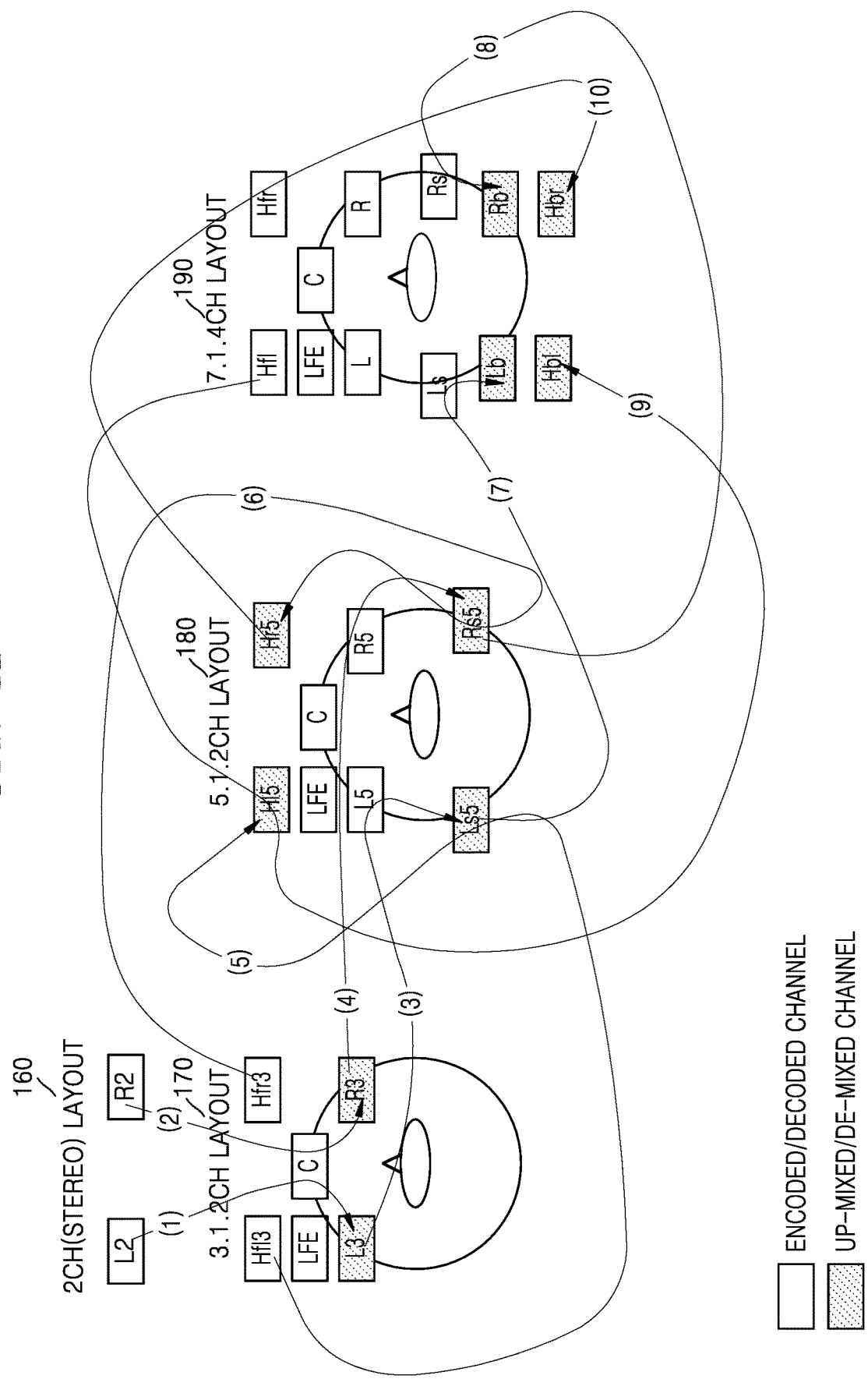
FIG. 1B is a view for describing an example of a detailed scalable audio channel layout structure.

FIG. 1B is a view for describing an example of a detailed scalable audio channel layout structure, according to various embodiments of the disclosure.

Referring to FIG. 1B, to transmit an audio signal of a stereo channel layout 160, the audio encoding apparatuses 200 and 400 may generate a compressed audio signal (A/B signal) of the base channel group by compressing an L2/R2 signal.

In this case, the audio encoding apparatuses 200 and 400 may generate the audio signal of the base channel group by compressing the L2/R2 signal.

Moreover, to transmit an audio signal of a layout 170 of a 3.1.2 channel that is one of listener front 3D audio channels, the audio encoding apparatuses 200 and 400 may generate a compressed audio signal of a dependent channel group by compressing C, LFE, Hfl3, and Hfr3 signals. The audio decoding apparatuses 300 and 500 may reconstruct the L2/R2 signal by decompressing the compressed audio signal of the base channel group. The audio decoding apparatuses 300 and 500 may reconstruct the C, LFE, Hfl3, and Hfr3 signals by decompressing the compressed audio signal of the dependent channel group.

The audio decoding apparatuses 300 and 500 may reconstruct an L3 signal of the 3.1.2 channel layout 170 by de-mixing the L2 signal and the C signal (operation 1 of FIG. 1B). The audio decoding apparatuses 300 and 500 may reconstruct an R3 signal of the 3.1.2 channel layout 170 by de-mixing the R2 signal and the C signal (operation 2).

Consequently, the audio decoding apparatuses 300 and 500 may output the L3, R3, C, Lfe, Hfl3, and Hfr3 signals as the audio signal of the 3.1.2 channel layout 170.

In some embodiments, to transmit the audio signal of a listener omni-front 5.1.2 channel layout 180, the audio encoding apparatuses 200 and 400 may further compress L5 and R5 signals to generate a compressed audio signal of the second dependent channel group.

As described above, the audio decoding apparatuses 300 and 500 may reconstruct the L2/R2 signal by decompressing the compressed audio signal of the base channel group and reconstruct the C, LFE, Hfl3, and Hfr3 signals by decompressing the compressed audio signal of the first dependent channel group. Alternatively or additionally, the audio decoding apparatuses 300 and 500 may reconstruct the L5 and R5 signals by decompressing the compressed audio signal of the second dependent channel group. Moreover, as described above, the audio decoding apparatuses 300 and 500 may reconstruct the L3 and R3 signals by de-mixing some of the decompressed audio signals.

Alternatively or additionally, the audio decoding apparatuses 300 and 500 may reconstruct an Ls5 signal by de-mixing the L3 and L5 signals (operation 3). The audio decoding apparatuses 300 and 500 may reconstruct an Rs5 signal by de-mixing the R3 and R5 signals (operation 4).

The audio decoding apparatuses 300 and 500 may reconstruct an Hl5 signal by de-mixing the Hfl3 and Ls5 signals (operation 5).

The audio decoding apparatuses 300 and 500 may reconstruct an Hr5 signal by de-mixing the Hfr3 and Rs5 signals (operation 6). Hfr3 and Hr5 are front right channels among height channels.

Consequently, the audio decoding apparatuses 300 and 500 may output the Hl5, Hr5, LFE, L, R, C, Ls5, and Rs5 signals as audio signals of the 5.1.2 channel layout 180.

In some embodiments, to transmit an audio signal of a 7.1.4 channel layout 190, the audio encoding apparatuses 200 and 400 may further compress the Hfl, Hfr, Ls, and Rs signals as audio signals of a third dependent channel group.

As described above, the audio decoding apparatuses 300 and 500 may decompress the compressed audio signal of the base channel group, the compressed audio signal of the first dependent channel group, and the compressed audio signal of the second dependent channel group and reconstruct the Hl5, Hr5, LFE, L, R, C, Ls5, and Rs5 signals through de-mixing (operations 1 through 6).

Alternatively or additionally, the audio decoding apparatuses 300 and 500 may reconstruct the Hfl, Hfr, Ls, and Rs signals by decompressing the compressed audio signal of the third dependent channel group. The audio decoding apparatuses 300 and 500 may reconstruct a Lb signal of a 7.1.4 channel layout 190 by de-mixing the Ls5 signal and the Ls signal (operation 7).

The audio decoding apparatuses 300 and 500 may reconstruct an Rb signal of the 7.1.4 channel layout 190 by de-mixing the Rs5 signal and the Rs signal (operation 8).

The audio decoding apparatuses 300 and 500 may reconstruct an Hbl signal of the 7.1.4 channel layout 190 by de-mixing the Hfl signal and the Hl5 signal (operation 9).

The audio decoding apparatuses 300 and 500 may reconstruct an Hbr signal of the 7.1.4 channel layout 190 by de-mixing the Hfr signal and the Hr5 signal (operation 10).

Consequently, the audio decoding apparatuses 300 and 500 may output the Hfl, Hfr, LFE, C, L, R, Ls, Rs, Lb, Rb, Hbl, and Hbr signals as audio signals of the 7.1.4 channel layout 190.

Thus, the audio decoding apparatuses 300 and 500 may reconstruct the audio signal of the listener front 3D audio channel and the audio signal of the listener omni-direction 3D audio channel as well as the audio signal of the conventional stereo channel layout, by supporting a scalable channel layout in which the number of channels is increased by a de-mixing operation.

A scalable channel layout structure described above in detail with reference to FIG. 1B is merely an example, and a channel layout structure may be implemented scalable to include various channel layouts.

FIG. 2A is a block diagram of an audio encoding apparatus according to various embodiments of the disclosure.

The audio encoding apparatus 200 may include a memory 210 and a processor 230. The audio encoding apparatus 200 may be implemented as an apparatus capable of performing audio processing such as a server, a television (TV), a camera, a cellular phone, a tablet personal computer (PC), a laptop computer, etc.

While the memory 210 and the processor 230 are shown separately in FIG. 2A, the memory 210 and the processor 230 may be implemented through one hardware module (e.g., a chip).

The processor 230 may be implemented as a dedicated processor for audio processing based on a neural network. Alternatively or additionally, the processor 230 may be implemented through a combination of software and a general-purpose processor such as an application processor (AP), a central processing unit (CPU), or a graphic processing unit (GPU). The dedicated processor may include a memory for implementing various embodiments of the disclosure or a memory processor for using external memory.

The processor 230 may include a plurality of processors. In this case, the processor 230 may be implemented as a combination of dedicated processors, and through a combination of software and a plurality of general-purpose processors such as an AP, a CPU, or a GPU.

The memory 210 may store one or more instructions for audio processing. In various embodiments of the disclosure, the memory 210 may store a neural network. When the neural network is implemented in the form of a dedicated hardware chip for artificial intelligence or as a part of an existing general-purpose processor (e.g., a CPU or an AP) or a graphic dedicated processor (e.g., a GPU), the neural network may not be stored in the memory 210. The neural network may be implemented by an external device (e.g., a server), and in this case, the audio encoding apparatus 200 may request and receive result information based on the neural network from the external device.

The processor 230 may sequentially process successive frames according to an instruction stored in the memory 210 and obtain successive encoded (compressed) frames. The successive frames may refer to frames constituting audio.

The processor 230 may perform an audio processing operation with the original audio signal as an input and output a bitstream including a compressed audio signal. In this case, the original audio signal may be a multi-channel audio signal. The compressed audio signal may be a multi-channel audio signal having channels of a number less than or equal to the number of channels of the original audio signal.

In this case, the bitstream may include a base channel group, and furthermore, n dependent channel groups (where n is an integer greater than or equal to 1). Thus, according to the number of dependent channel groups, the number of channels may be freely increased.

Figure 2B:
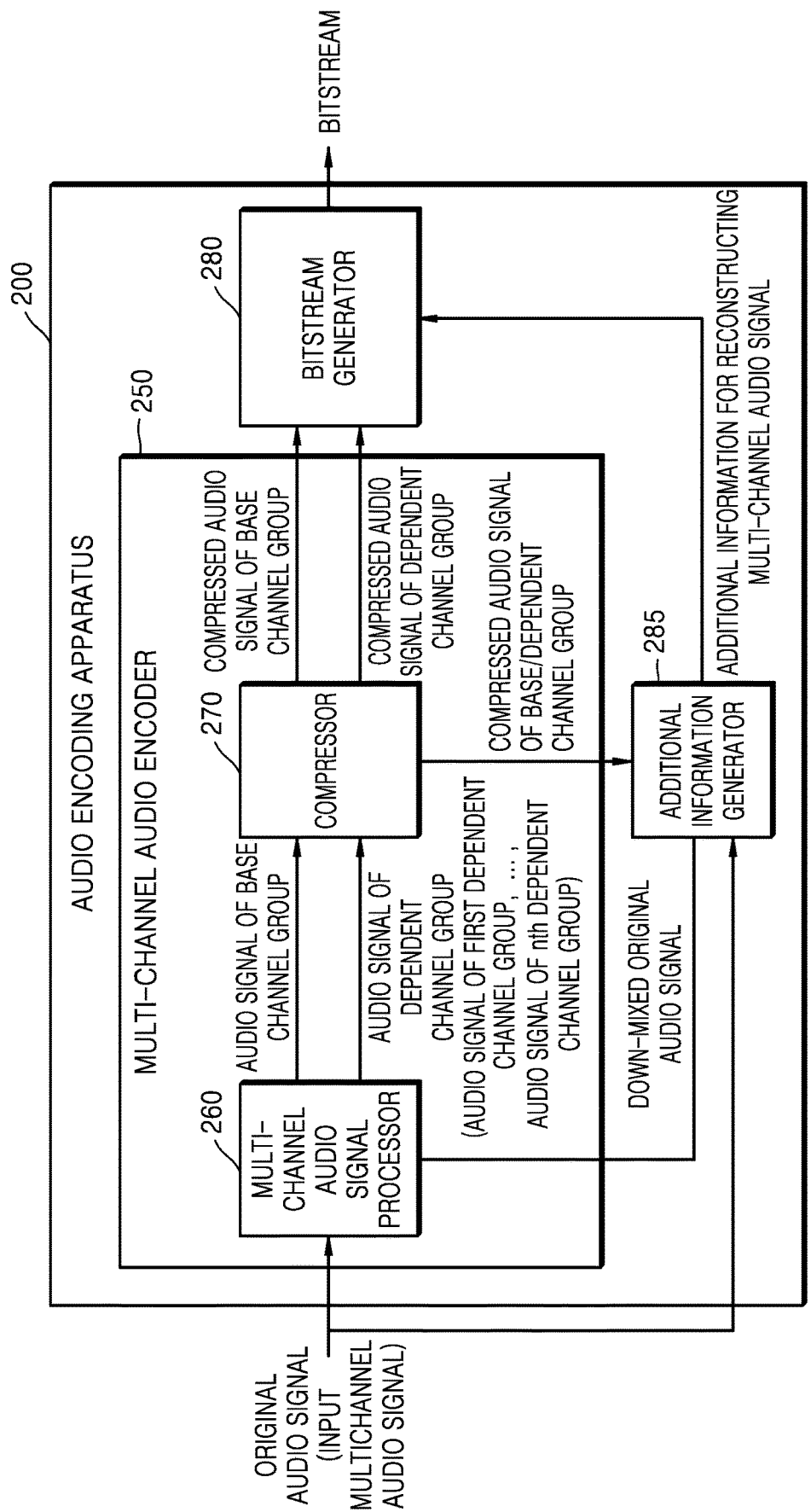
FIG. 2B is a block diagram of a structure of an audio encoding apparatus according to various embodiments of the disclosure.

FIG. 2B is a block diagram of an audio encoding apparatus according to various embodiments of the disclosure.

Referring to FIG. 2B, the audio encoding apparatus 200 may include a multi-channel audio encoder 250, a bitstream generator 280, and an additional information generator 285. The multi-channel audio encoder 250 may include a multi-channel audio signal processor 260 and a compressor 270.

Referring back to FIG. 2A, as described above, the audio encoding apparatus 200 may include the memory 210 and the processor 230, and an instruction for implementing the components 250, 260, 270, 280, and 285 of FIG. 2B may be stored in the memory 210 of FIG. 2A. The processor 230 may execute the instructions stored in the memory 210.

The multi-channel audio signal processor 260 may obtain at least one audio signal of a base channel group and at least one audio signal of at least one dependent channel group from the original audio signal. For example, when the original audio signal is an audio signal of a 7.1.4 channel layout, the multi-channel audio signal processor 260 may obtain an audio signal of a 2-channel (stereo channel) as an audio signal of a base channel group in an audio signal of a 7.1.4 channel layout.

The multi-channel audio signal processor 260 may obtain an audio signal of a channel other than an audio signal of a 2-channel, out of an audio signal of a 3.1.2 channel layout, as the audio signal of the first dependent channel group, to reconstruct the audio signal of the 3.1.2 channel layout, which is one of the listener front 3D audio channels. In this case, audio signals of some channels of the first dependent channel group may be de-mixed to generate an audio signal of a de-mixed channel.

The multi-channel audio signal processor 260 may obtain an audio signal of a channel other than an audio signal of the base channel group and an audio signal of the first dependent channel group, out of an audio signal of a 5.1.2 channel layout, as an audio signal of the second dependent channel group, to reconstruct the audio signal of the 5.1.2 channel layout, which is one of the listener front and rear 3D audio channels. In this case, audio signals of some channels of the second dependent channel group may be de-mixed to generate an audio signal of a de-mixed channel.

The multi-channel audio signal processor 260 may obtain an audio signal of a channel other than the audio signal of the first dependent channel group and the audio signal of the second dependent channel group, out of an audio signal of a 7.1.4 channel layout, as an audio signal of the third dependent channel group, to reconstruct the audio signal of the 7.1.4 channel layout, which is one of the listener omni-direction 3D audio channels. Likewise, audio signals of some channels of the third dependent channel group may be de-mixed to obtain an audio signal of a de-mixed channel.

A detailed operation of the multi-channel audio signal processor 260 is described with reference to FIG. 2C.

The compressor 270 may compress the audio signal of the base channel group and the audio signal of the dependent channel group. That is, the compressor 270 may compress at least one audio signal of the base channel group to obtain at least one compressed audio signal of the base channel group. Herein, compression may refer to compression based on various audio codecs. For example, compression may include transformation and quantization processes.

Herein, the audio signal of the base channel group may be a mono or stereo signal. Alternatively or additionally, the audio signal of the base channel group may include an audio signal of a first channel generated by mixing an audio signal L of a left stereo channel with $C\_1$. Here, $C\_1$ may be an audio signal of a center channel of the front of the listener, decompressed after compressed. In the name ("$X\_Y$") of an audio signal, "X" may represent the name of a channel, and "Y" may represent being decoded, being up-mixed, an error removal factor being applied (e.g., being scaled), or an LFE gain being applied. For example, a decoded signal may be expressed as "$X\_1$", and a signal generated by up-mixing the decoded signal (an up-mixed signal) may be expressed as "$X\_2$". Alternatively or additionally, a signal to which the LFE gain is applied to the decoded LFE signal may also be expressed as "$X\_2$". A signal to which the error removal factor is applied (e.g., a scaled signal) to the up-mixed signal may be expressed as "$X\_3$".

The audio signal of the base channel group may include an audio signal of a second channel generated by mixing an audio signal R of a right stereo channel with $C\_1$.

The compressor 270 may obtain at least one compressed audio signal of at least one dependent channel group by compressing at least one audio signal of at least one dependent channel group.

The additional information generator 285 may generate additional information based on at least one of the original audio signal, the compressed audio signal of the base channel group, or the compressed audio signal of the dependent channel group. In this case, the additional information may be information related to a multi-channel audio signal and include various pieces of information for reconstructing the multi-channel audio signal.

For example, the additional information may include an audio object signal of a listener front 3D audio channel indicating at least one of an audio signal, a position, a shape, an area, or a direction of an audio object (e.g., a sound source). Alternatively or additionally, the additional information may include information about the total number of audio streams including a base channel audio stream and a dependent channel audio stream. The additional information may include down-mix gain information. The additional information may include channel mapping table information. The additional information may include volume information. The additional information may include LFE gain information. The additional information may include dynamic range control (DRC) information. The additional information may include channel layout rendering information. The additional information may also include information of the number of coupled audio streams, information indicating a multi-channel layout, information about whether a dialogue exists in an audio signal and a dialogue level, information indicating whether an LFE is output, information about whether an audio object exists on the screen, information about existence or absence of an audio signal of a continuous audio channel (or a scene-based audio signal or an ambisonic audio signal), and information about existence or absence of an audio signal of a discrete audio channel (or an object-based audio signal or a spatial multi-channel audio signal). The additional information may include information about de-mixing including at least one de-mixing weight parameter of a de-mixing matrix for reconstructing a multi-channel audio signal. De-mixing and (down)mixing may correspond to each other, such that information about de-mixing may correspond to information about (down)mixing, and/or the information about de-mixing may include the information about (down)mixing. For example, the information about de-mixing may include at least one (down)mixing weight parameter of a (down) mixing matrix. A de-mixing weight parameter may be obtained based on the (down)mixing weight parameter.

The additional information may be various combinations of the aforementioned pieces of information. In other words, the additional information may include at least one of the aforementioned pieces of information.

For example, when there is an audio signal of a dependent channel corresponding to at least one audio signal of the base channel group, the additional information generator 285 may generate dependent channel audio signal identification information indicating that the audio signal of the dependent channel exists.

The bitstream generator 280 may generate a bitstream including the compressed audio signal of the base channel group and the compressed audio signal of the dependent channel group. The bitstream generator 280 may generate a bitstream further including the additional information generated by the additional information generator 285.

For example, the bitstream generator 280 may generate a base channel audio stream and a dependent channel audio stream. The base channel audio stream may include the compressed audio signal of the base channel group, and the dependent channel audio stream may include the compressed audio signal of the dependent channel group.

The bitstream generator 280 may generate a bitstream including the base channel audio stream and a plurality of dependent channel audio streams. The plurality of dependent channel audio streams may include n dependent channel audio streams (where n is an integer greater than 1). In this case, the base channel audio stream may include an audio signal of a mono channel or a compressed audio signal of a stereo channel.

For example, among channels of a first multi-channel layout reconstructed from the base channel audio stream and the first dependent channel audio stream, the number of surround channels may be $S_{n-1}$, the number of subwoofer channels may be $W_{n-1}$, and the number of height channels may be $H_{n-1}$. In a second multi-channel layout reconstructed from the base channel audio stream, the first dependent channel audio stream, and the second dependent channel audio stream, the number of surround channels may be $S_n$, the number of subwoofer channels may be $W_n$, and the number of height channels may be $H_n$.

In this case, $S_{n-1}$ may be less than or equal to $S_n$, $W_{n-1}$ may be less than or equal to $W_n$, and $H_{n-1}$ may be less than or equal to $H_n$. Herein, a case where $S_{n-1}$ is equal to $S_n$, $W_{n-1}$ is equal to $W_n$, and $H_{n-1}$ is equal to $H_n$ may be excluded. That is, all of $S_{n-1}$, $W_{n-1}$, and $H_{n-1}$ may not be equal to $S_n$, $W_n$, and $H_n$, respectively.

That is, the number of surround channels of the second multi-channel layout needs to be greater than the number of surround channels of the first multi-channel layout. Alternatively or additionally, the number of subwoofer channels of the second multi-channel layout needs to be greater than the number of subwoofer channels of the first multi-channel layout. Alternatively or additionally, the number of height channels of the second multi-channel layout needs to be greater than the number of height channels of the first multi-channel layout.

Moreover, the number of surround channels of the second multi-channel layout may not be less than the number of surround channels of the first multi-channel layout. Likewise, the number of subwoofer channels of the second multi-channel layout may not be less than the number of subwoofer channels of the first multi-channel layout. The number of height channels of the second multi-channel layout may not be less than the number of height channels of the first multi-channel layout.

Alternatively or additionally, the case where the number of surround channels of the second multi-channel layout is equal to the number of surround channels of the first multi-channel layout and the number of subwoofer channels of the second multi-channel layout is equal to the number of subwoofer channels of the first multi-channel layout and the number of height channels of the second multi-channel layout is equal to the number of height channels of the first multi-channel layout does not exist. That is, all channels of the second multi-channel layout may not be the same as all channels of the first multi-channel layout.

In particular, for example, when the first multi-channel layout is the 5.1.2 channel layout, the second multi-channel layout may be the 7.1.4 channel layout.

Alternatively or additionally, the bitstream generator 280 may generate metadata including additional information.

Consequently, the bitstream generator 280 may generate a bitstream including the base channel audio stream, the dependent channel audio stream, and the metadata.

The bitstream generator 280 may generate a bitstream in a form in which the number of channels may freely increase from the base channel group.

That is, the audio signal of the base channel group may be reconstructed from the base channel audio stream, and the multi-channel audio signal in which the number of channels increases from the base channel group may be reconstructed from the base channel audio stream and the dependent channel audio stream.

In some embodiments, the bitstream generator 280 may generate a file stream having a plurality of audio tracks. The bitstream generator 280 may generate an audio stream of a first audio track including at least one compressed audio signal of the base channel group. The bitstream generator 280 may generate an audio stream of a second audio track including dependent channel audio signal identification information. In this case, the second audio track, which follows the first audio track, may be adjacent to the first audio track.

In other embodiments, when there is a dependent channel audio signal corresponding to at least one audio signal of the base channel group, the bitstream generator 280 may generate an audio stream of the second audio track including at least one compressed audio signal of at least one dependent channel group.

In other embodiments, when there is no dependent channel audio signal corresponding to at least one audio signal of the base channel group, the bitstream generator 280 may generate the audio stream of the second audio track including the next audio signal of a base channel group with respect to the audio signal of the first audio track of the base channel group.

Figure 2C:
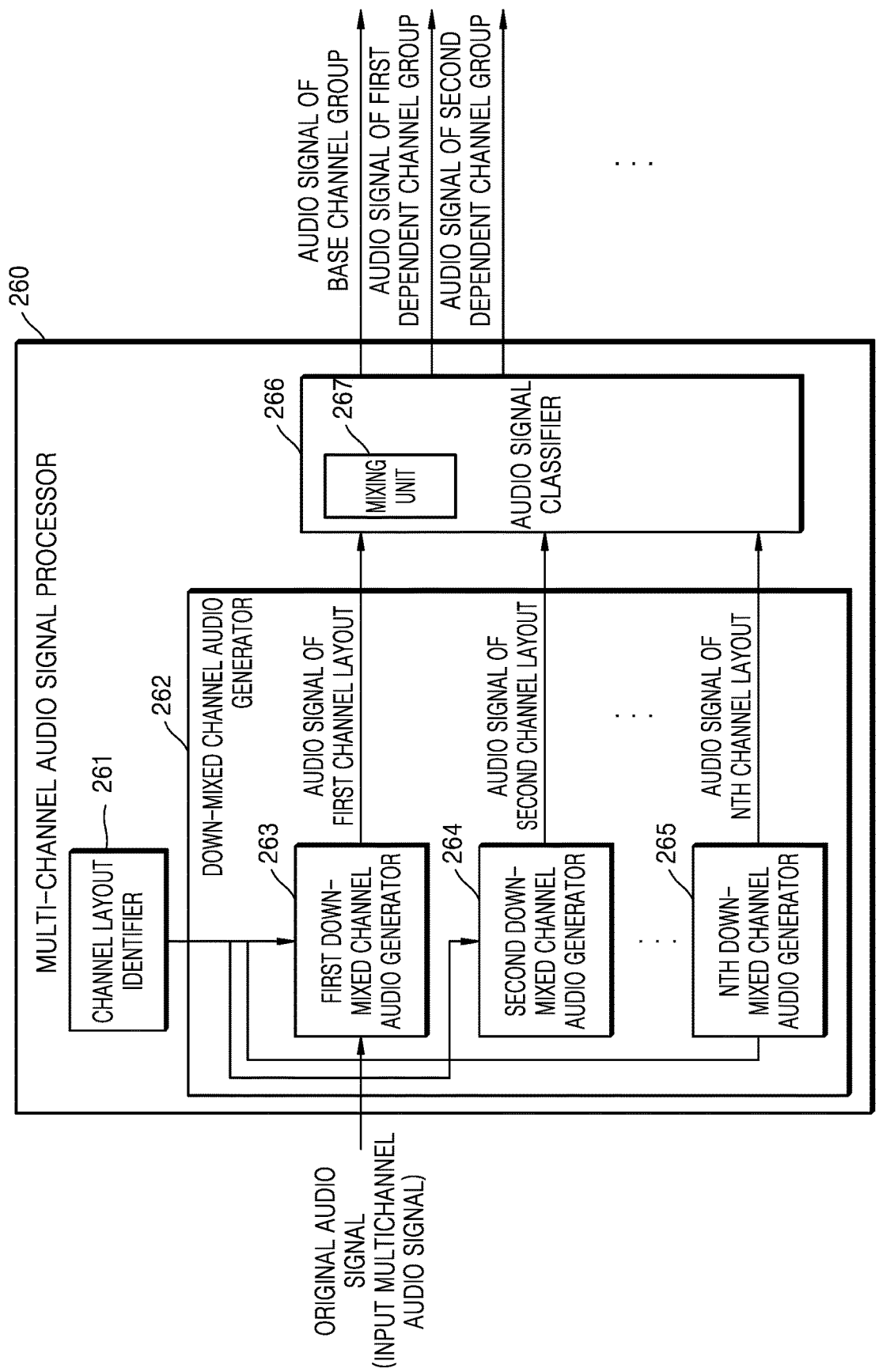
FIG. 2C is a block diagram of a structure of a multi-channel audio signal processor according to various embodiments of the disclosure.

FIG. 2C is a block diagram of a structure of the multi-channel audio signal processor 260 of the audio encoding apparatus 200 according to various embodiments of the disclosure.

Referring to FIG. 2C, the multi-channel audio signal processor 260 may include a channel layout identifier 261, a down-mixed channel audio generator 262, and an audio signal classifier 266.

The channel layout identifier 261 may identify at least one channel layout from the original audio signal. In this case, the at least one channel layout may include a plurality of hierarchical channel layouts. The channel layout identifier 261 may identify a channel layout of the original audio signal. The channel layout identifier 261 may identify a channel layout that is lower than the channel layout of the original audio signal. For example, when the original audio signal is an audio signal of the 7.1.4 channel layout, the channel layout identifier 261 may identify the 7.1.4 channel layout and identify the 5.1.2 channel layout, the 3.1.2 channel layout, the 2 channel layout, etc., that are lower than the 7.1.4 channel layout. An upper channel layout may refer to a layout in which the number of at least one of surround channels/subwoofer channels/height channels is greater than that of a lower channel layout. Depending on whether the number of surround channels is large or small, an upper/lower channel layout may be determined, and for the same number of surround channels, the upper/lower channel layout may be determined depending on whether the number of subwoofer channels is large or small. For the same number of surround channels and subwoofer channels, the upper/lower channel layout may be determined depending on whether the number of height channels is large or small.

Alternatively or additionally, the identified channel layout may include a target channel layout. The target channel layout may refer to the uppermost channel layout of an audio signal included in a finally out bitstream. The target channel layout may be a channel layout of the original audio signal or a lower channel layout than the channel layout of the original audio signal.

For example, a channel layout identified from the original audio signal may be hierarchically determined from the channel layout of the original audio signal. In this case, the channel layout identifier 261 may identify at least one channel layout among predetermined channel layouts. For example, the channel layout identifier 261 may identify some of predetermined channel layouts, the 7.1.4 channel layout, the 5.1.4 channel layout, the 5.1.2 channel layout, the 3.1.2 channel layout, and the 2 channel layout, from the layout of the original audio signal.

The channel layout identifier 261 may transmit a control signal to a down-mixed channel audio generator corresponding to identified at least one channel layout among a first down-mixed channel audio generator 263, and a second down-mixed channel audio generator 264 through to an $N^{th}$ down-mixed channel audio generator 265, based on the identified channel layout, and generate a down-mixed channel audio from the original audio signal based on the at least one channel layout identified by the channel layout identifier 261. The down-mixed channel audio generator 262 may generate the down-mixed channel audio from the original audio signal using a down-mixing matrix including at least one down-mixing weight parameter.

For example, when the channel layout of the original audio signal is an $n^{th}$ channel layout in an ascending order among predetermined channel layouts, the down-mixed channel audio generator 262 may generate a down-mixed channel audio of an $(n-1)^{th}$ channel layout immediately lower than the channel layout of the original audio signal from the original audio signal. By repeating this process, the down-mixed channel audio generator 252 may generate down-mixed channel audios of lower channel layouts than the current channel layout.

For example, the down-mixed channel audio generator 262 may include the first down-mixed channel audio generator 263, and the second down-mixed channel audio generator 264 through to an $(n-1)^{th}$ down-mixed channel audio generator (not shown). In some embodiments, (n−1) may be less than or equal to N.

In this case, an $(n-1)^{th}$ down-mixed channel audio generator (not shown) may generate an audio signal of an $(n-1)^{th}$ channel layout from the original audio signal. Alternatively or additionally, an $(n-2)^{th}$ down-mixed channel audio generator (not shown) may generate an audio signal of an $(n-2)^{th}$ channel layout from the original audio signal. In this manner, the first down-mixed channel audio generator 263 may generate the audio signal of the first channel layout from the original audio signal. In this case, the audio signal of the first channel layout may be the audio signal of the base channel group.

In some embodiments, each down-mixed channel audio generator 263, and 264 through to 265 may be connected in a cascade manner. That is, the down-mixed channel audio generators 263, and 264 through to 265 may be connected such that an output of an upper down-mixed channel audio generator becomes an input of the lower down-mixed channel audio generator. For example, the audio signal of the $(n-1)^{th}$ channel layout may be output from the $(n-1)^{th}$ down-mixed channel audio generator (not shown) with the original audio signal as an input, and the audio signal of the $(n-1)^{th}$ channel layout may be input to the $(n-2)^{th}$ down-mixed channel audio generator (not shown) and an $(n-2)^{th}$ down-mixed channel audio may be generated from an $(n-2)^{th}$ down-mixed channel audio generator (not shown). In this way, the down-mixed channel audio generators 263, and 264 through to 265 may be connected to output an audio signal of each channel layout.

The audio signal classifier 266 may obtain an audio signal of a base channel group and an audio signal of a dependent channel group, based on an audio signal of at least one channel layout. In this case, the audio classifier 266 may mix an audio signal of at least one channel included in an audio signal of at least one channel layout through a mixing unit 267. The audio classifier 266 may classify the mixed audio signal as at least one of an audio signal of the base channel group or an audio signal of the dependent channel group.

Figure 2D:
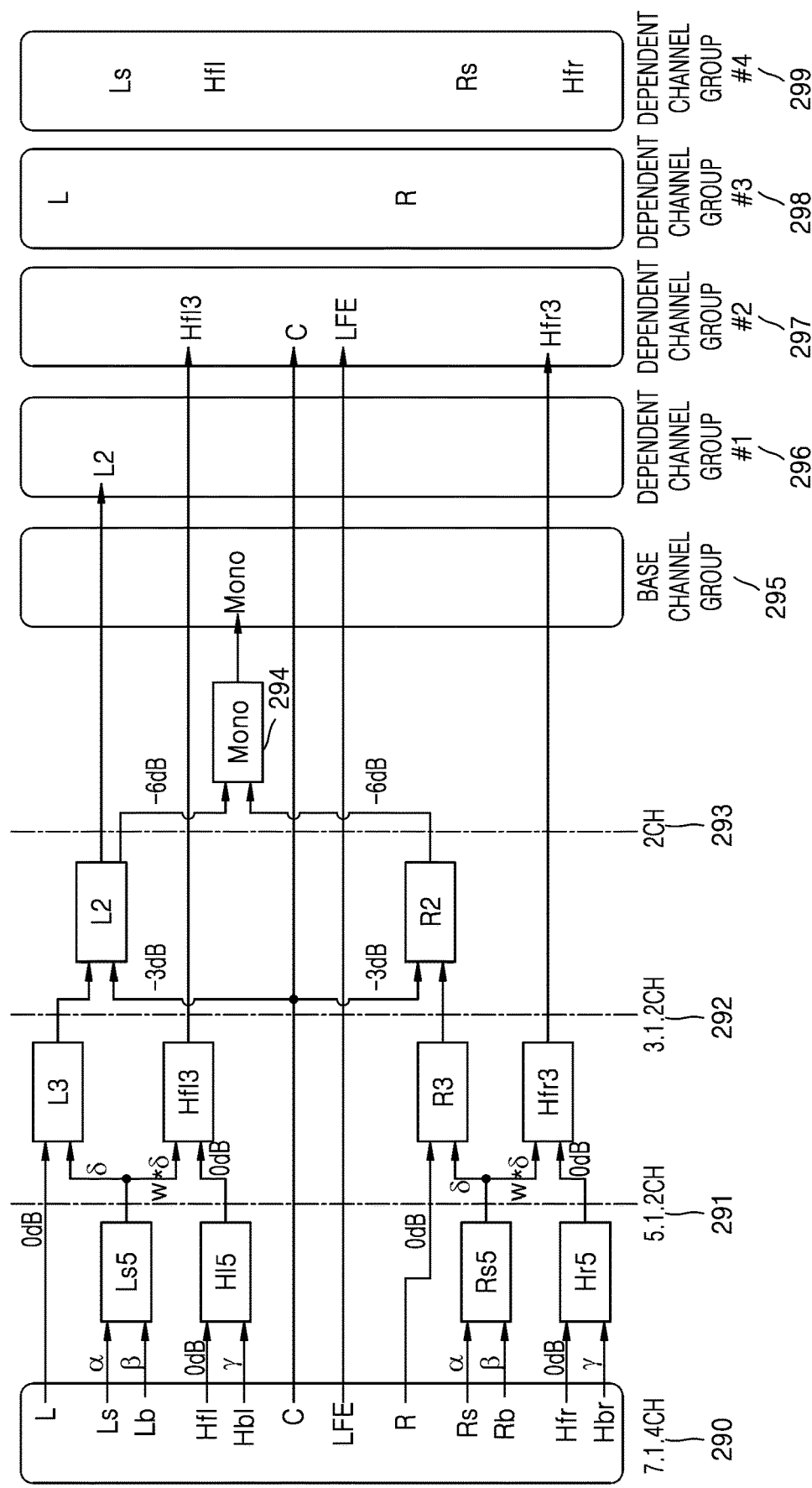
FIG. 2D is a view for describing an example of a detailed operation of an audio signal classifier according to various embodiments of the disclosure.

FIG. 2D is a view for describing an example of a detailed operation of an audio signal classifier, according to various embodiments of the disclosure.

Referring to FIG. 2D, the down-mixed channel audio generator 262 of FIG. 2C may obtain, from the original audio signal of the 7.1.4 channel layout 290, the audio signal of the 5.1.2 channel layout 291, the audio signal of the 3.1.2 channel layout 292, the audio signal of the 2 channel layout 293, and the audio signal of the mono channel layout 294, which are audio signals of lower channel layouts. The down-mixed channel audio generators 263, 264, and through to 265 of the down-mixed channel audio generator 262 are connected in a cascade manner, such that audio signals may be obtained sequentially from the current channel layout to the lower channel layout.

The audio signal classifier 266 of FIG. 2C may classify the audio signal of the mono channel layout 294 as the audio signal of the base channel group.

The audio signal classifier 266 may classify the audio signal of the L2 channel that is a part of the audio signal of the 2 channel layout 293 as an audio signal of the dependent channel group #1 296. In some embodiments, the audio signal of the L2 channel and the audio signal of the R2 channel are mixed to generate the audio signal of the mono channel layout 294, such that in reverse, the audio decoding apparatuses 300 and 500 may de-mix the audio signal of the mono channel layout 294 and the audio signal of the L2 channel to reconstruct the audio signal of the R2 channel. Thus, the audio signal of the R2 channel may not be classified as an audio signal of a separate channel group.

The audio signal classifier 266 may classify the audio signal of the Hfl3 channel, the audio signal of the C channel, the audio signal of the LFE channel, and the audio signal of the Hfr3 channel, among the audio signals of the 3.1.2 channel layout 292, as an audio signal of a dependent channel group #2 297. The audio signal of the L2 channel is generated by mixing the audio signal of the L3 channel and the audio signal of the Hfl3 channel, such that in reverse, the audio decoding apparatuses 300 and 500 may reconstruct the audio signal of the L2 channel of the dependent channel group #1 296 and the audio signal of the Hfl3 channel of the dependent channel group #2 297.

Thus, the audio signal of the L3 channel among the audio signals of the 3.1.2 channel layout 292 may not be classified as an audio signal of a particular channel group.

For the same reason, the R3 channel may not be classified as the audio signal of the particular channel group.

The audio signal classifier 266 may transmit the audio signal of the L channel and the audio signal of the R channel, which are audio signals of some channels of the 5.1.2 channel layout 291, as an audio signal of a dependent channel group #3 298, in order to transmit the audio signal of the 5.1.2 channel layout 291. In some embodiments, the audio signal of one of the Ls5, Hl5, Rs5, and Hr5 channels may be one of the audio signals of the 5.1.2 channel layout 291, but may not be classified as an audio signal of a separate dependent channel group. This is because signals of the Ls5, Hl5, Rs5, and Hr5 channels may not be a listener front channel audio signal, and may be a signal in which audio signals of at least one of audio channels in front of, beside, and behind the listener, among the audio signals of the 7.1.4 channel layout 290, may be mixed. By compressing the audio signal of the audio channel in front of the listener out of the original audio signal, rather than classifying the mixed signal as the audio signal of the dependent channel group and compressing the same, the sound quality of the audio signal of the audio channel in front of the listener may be improved. Consequently, the listener may feel that the sound quality of the reproduced audio signal is improved.

However, according to circumstances, Ls5 or Hl5 instead of L may be classified as the audio signal of the dependent channel group #3 298, Rs5 or Hr5 instead of R may be classified as the audio signal of the dependent channel group #3 298.

The audio signal classifier 266 may classify the audio signal of the Ls, Hfl, Rs, or Hfr channel among the audio signals of the 7.1.4 channel layout 290 as an audio signal of a dependent channel group #4 299. In this case, Lb in place of Ls, Hbl in place of Hfl, Rb in place of Rs, and Hbr in place of Hfr may not be classified as the audio signal of the dependent channel group #4 299. By compressing the audio signal of the side audio channel close to the front of the listener rather than classifying the audio signal of the audio channel behind the listener among the audio signals of the 7.1.4 channel layout 290 as the audio signal of the channel group and compressing the same, the sound quality of the audio signal of the side audio channel close to the front of the listener may be improved. Thus, the listener may feel that the sound quality of the reproduced audio signal is improved. However, according to circumstances, Lb in place of Ls, Hbl in place of Hfl, Rb in place of Rs, and Hbr in place of Hfr may be classified as the audio signal of the dependent channel group #4 299.

Consequently, the down-mixed channel audio generator 262 of FIG. 2C may generate an audio signal (a down-mixed channel audio) of a plurality of lower layouts based on a plurality of lower channel layouts identified from the original audio signal layout. The audio signal classifier 266 of FIG. 2C may classify the audio signal of the base channel group and the audio signals of the dependent channel groups #1, #2, #3, and #4. The classified audio signal of the channel may classify a part of the audio signal of the independent channel out of the audio signal of each channel as the audio signal of the channel group according to each channel layout. The audio decoding apparatuses 300 and 500 may reconstruct the audio signal that is not classified by the audio signal channel classifier 266 through de-mixing. In some embodiments, when the audio signal of the left channel with respect to the listener is classified as the audio signal of the particular channel group, the audio signal of the right channel corresponding to the left channel may be classified as the audio signal of the corresponding channel group. That is, the audio signals of the coupled channels may be classified as audio signals of one channel group.

When the audio signal of the stereo channel layout is classified as the audio signal of the base channel group, the audio signals of the coupled channels all may be classified as audio signals of one channel group. However, as described above with reference to FIG. 2D, when the audio signal of the mono channel layout is classified as the audio signal of the base channel group, exceptionally, one of audio signals of the stereo channel may be classified as the audio signal of the dependent channel group #1. However, a method of classifying an audio signal of a channel group may be various without being limited to the description made with reference to FIG. 2D. That is, when the classified audio signal of the channel group is de-mixed and an audio signal of a channel, which is not classified as an audio signal of a channel group, may be reconstructed from the de-mixed audio signal, then the audio signal of the channel group may be classified in various forms.

Figure 3A:
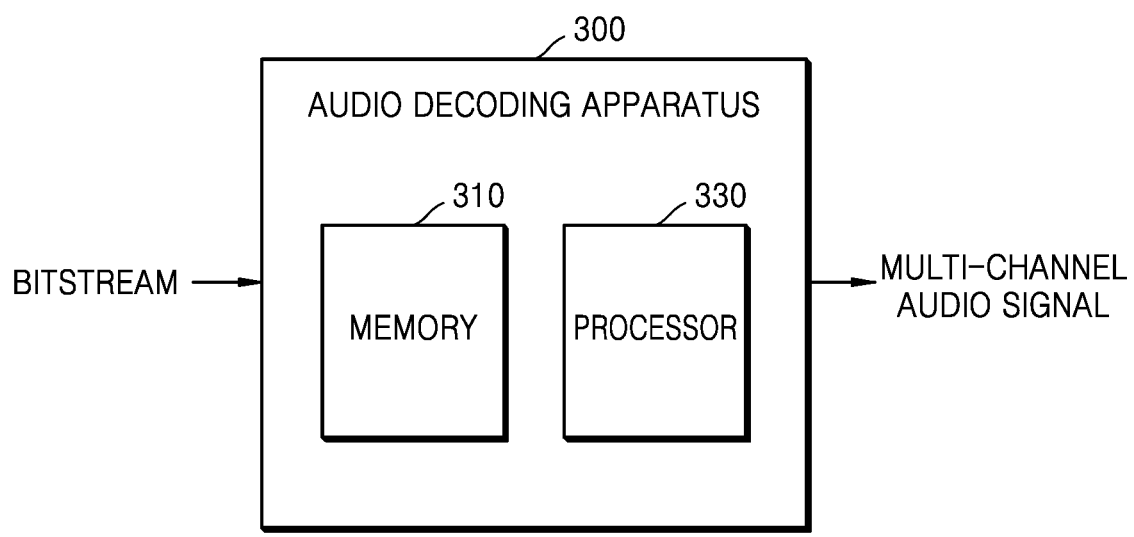
FIG. 3A is a block diagram of a structure of a multi-channel audio decoder according to various embodiments of the disclosure.

FIG. 3A is a block diagram of a structure of a multi-channel audio decoding apparatus according to various embodiments of the disclosure.

The audio decoding apparatus 300 may include a memory 310 and a processor 330. The audio decoding apparatus 300 may be implemented as an apparatus capable of audio processing, such as a server, a TV, a camera, a mobile phone, a computer, a digital broadcasting terminal, a tablet PC, a laptop computer, etc.

Although the memory 310 and the processor 330 are separately illustrated in FIG. 3A, the memory 310 and the processor 330 may be implemented through one hardware module (for example, a chip).

The processor 330 may be implemented as a dedicated processor for neural network-based audio processing. Alternatively or additionally, the processor 230 may be implemented through a combination of a general-purpose processor, such as an AP, a CPU, or a GPU, and software. The dedicated processor may include a memory for implementing various embodiments of the disclosure or a memory processor for using an external memory.

The processor 330 may include a plurality of processors. In this case, the processor 330 may be implemented as a combination of dedicated processors, or may be implemented through a combination of software and a plurality of general-purpose processors such as an AP, a CPU, or a GPU.

The memory 310 may store one or more instructions for audio processing. According to various embodiments of the disclosure, the memory 310 may store a neural network.

When the neural network is implemented in the form of a dedicated hardware chip for artificial intelligence (AI) or is implemented as a part of an existing general-purpose processor (for example, a CPU or an AP) or a graphic dedicated processor (for example, a GPU), the neural network may not be stored in the memory 310. The neural network may be implemented as an external apparatus (for example, a server). In this case, the audio decoding apparatus 300 may request neural network-based result information from the external apparatus and receive the neural network-based result information from the external apparatus.

The processor 330 may sequentially process successive frames according to an instruction stored in the memory 310 to obtain successive reconstructed frames. The successive frames may refer to frames that constitute audio.

The processor 330 may output a multi-channel audio signal by performing an audio processing operation on an input bitstream. The bitstream may be implemented in a scalable form to increase the number of channels from the base channel group. For example, the processor 330 may obtain the compressed audio signal of the base channel group from the bitstream, and may reconstruct the audio signal of the base channel group (e.g., the stereo channel audio signal) by decompressing the compressed audio signal of the base channel group. Alternatively or additionally, the processor 330 may reconstruct the audio signal of the dependent channel group by decompressing the compressed audio signal of the dependent channel group from the bitstream. The processor 330 may reconstruct a multi-channel audio signal based on the audio signal of the base channel group and the audio signal of the dependent channel group.

In some embodiments, the processor 330 may reconstruct the audio signal of the first dependent channel group by decompressing the compressed audio signal of the first dependent channel group from the bitstream. The processor 330 may reconstruct the audio signal of the second dependent channel group by decompressing the compressed audio signal of the second dependent channel group.

The processor 330 may reconstruct a multi-channel audio signal of an increased number of channels, based on the audio signal of the base channel group and the respective audio signals of the first and second dependent channel groups. Likewise, the processor 330 may decompress compressed audio signals of n dependent channel groups (where n is an integer greater than 2), and may reconstruct a multi-channel audio signal of a further increased number of channels, based on the audio signal of the base channel group and the respective audio signals of the apparatuses n dependent channel groups.

Figure 3B:
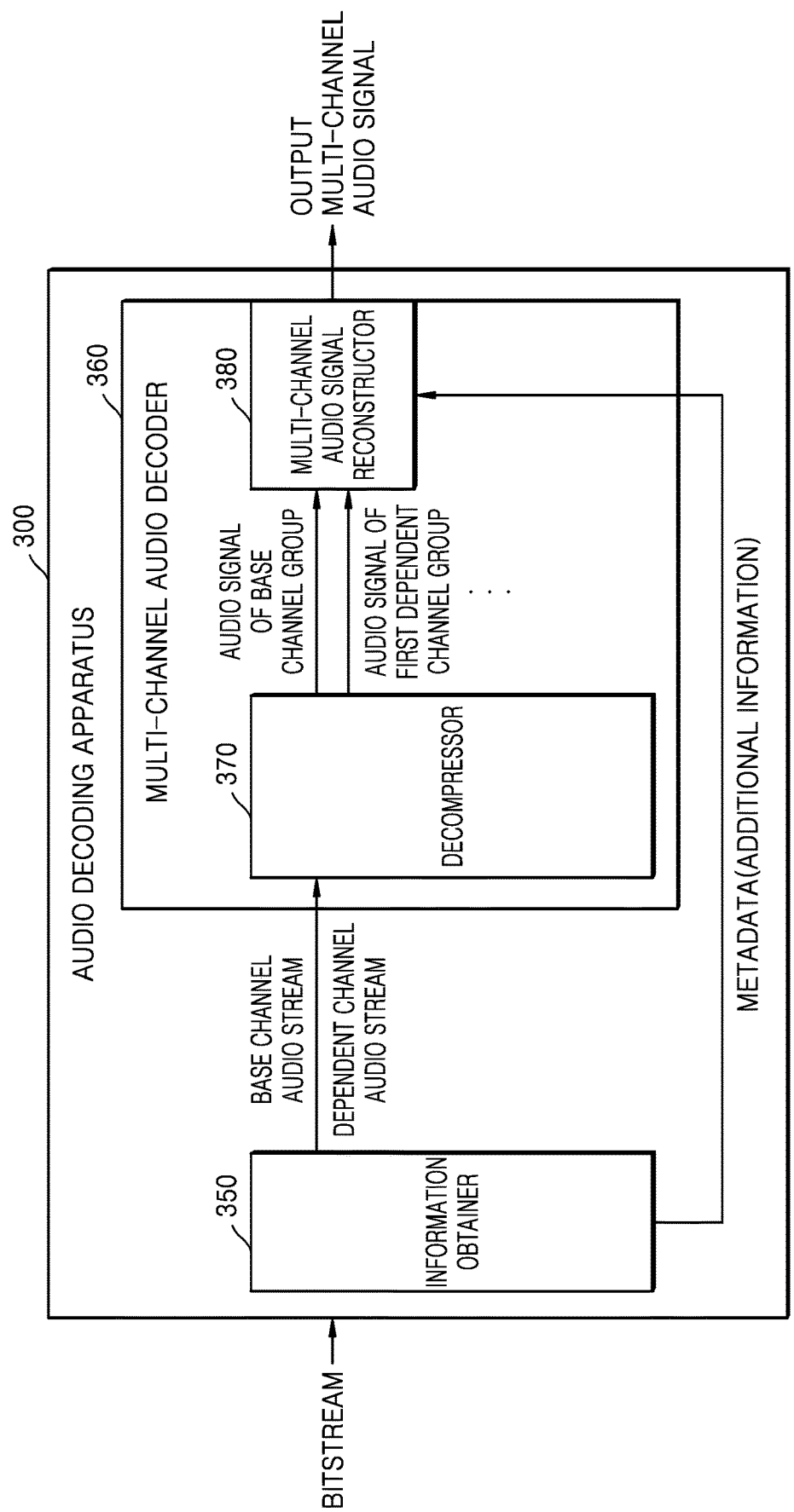
FIG. 3B is a block diagram of a structure of a multi-channel audio decoder according to various embodiments of the disclosure.

FIG. 3B is a block diagram of a structure of a multi-channel audio decoding apparatus according to various embodiments of the disclosure.

Referring to FIG. 3B, the audio decoding apparatus 300 may include an information obtainer 350 and a multi-channel audio decoder 360. The multi-channel audio decoder 360 may include a decompressor 370 and a multi-channel audio signal reconstructor 380.

The audio decoding apparatus 300 may include the memory 310 and the processor 330 of FIG. 3A, and an instruction for implementing the components 350, 360, 370, and 380 of FIG. 3B may be stored in the memory 310. The processor 330 may execute the instructions stored in the memory 310.

The information obtainer 350 may obtain the compressed audio signal of the base channel group from the bitstream. That is, the information obtainer 350 may classify a base channel audio stream including at least one compressed audio signal of the base channel group from the bitstream.

The information obtainer 350 may also obtain at least one compressed audio signal of at least one dependent channel group from the bitstream. That is, the information obtainer 350 may classify at least one dependent channel audio stream including at least one compressed audio signal of the dependent channel group from the bitstream.

In some embodiments, the bitstream may include a base channel audio stream and a plurality of dependent channel streams. The plurality of dependent channel audio streams may include a first dependent channel audio stream and a second dependent channel audio stream.

In this case, limitation of channels of a multi-channel first audio signal reconstructed through the base channel audio stream and the first dependent channel audio stream and a multi-channel second audio signal reconstructed through the base channel audio stream, the first dependent channel audio stream, and the second dependent channel audio stream are described.

For example, among the channels of the first multi-channel layout reconstructed from the base channel audio stream and the first dependent channel audio stream, the number of surround channels may be $S_{n-1}$, the number of subwoofer channels may be $W_{n-1}$, and the number of height channels may be $H_{n-1}$. In the second multi-channel layout reconstructed from the base channel audio stream, the first dependent channel audio stream, and the second dependent channel audio stream, the number of surround channels may be $S_n$, the number of subwoofer channels may be $W_n$, and the number of height channels may be $H_n$. In this case, $S_{n-1}$ may be less than or equal to $S_n$, $W_{n-1}$ may be less than or equal to $W_n$, and $H_{n-1}$ may be less than or equal to $H_n$. Herein, a case where $S_{n-1}$ is equal to $S_n$, $W_{n-1}$ is equal to $W_n$, and $H_{n-1}$ is equal to $H_n$ may be excluded. That is, all of $S_{n-1}$, $W_{n-1}$, and $H_{n-1}$ may not be equal to $S_n$, $W_n$, and $H_n$, respectively.

That is, the number of surround channels of the second multi-channel layout needs to be greater than the number of surround channels of the first multi-channel layout. Alternatively or additionally, the number of subwoofer channels of the second multi-channel layout needs to be greater than the number of subwoofer channels of the first multi-channel layout. Alternatively or additionally, the number of height channels of the second multi-channel layout needs to be greater than the number of height channels of the first multi-channel layout.

Moreover, the number of surround channels of the second multi-channel layout may not be less than the number of surround channels of the first multi-channel layout. Likewise, the number of subwoofer channels of the second multi-channel layout may not be less than the number of subwoofer channels of the first multi-channel layout. The number of height channels of the second multi-channel layout may not be less than the number of height channels of the first multi-channel layout.

Alternatively or additionally, the case where the number of surround channels of the second multi-channel layout is equal to the number of surround channels of the first multi-channel layout and the number of subwoofer channels of the second multi-channel layout is equal to the number of subwoofer channels of the first multi-channel layout and the number of height channels of the second multi-channel layout is equal to the number of height channels of the first multi-channel layout does not exist. That is, all channels of the second multi-channel layout may not be the same as all channels of the first multi-channel layout.

In particular, for example, when the first multi-channel layout is the 5.1.2 channel layout, the second multi-channel layout may be the 7.1.4 channel layout.

In some embodiments, the bitstream may include a file stream having a plurality of audio tracks including a first audio track and a second audio track. A process in which the information obtainer 350 obtains at least one compressed audio signal of at least one dependent channel group according to additional information included in an audio track is described below.

The information obtainer 350 may obtain at least one compressed audio signal of the base channel group from the first audio track.

The information obtainer 350 may obtain dependent channel audio signal identification information from a second audio track that is adjacent to the first audio track.

When the dependent channel audio signal identification information indicates that the dependent channel audio signal exists in the second audio track, the information obtainer 350 may obtain at least one audio signal of at least one dependent channel group from the second audio track.

When the dependent channel audio signal identification information indicates that the dependent channel audio signal does not exist in the second audio track, the information obtainer 350 may obtain the next audio signal of the base channel group from the second audio track.

The information obtainer 350 may obtain additional information related to reconstruction of multi-channel audio from the bitstream. That is, the information obtainer 350 may classify metadata including the additional information from the bitstream and obtain the additional information from the classified metadata.

The decompressor 370 may reconstruct the audio signal of the base channel group by decompressing at least one compressed audio signal of the base channel group.

The decompressor 370 may reconstruct at least one audio signal of the at least one dependent channel group by decompressing at least one compressed audio signal of the at least one dependent channel group.

In this case, the decompressor 370 may include separate first through to $n^{th}$ decompressors (not shown) for decoding a compressed audio signal of each channel group (n channel groups). In this case, the first through to $n^{th}$ decompressors (not shown) may operate in parallel with one another.

The multi-channel audio signal reconstructor 380 may reconstruct a multi-channel audio signal, based on at least one audio signal of the base channel group and at least one audio signal of the at least one dependent channel group.

For example, when the audio signal of the base channel group is an audio signal of a stereo channel, the multi-channel audio signal reconstructor 380 may reconstruct an audio signal of a listener front 3D audio channel, based on the audio signal of the base channel group and the audio signal of the first dependent channel group. For example, the listener front 3D audio channel may be a 3.1.2 channel.

Alternatively or additionally, the multi-channel audio signal reconstructor 380 may reconstruct an audio signal of a listener omni-direction audio channel, based on the audio signal of the base channel group, the audio signal of the first dependent channel group, and the audio signal of the second dependent channel group. For example, the listener omni-direction 3D audio channel may be the 5.1.2 channel or the 7.1.4 channel.

The multi-channel audio signal reconstructor 380 may reconstruct a multi-channel audio signal, based on not only the audio signal of the base channel group and the audio signal of the dependent channel group, but also the additional information. In this case, the additional information may be additional information for reconstructing the multi-channel audio signal. The multi-channel audio signal reconstructor 380 may output the reconstructed at least one multi-channel audio signal.

The multi-channel audio signal reconstructor 380 according to various embodiments of the disclosure may generate a first audio signal of a listener front 3D audio channel from at least one audio signal of the base channel group and at least one audio signal of the at least one dependent channel group. The multi-channel audio signal reconstructor 380 may reconstruct a multi-channel audio signal including a second audio signal of a listener front 3D audio channel, based on the first audio signal and the audio object signal of the listener front 3D audio channel. In this case, the audio object signal may indicate at least one of an audio signal, a shape, an area, a position, or a direction of an audio object (a sound source), and may be obtained from the information obtainer 350.

A detailed operation of the multi-channel audio signal reconstructor 380 is described with reference to FIG. 3C.

Figure 3C:
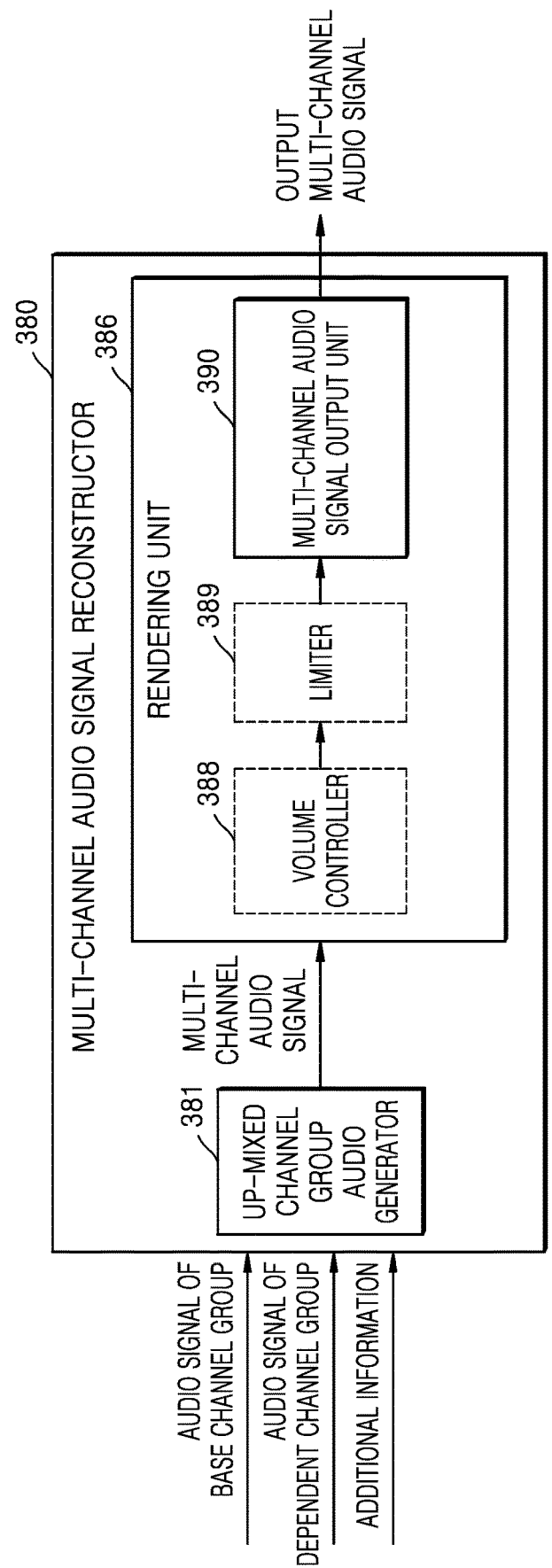
FIG. 3C is a block diagram of a structure of a multi-channel audio signal reconstructor according to various embodiments of the disclosure.

FIG. 3C is a block diagram of a structure of a multi-channel audio signal reconstructor according to various embodiments of the disclosure.

Referring to FIG. 3C, the multi-channel audio signal reconstructor 380 may include an up-mixed channel group audio generator 381 and a rendering unit 386.

The up-mixed channel group audio generator 381 may generate an audio signal of an up-mixed channel group based on the audio signal of the base channel group and the audio signal of the dependent channel group. In this case, the audio signal of the up-mixed channel group may be a multi-channel audio signal. Alternatively or additionally, the multi-channel audio signal may be generated based on the additional information (e.g., information about a dynamic de-mixing weight parameter).

The up-mixed channel group audio generator 381 may generate an audio signal of an up-mixed channel by de-mixing the audio signal of the base channel group and some of the audio signals of the dependent channel group. For example, the audio signals L3 and R3 of the de-mixed channel (or the up-mixed channel) may be generated by de-mixing the audio signals L and R of the base channel group and a part of the audio signals of the dependent channel group, C.

The up-mixed channel group audio generator 381 may generate an audio signal of some channel of the multi-channel audio signal, by bypassing a de-mixing operation with respect to some of the audio signals of the dependent channel group. For example, the up-mixed channel group audio generator 381 may generate audio signals of the C, LFE, Hfl3, and Hfr3 channels of the multi-channel audio signal, by bypassing the de-mixing operation with respect to the audio signals of the C, LFE, Hfl3, and Hfr3 channels that are some audio signals of the dependent channel group.

Consequently, the up-mixed channel group audio generator 381 may generate the audio signal of the up-mixed channel group based on the audio signal of the up-mixed channel generated through de-mixing and the audio signal of the dependent channel group in which the de-mixing operation is bypassed. For example, the up-mixed channel group audio generator 381 may generate the audio signals of the L3, R3, C, LFE, Hfl3, and Hfr3 channels, which are audio signals of the 3.1.2 channel, based on the audio signals of the L3 and R3 channels, which are audio signals of the de-mixed channels, and the audio signals of the C, LFE, Hfl3, and Hfr3 channels, which are audio signals of the dependent channel group.

A detailed operation of the up-mixed channel group audio generator 381 is described with reference to FIG. 3D.

The rendering unit 386 may include a volume controller 388 and a limiter 389. The multi-channel audio signal input to the rendering unit 386 may be a multi-channel audio signal of at least one channel layout. The multi-channel audio signal input to the rendering unit 386 may be a pulse-code modulation (PCM) signal.

In some embodiments, a volume (loudness) of an audio signal of each channel may be measured based on ITU-R BS.1770, which may be signalled through additional information of a bitstream.

The volume controller 388 may control the volume of the audio signal of each channel to a target volume (for example, −24LKFS), based on volume information signalled through the bitstream.

In some embodiments, a true peak may be measured based on ITU-R BS.1770.

The limiter 389 may limit a true peak level of the audio signal (e.g., to −1dBTP) after volume control.

While post-processing components 388 and 389 included in the rendering unit 386 have been described so far, at least one component may be omitted and the order of each component may be changed according to circumstances, without being limited thereto.

A multi-channel audio signal output unit 390 may output post-processed at least one multi-channel audio signal. For example, the multi-channel audio signal output unit 390 may output an audio signal of each channel of a multi-channel audio signal to an audio output device corresponding to each channel, with a post-processed multi-channel audio signal as an input, according to a target channel layout. The audio output device may include various types of speakers.

Figure 3D:
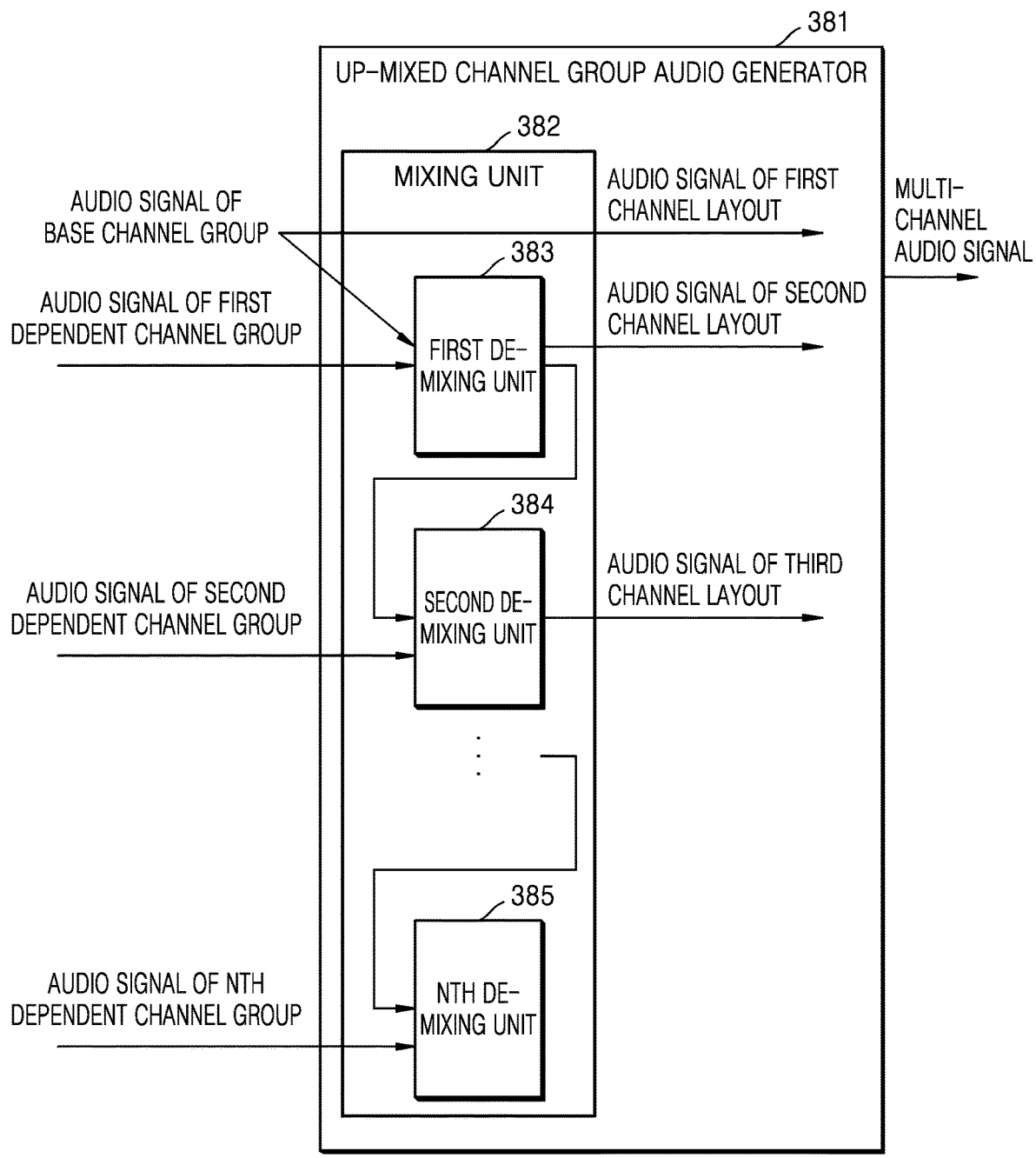
FIG. 3D is a block diagram of a structure of an up-mixed channel group audio generator according to various embodiments of the disclosure.

FIG. 3D is a block diagram of a structure of an up-mixed channel group audio generator according to various embodiments of the disclosure.

Referring to FIG. 3D, the up-mixed channel group audio generator 381 may include a de-mixing unit 382. The de-mixing unit 382 may include a first de-mixing unit 383, and a second de-mixing unit 384 through to an $N^{th}$ de-mixing unit 385.

The de-mixing unit 382 may obtain an audio signal of a new channel (e.g., an up-mixed channel or a de-mixed channel) from the audio signal of the base channel group and audio signals of some of channels (e.g., decoded channels) of the audio signals of the dependent channel group. That is, the de-mixing unit 382 may obtain an audio signal of one up-mixed channel from at least one audio signal where several channels are mixed. The de-mixing unit 382 may output an audio signal of a particular layout including the audio signal of the up-mixed channel and the audio signal of the decoded channel.

For example, the de-mixing operation may be bypassed in the de-mixing unit 382 such that the audio signal of the base channel group may be output as the audio signal of the first channel layout.

The first de-mixing unit 383 may de-mix audio signals of some channels with the audio signal of the base channel group and the audio signal of the first dependent channel group as inputs. In this case, the audio signal of the de-mixed channel (or the up-mixed channel) may be generated. The first de-mixing unit 383 may generate the audio signal of the independent channel by bypassing a mixing operation with respect to the audio signals of the other channels. The first de-mixing unit 383 may output an audio signal of a second channel layout, which is a signal including the audio signal of the up-mixed channel and the audio signal of the independent channel.

The second de-mixing unit 384 may generate the audio signal of the de-mixed channel (or the up-mixed channel) by de-mixing audio signals of some channels among the audio signals of the second channel layout and the audio signal of the second dependent channel. The second de-mixing unit 384 may generate the audio signal of the independent channel by bypassing the mixing operation with respect to the audio signals of the other channels. The second de-mixing unit 384 may output an audio signal of a third channel layout, which includes the audio signal of the up-mixed channel and the audio signal of the independent channel.

An $n^{th}$ de-mixing unit (not shown) may output an audio signal of an $n^{th}$ channel layout, based on an audio signal of an $(n-1)^{th}$ channel layout and an audio signal of an $(n-1)^{th}$ dependent channel group, similarly with an operation of the second de-mixing unit 384. n may be less than or equal to N.

The $N^{th}$ de-mixing unit 385 may output an audio signal of an $N^{th}$ channel layout, based on an audio signal of an $(N-1)^{th}$ channel layout and an audio signal of an $(N-1)^{th}$ dependent channel group.

Although it is shown that an audio signal of a lower channel layout is directly input to the respective de-mixing units 383, and 384 through to 385, an audio signal of a channel layout output through the rendering unit 386 of FIG. 3C may be input to each of the de-mixing units 383, and 384 through to 385. That is, the post-processed audio signal of the lower channel layout may be input to each of the de-mixing units 383, and 384 through to 385.

With reference to FIG. 3D, it is described that the de-mixing units 383, and 384 through to 385 may be connected in a cascade manner to output an audio signal of each channel layout.

However, without connecting the de-mixing units 383, and 384 through to 385 in a cascade manner, an audio signal of a particular layout may be output from the audio signal of the base channel group and the audio signal of the at least one dependent channel group.

In some embodiments, the audio signal generated by mixing signals of several channels in the audio encoding apparatuses 200 and 400 may have a lowered level using a down-mix gain for preventing clipping. The audio decoding apparatuses 300 and 500 may match the level of the audio signal to the level of the original audio signal based on a corresponding down-mix gain for the signal generated by mixing.

In other embodiments, an operation based on the above-described down-mix gain may be performed for each channel or channel group. The audio encoding apparatuses 200 and 400 may signal information about a down-mix gain through additional information of a bitstream for each channel or each channel group. Thus, the audio decoding apparatuses 300 and 500 may obtain the information about the down-mix gain from the additional information of the bitstream for each channel or each channel group, and perform the above-described operation based on the down-mix gain.

In other embodiments, the de-mixing unit 382 may perform the de-mixing operation based on a dynamic de-mixing weight parameter of a de-mixing matrix (corresponding to a down-mixing weight parameter of a down-mixing matrix). In this case, the audio encoding apparatuses 200 and 400 may signal the dynamic de-mixing weight parameter or the dynamic down-mixing weight parameter corresponding thereto through the additional information of the bitstream. Some de-mixing weight parameters may not be signalled and have a fixed value.

Thus, the audio decoding apparatuses 300 and 500 may obtain information about the dynamic de-mixing weight parameter (or information about the dynamic down-mixing weight parameter) from the additional information of the bitstream, and perform the de-mixing operation based on the obtained information about the dynamic de-mixing weight parameter (or the information about the dynamic down-mixing weight parameter).

FIG. 4A is a block diagram of an audio encoding apparatus according to various embodiments of the disclosure.

Referring to FIG. 4A, the audio encoding apparatus 400 may include a multi-channel audio encoder 450, a bitstream generator 480, and an error removal-related information generator 490. The multi-channel audio encoder 450 may include a multi-channel audio signal processor 460 and a compressor 470.

The components 450, 460, 470, 480, and 490 of FIG. 4A may be implemented by the memory 210 and the processor 230 of FIG. 2A.

Operations of the multi-channel audio encoder 450, the multi-channel audio signal processor 460, the compressor 470, and the bitstream generator 480 of FIG. 4A correspond to the operations of the multi-channel audio encoder 250, the multi-channel audio signal processor 260, the compressor 270, and the bitstream generator 280, respectively, and thus a detailed description thereof is replaced with the description of FIG. 2B.

The error removal-related information generator 490 may be included in the additional information generator 285 of FIG. 2B, but may also exist separately, without being limited thereto.

The error removal-related information generator 490 may determine an error removal factor (e.g., a scaling factor) based on a first power value and a second power value. In this case, the first power value may be an energy value of one channel of the original audio signal or an audio signal of one channel obtained by down-mixing from the original audio signal. The second power value may be a power value of an audio signal of an up-mixed channel as one of audio signals of an up-mixed channel group. The audio signal of the up-mixed channel group may be an audio signal obtained by de-mixing a base channel reconstructed signal and a dependent channel reconstructed signal.

The error removal-related information generator 490 may determine an error removal factor for each channel.

The error removal-related information generator 490 may generate information related to error removal (or error removal-related information) including information about the determined error removal factor. The bitstream generator 480 may generate a bitstream further including the error removal-related information. A detailed operation of the error removal-related information generator 490 is described with reference to FIG. 4B.

Figure 4B:
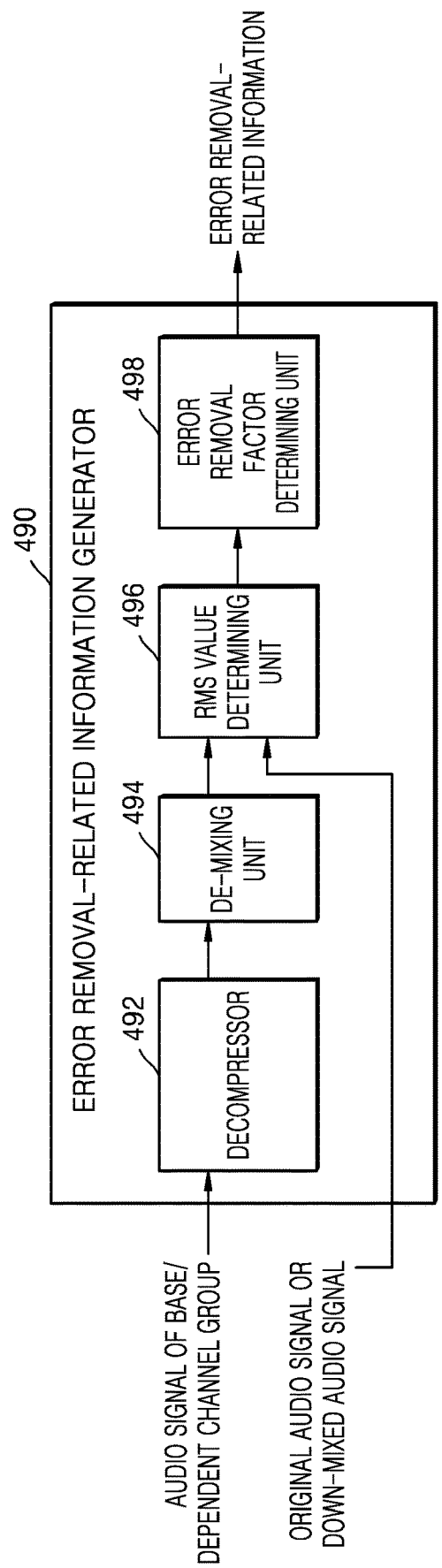
FIG. 4B is a block diagram of a structure of a reconstructor according to various embodiments of the disclosure.

FIG. 4B is a block diagram of a structure of a reconstructor according to various embodiments of the disclosure.

Referring to FIG. 4B, the error removal-related information generator 490 may include a decompressor 492, a de-mixing unit 494, a root mean square (RMS) value determining unit 496, and an error removal factor determining unit 498.

The decompressor 492 may generate the base channel reconstructed signal by decompressing the compressed audio signal of the base channel group. Alternatively or additionally, the decompressor 492 may generate the dependent channel reconstructed signal by decompressing the compressed audio signal of the dependent channel group.

The de-mixing unit 494 may de-mix the base channel reconstructed signal and the dependent channel reconstructed signal to generate the audio signal of the up-mixed channel group. For example, the de-mixing unit 494 may generate an audio signal of an up-mixed channel (or a de-mixed channel) by de-mixing audio signals of some channels among audio signals of the base channel group and the dependent channel group. The de-mixing unit 494 may bypass a de-mixing operation with respect to some audio signals among the audio signals of the base channel group and the dependent channel group.

The de-mixing unit 494 may obtain an audio signal of an up-mixed channel group including the audio signal of the up-mixed channel and the audio signal for which the de-mixing operation is bypassed.

The RMS value determining unit 496 may determine an RMS value of a first audio signal of one up-mixed channel of the up-mixed channel group. The RMS value determining unit 496 may determine an RMS value of a second audio signal of one channel of the original audio signal or an RMS value of a second audio signal of one channel of an audio signal down-mixed from the original audio signal. In this case, the channel of the first audio signal and the channel of the second audio signal may indicate the same channel in a channel layout.

The error removal factor determining unit 498 may determine an error removal factor based on the RMS value of the first audio signal and the RMS value of the second audio signal. For example, a value generated by dividing the RMS value of the first audio signal by the RMS value of the second audio signal may be obtained as a value of the error removal factor. The error removal factor determining unit 498 may generate information about the determined error removal factor. The error removal factor determining unit 498 may output the error removal-related information including the information about the error removal factor.

Figure 5A:
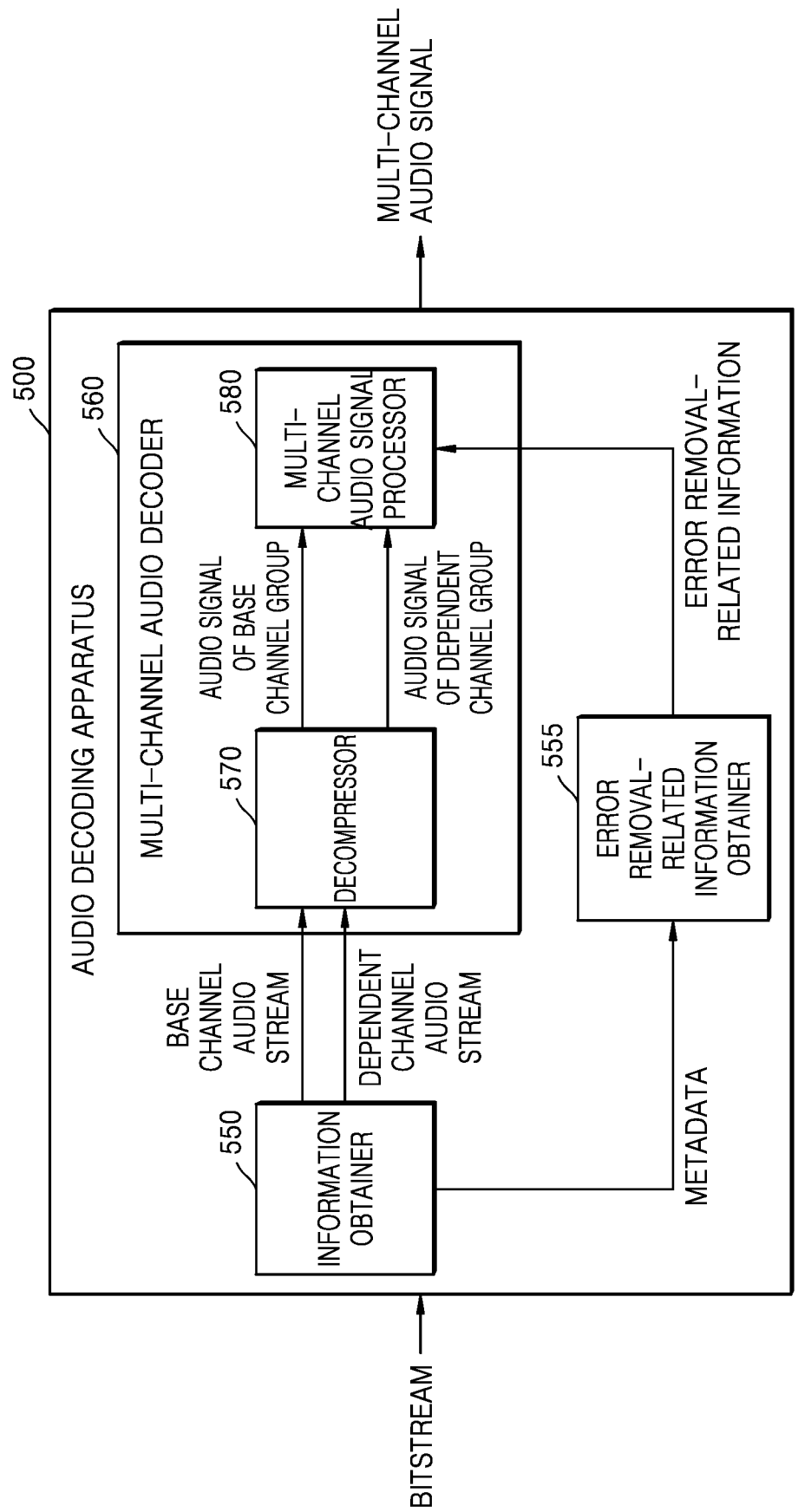
FIG. 5A is a block diagram of a structure of an audio decoding apparatus according to various embodiments of the disclosure.

FIG. 5A is a block diagram of a structure of an audio decoding apparatus according to various embodiments of the disclosure.

Referring to FIG. 5A, the audio decoding apparatus 500 may include an information obtainer 550, a multi-channel audio decoder 560, a decompressor 570, a multi-channel audio signal reconstructor 580, and an error removal-related information obtainer 555. The components 550, 555, 560, 570, and 580 of FIG. 5A may be implemented by the memory 310 and the processor 330 of FIG. 3A.

An instruction for implementing the components 550, 555, 560, 570, and 580 of FIG. 5A may be stored in the memory 310 of FIG. 3A. The processor 330 may execute the instruction stored in the memory 310.

Operations of the information obtainer 550, the decompressor 570, and the multi-channel audio signal reconstructor 580 of FIG. 5A respectively include the operations of the information obtainer 350, the decompressor 370, and the multi-channel audio signal reconstructor 380 of FIG. 3B, and thus a redundant description is replaced with the description made with reference to FIG. 3B. Hereinafter, a description that is not redundant to the description of FIG. 3B is provided.

The information obtainer 550 may obtain metadata from the bitstream.

The error removal-related information obtainer 555 may obtain the error removal-related information from the metadata included in the bitstream. Herein, the information about the error removal factor included in the error removal-related information may be an error removal factor of an audio signal of one up-mixed channel of an up-mixed channel group. The error removal-related information obtainer 555 may be included in the information obtainer 550.

The multi-channel audio signal reconstructor 580 may generate an audio signal of the up-mixed channel group based on at least one audio signal of the base channel and at least one audio signal of at least one dependent channel group. The audio signal of the up-mixed channel group may be a multi-channel audio signal. The multi-channel audio signal reconstructor 580 may reconstruct the audio signal of the one up-mixed channel by applying the error removal factor to the audio signal of the one up-mixed channel included in the up-mixed channel group.

The multi-channel audio signal reconstructor 580 may output the multi-channel audio signal including the reconstructed audio signal of the one up-mixed channel.

Figure 5B:
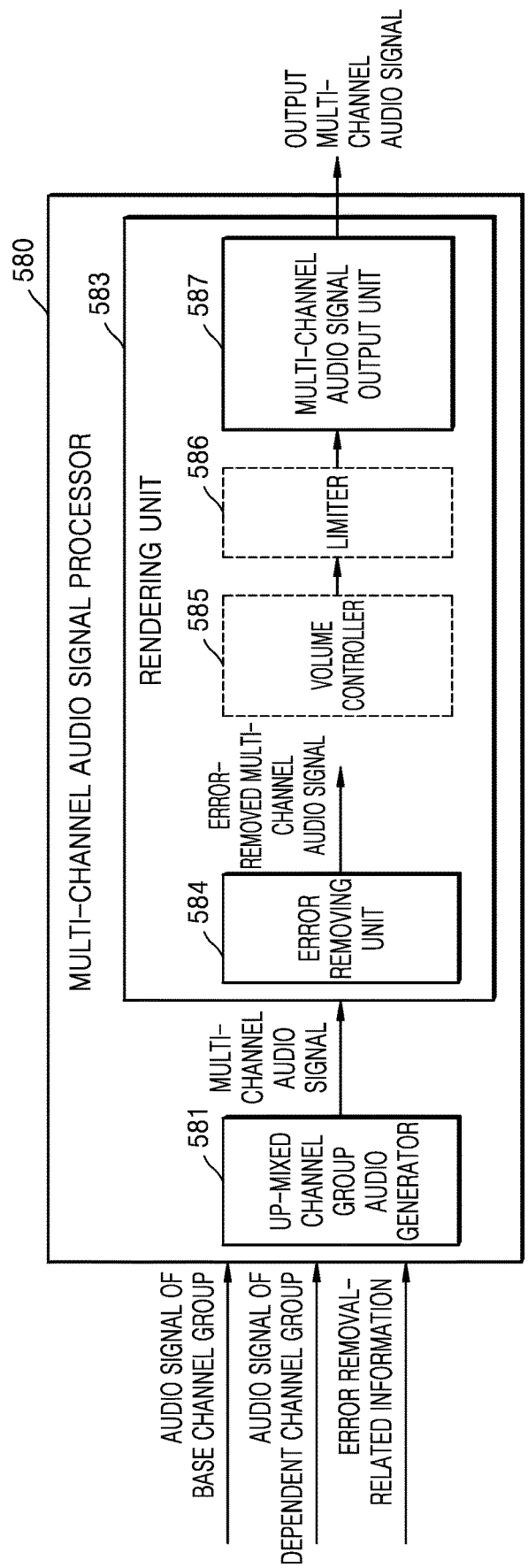
FIG. 5B is a block diagram of a structure of a multi-channel audio signal reconstructor according to various embodiments of the disclosure.

FIG. 5B is a block diagram of a structure of a multi-channel audio signal reconstructor according to various embodiments of the disclosure.

The multi-channel audio signal reconstructor 580 may include an up-mixed channel group audio generator 581 and a rendering unit 583. The rendering unit 583 may include an error removing unit 584, a volume controller 585, a limiter 586, and a multi-channel audio signal output unit 587.

The up-mixed channel group audio generator 581, the error removing unit 584, the volume controller 585, the limiter 586, and the multi-channel audio signal output unit 587 of FIG. 5B may include operations of the up-mixed channel group audio generator 381, the volume controller 388, the limiter 389, and the multi-channel audio signal output unit 390 of FIG. 3C, and thus a redundant description is replaced with the description made with reference to FIG. 3C. Hereinafter, a part that is not redundant to FIG. 3C is described.

The error removing unit 584 may reconstruct the error-removed audio signal of the first channel based on the audio signal of a first up-mixed channel of the up-mixed channel group of the multi-channel audio signal and the error removal factor of the first up-mixed channel. In this case, the error removal factor may be a value based on an RMS value of the original audio signal or an audio signal of the first channel of the audio signal down-mixed from the original audio signal and an RMS value of an audio signal of the first up-mixed channel of the up-mixed channel group. The first channel and the first up-mixed channel may indicate the same channel of a channel layout. The error removing unit 584 may remove an error caused by encoding by causing the RMS value of the audio signal of the first up-mixed channel of the current up-mixed channel group to be the RMS value of the original audio signal or the audio signal of the first channel of the audio signal down-mixed from the original audio signal.

In some embodiments, the error removal factor may differ between adjacent audio frames. In this case, in an end section of a previous frame and an initial section of a next frame, an audio signal may bounce due to discontinuous factors for error removal.

Thus, the error removing unit 584 may determine the error removal factor used in a frame boundary adjacent section by performing smoothing on the error removal factor. The frame boundary adjacent section may refer to the end section of the previous frame with respect to the boundary and the first section of the next frame with respect to the boundary. Each section may include a certain number of samples.

Here, smoothing may refer to an operation of converting a discontinuous error removal factor between adjacent audio frames into a continuous error removal factor in a frame boundary section.

The multi-channel audio signal output unit 588 may output the multi-channel audio signal including the error-removed audio signal of one channel.

In some embodiments, at least one component of the post-processed components 585 and 586 included in the rendering unit 583 may be omitted, and the order of the post-processing components 584, 585, and 586 including the error removing unit 584 may be changed depending on circumstances.

As described above, the audio decoding apparatuses 200 and 400 may generate a bitstream. The audio encoding apparatuses 200 and 400 may transmit the generated bitstream.

In this case, the bitstream may be generated in the form of a file stream. The audio decoding apparatuses 300 and 500 may receive the bitstream. The audio decoding apparatuses 300 and 500 may reconstruct the multi-channel audio signal based on the information obtained from the received bitstream. In this case, the bitstream may be included in a certain file container. For example, the file container may be a Moving Picture Experts Group (MPEG)-4 media container for compressing various pieces of multimedia digital data, such as an MPEG-4 Part 14 (MP4), etc.

Hereinbelow, with reference to FIG. 6, a file structure according to various embodiments of the disclosure is described.

Figure 6:
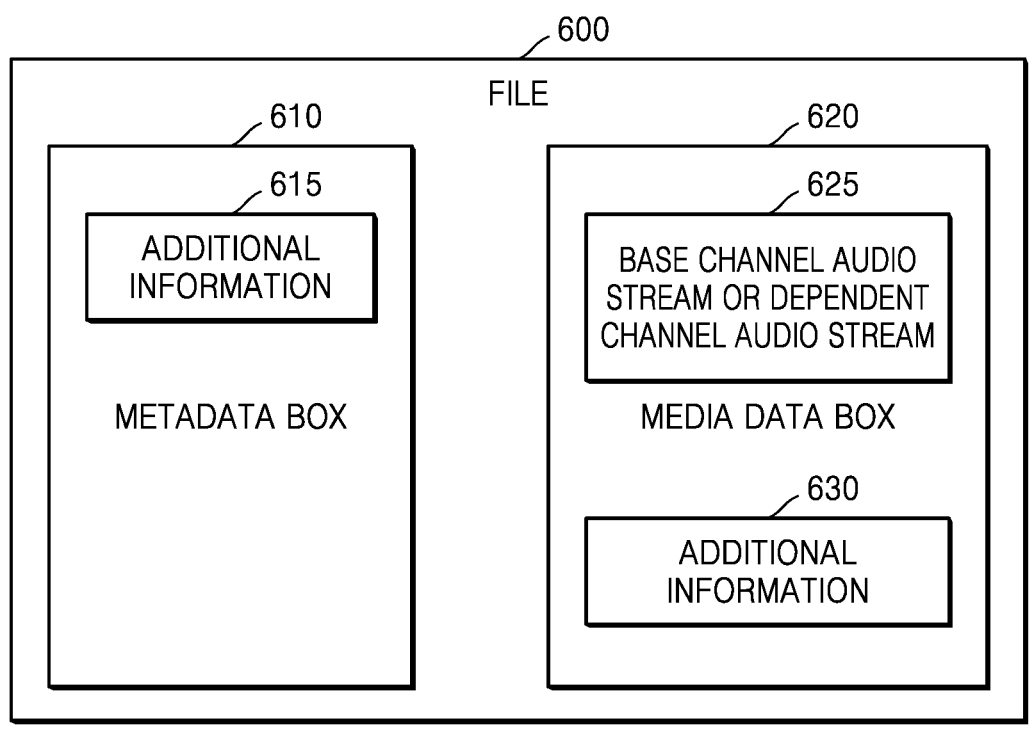
FIG. 6 is a view showing a file structure according to various embodiments of the disclosure.

Referring to FIG. 6, a file 600 may include a metadata box 610 and a media data box 620.

For example, the metadata box 610 may be a moov box of an MP4 file container, and the media data box 620 may be an mdat box of an MP4 file container.

The metadata box 610 may be located in a header part of the file 600. The metadata box 610 may be a data box that stores metadata of the media data. For example, the metadata box 610 may include the above-described additional information 615.

The media data box 620 may be a data box that stores the media data. For example, the media data box 620 may include a base channel audio stream or dependent channel audio stream 625.

Out of the base channel audio stream or dependent channel audio stream 625, the base channel audio stream may include a compressed audio signal of the base channel group.

Out of the base channel audio stream or dependent channel audio stream 625, the dependent channel audio stream may include a compressed audio signal of the dependent channel group.

The media data box 620 may include additional information 630. The additional information 630 may be included in a header part of the media data box 620. Without being limited thereto, the additional information 630 may be included in the header part of the base channel audio stream or dependent channel audio stream 625. In particular, the additional information 630 may be included in the header part of the dependent channel audio stream 625.

The audio decoding apparatuses 300 and 500 may obtain the additional information 615 and 630 included in various parts of the file 600. The audio decoding apparatuses 300 and 500 may reconstruct the multi-channel audio signal based on the audio signal of the base channel group, the audio signal of the dependent channel group, and the additional information 615 and 630. Here, the audio signal of the base channel group may be obtained from the base channel audio stream, and the audio signal of the dependent channel group may be obtained from the dependent channel audio stream.

Figure 7A:
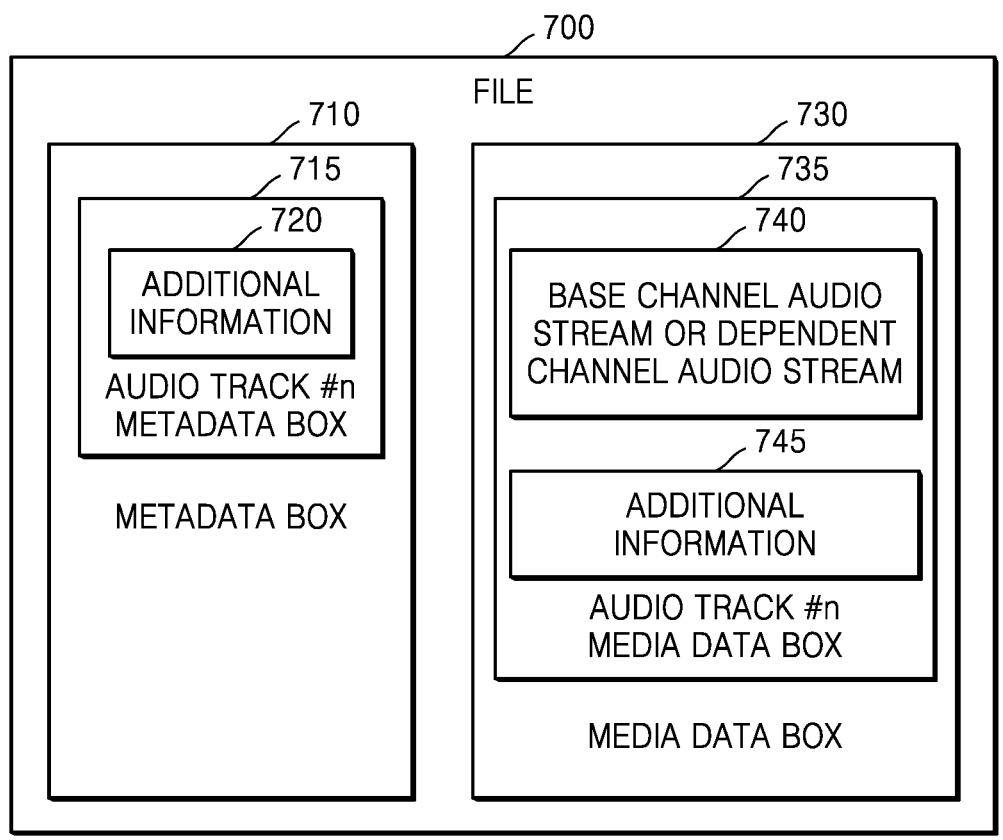
FIG. 7A is a view for describing a detailed structure of a file according to various embodiments of the disclosure.

FIG. 7A is a view for describing a detailed structure of a file according to various embodiments of the disclosure.

Referring to FIG. 7A, a file 700 may include a metadata box 710 and a media data box 730.

The file 700 may include the metadata box 710 and the media data box 730. The metadata box 710 may include a metadata box of at least one audio track.

For example, the metadata box 710 may include a metadata box 715 of an audio track #n (where n is an integer greater than or equal to 1). For example, the metadata box 715 of the audio track #n may be a track box of an MP4 container.

The metadata box 715 of the audio track #n may include additional information 720.

In some embodiments, the media data box 730 may include a media data box of at least one audio track. For example, the media data box 730 may include a media data box 735 of an audio track #n (where n is an integer greater than or equal to 1). Position information included in the metadata box 715 of the audio track #n may indicate a position of the media data box 735 of the audio track #n in the media data box 730. The media data box 735 of the audio track #n may be identified based on the position information included in the meta data box 710 of the audio track #n.

The media data box 735 of the audio track #n may include base channel audio stream and dependent channel audio stream 740 and additional information 745. The additional information 745 may be located in a header part of the media data box of the audio track #n. Alternatively or additionally, the additional information 745 may be included in the header part of at least one of the base channel audio stream or dependent channel audio stream 740.

Figure 7B:
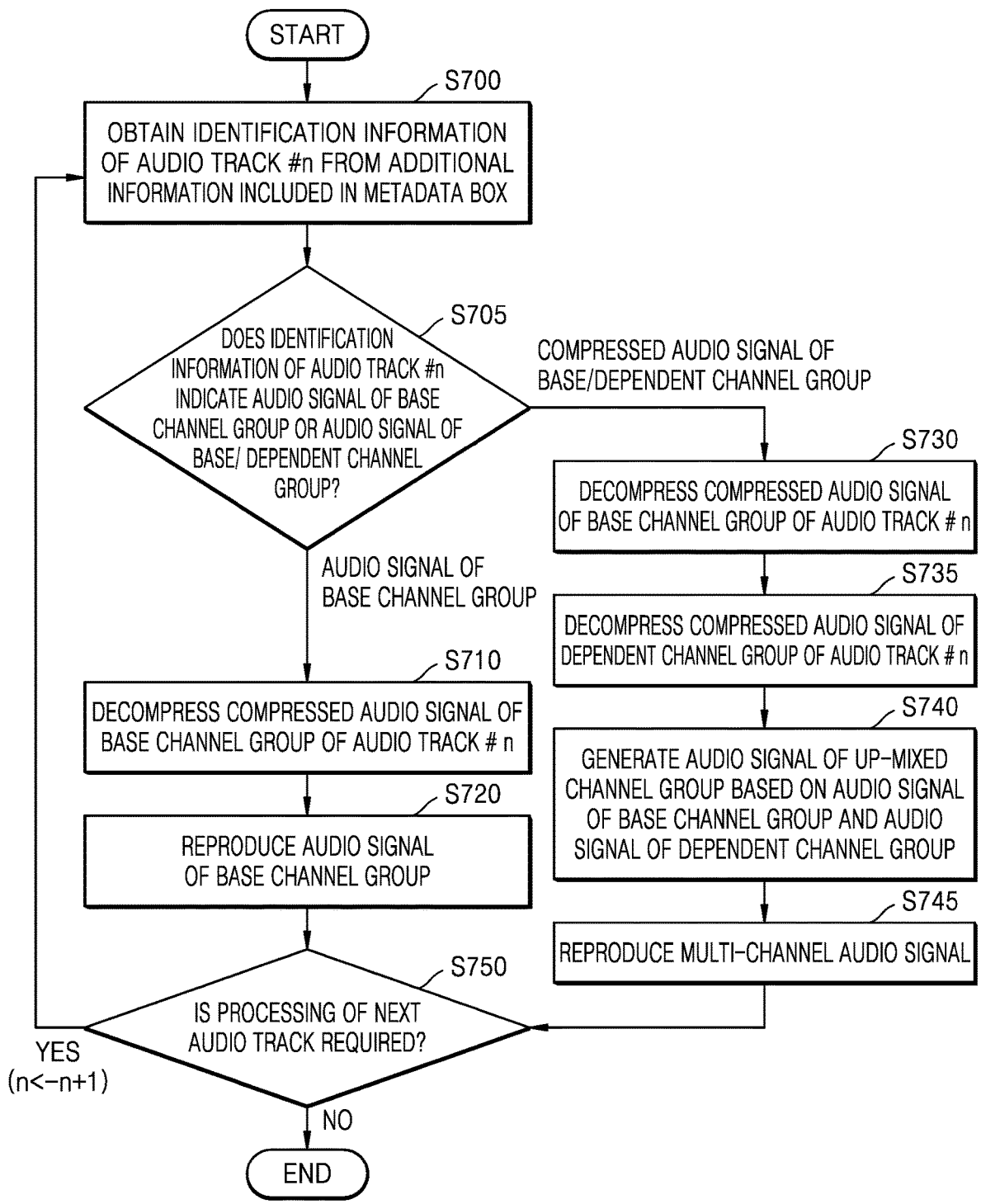
FIG. 7B is a flowchart of a method of reproducing an audio signal by an audio decoding apparatus according to the file structure of FIG. 7A.

FIG. 7B is a flowchart of a method of reproducing an audio signal by an audio decoding apparatus according to a file structure of FIG. 7A.

In operation S700, the audio decoding apparatuses 300 and 500 may obtain identification information of the audio track #n from additional information included in metadata.

In operation S705, the audio decoding apparatuses 300 and 500 may identify whether the identification information of the audio track #n indicates an audio signal of the base channel group or the identification information of the audio track #n indicates an audio signal of the base/dependent channel group.

For example, the identification information of the audio track #n included in a file of an OPUS audio format may be a channel mapping family (CMF). When a CMF is 1, the audio decoding apparatuses 300 and 500 may identify that the audio signal of the base channel group is included in the current audio track. For example, the audio signal of the base channel group may be an audio signal of the stereo channel layout. When the CMF is 4, the audio decoding apparatuses 300 and 500 may identify that the audio signal of the base channel group and the audio signal of the dependent channel group are included in the current audio track.

In operation S710, the audio decoding apparatuses 300 and 500 may obtain the compressed audio signal of the base channel group included in the media data box of the audio track #n, when the identification information of the audio track #n indicates the audio signal of the base channel group.

The audio decoding apparatuses 300 and 500 may decompress the compressed audio signal of the base channel group.

In operation S720, the audio decoding apparatuses 300 and 500 may reproduce the audio signal of the base channel group.

In operation S730, the audio decoding apparatuses 300 and 500 may obtain the compressed audio signal of the base channel group included in the media data box of the audio track #n, when the identification information of the audio track #n indicates the audio signal of the base/dependent channel group. The audio decoding apparatuses 300 and 500 may decompress the obtained compressed audio signal of the base channel group.

In operation S735, the audio decoding apparatuses 300 and 500 may obtain the compressed audio signal of the dependent channel group included in the media data box of the audio track #n.

The audio decoding apparatuses 300 and 500 may decompress the obtained compressed audio signal of the dependent channel group.

In operation S740, the audio decoding apparatuses 300 and 500 may generate an audio signal of at least one up-mixed channel group based on the audio signal of the base channel group and the audio signal of the dependent channel group.

The audio decoding apparatuses 300 and 500 may generate an audio signal of at least one independent channel by bypassing a de-mixing operation with respect to some of the audio signal of the base channel group and the audio signal of the dependent channel group. The audio decoding apparatuses 300 and 500 may generate the audio signal of the up-mixed channel group including the audio signal of the at least one up-mixed channel and the audio signal of the at least one independent channel.

In operation S745, the audio decoding apparatuses 300 and 500 may reproduce the multi-channel audio signal. In this case, the multi-channel audio signal may be one of audio signals of at least one up-mixed channel group.

In operation S750, the audio decoding apparatuses 300 and 500 may identify whether processing of the next audio track is required. When the audio decoding apparatuses 300 and 500 identify that processing of the next audio track is required, the audio decoding apparatuses 300 and 500 may obtain identification information of the next audio track #n+1 and perform operations S705 to S750 described above. That is, the audio decoding apparatuses 300 and 500 may increase a variable n by 1 to determine new n, obtain identification information of the audio track #n, and perform operations S705 to S750 described above.

As described above with reference to FIGS. 7A and 7B, one audio track including the compressed audio signal of the base channel group and the compressed audio signal of the dependent channel group may be generated. However, a conventional audio decoding apparatus may not obtain a compressed audio signal of the base channel group from a corresponding audio track when identification information of the audio track indicates the audio signal of the base/dependent channel group. That is, referring to FIGS. 7A and 7B, backward compatibility with the audio signal of the base channel group such as a stereo audio signal is not supported.

Figure 7C:
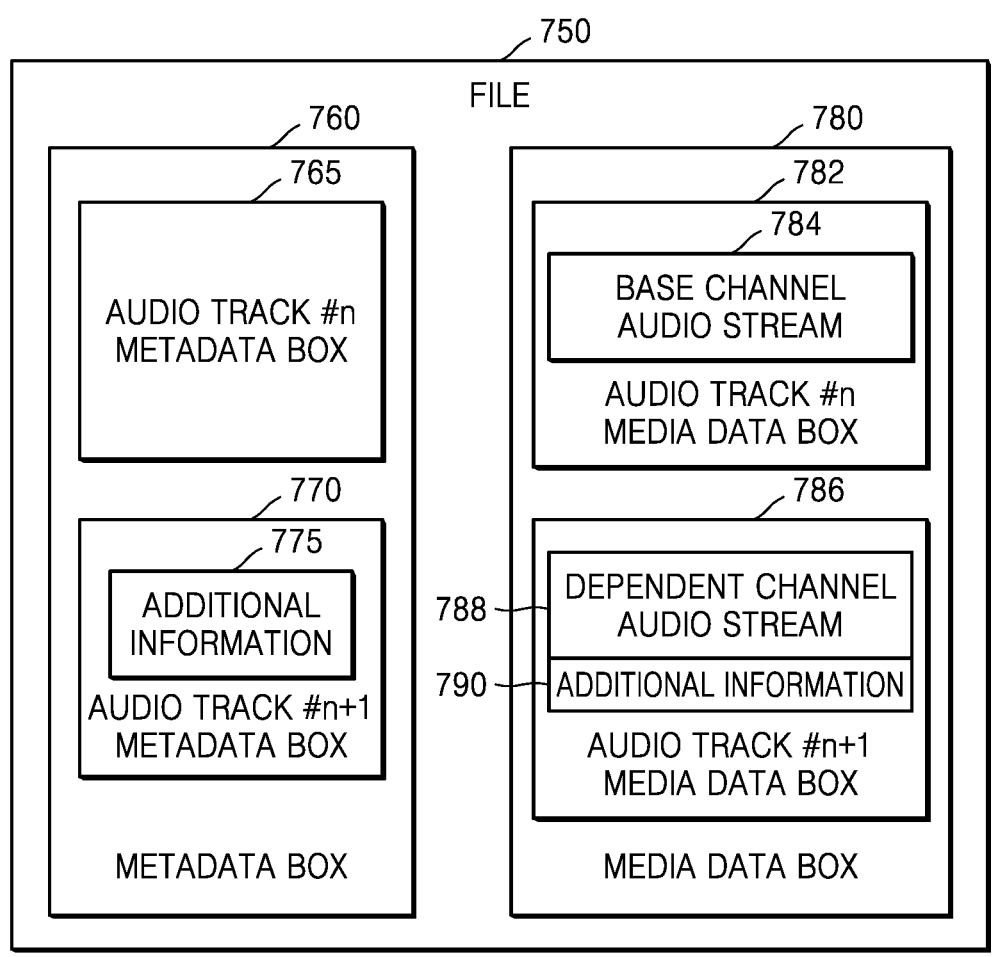
FIG. 7C is a view for describing a detailed structure of a file according to various embodiments of the disclosure.

FIG. 7C is a view for describing a detailed structure of a file according to various embodiments of the disclosure.

Referring to FIG. 7C, a file 750 may include a metadata box 760 and a media data box 780. The metadata box 760 may include a metadata box of at least one audio track. For example, the metadata box 760 may include a metadata box 765 of the audio track #n (where n is an integer greater than or equal to 1) and a metadata box 770 of the audio track #n+1. The metadata box 770 of the audio track #n may include additional information 775.

The media data box 780 may include a media data box 782 of the audio track #n. The media data box 782 of the audio track #n may include a base channel audio stream 784.

The media data box 780 may include a media data box 786 of the audio track #n+1. The media data box 786 of the audio track #n+1 may include a dependent channel audio stream 788. The media data box 786 of the audio track #n+1 may include additional information 790 described above. In this case, the additional information 790 may be included in a header part of the media data box 786 of the audio track #n+1, without being limited thereto.

Position information included in the metadata box 765 of the audio track #n may indicate a position of the media data box 782 of the audio track #n in the media data box 780. The media data box 782 of the audio track #n may be identified based on the position information included in the meta data box 765 of the audio track #n. Likewise, the media data box 786 of the audio track #n+1 may be identified based on the position information included in the metadata box 770 of the audio track #n+1.

Figure 7D:
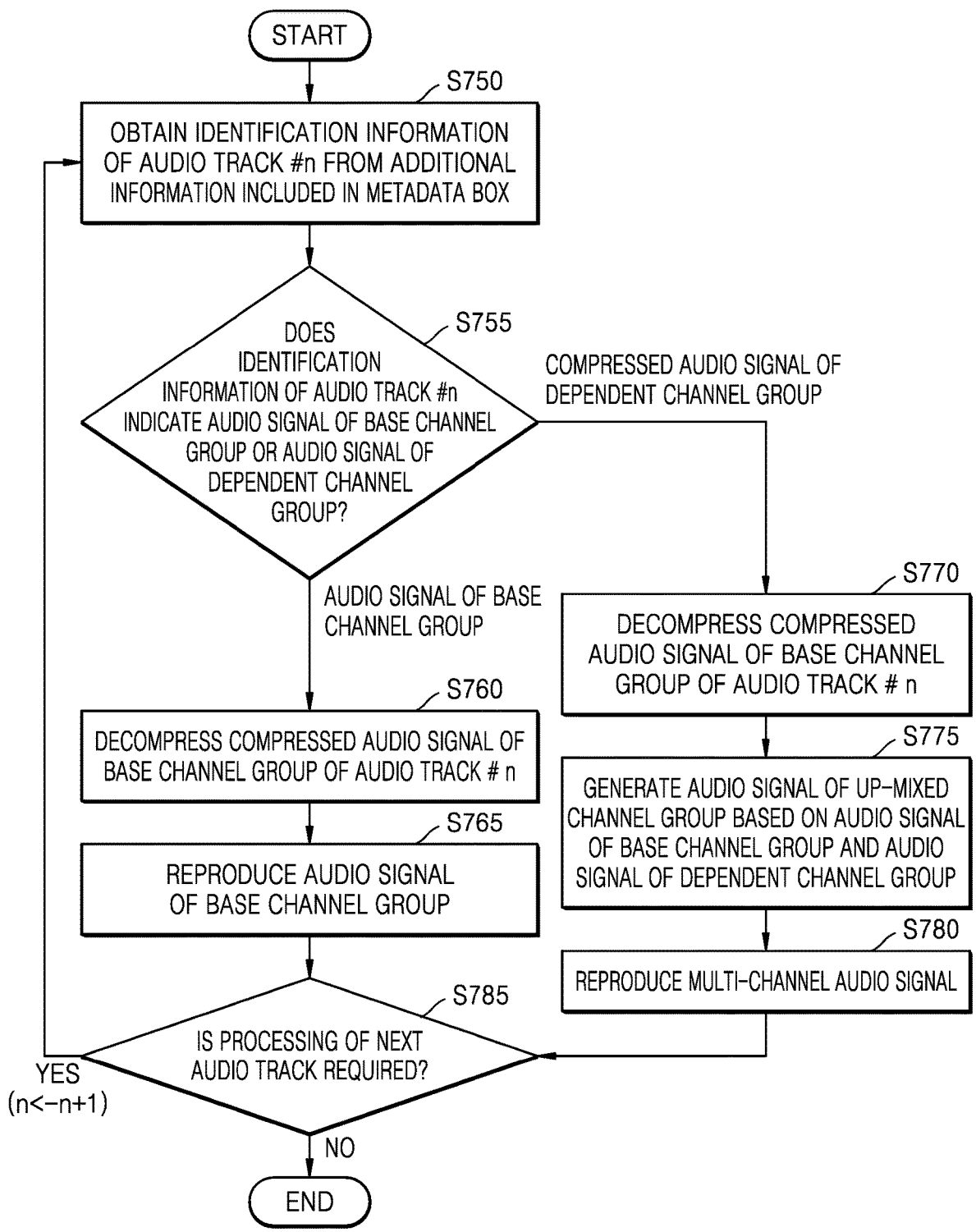

FIG. 7D is a flowchart of a method of reproducing an audio signal by an audio decoding apparatus, according to a file structure of FIG. 7C.

Referring to FIG. 7D, in operation S750, the audio decoding apparatuses 300 and 500 may obtain the identification information of the audio track #n from additional information included in a metadata box.

In operation S755, the audio decoding apparatuses 300 and 500 may identify whether the obtained identification information of the audio track #n indicates an audio signal of the base channel group or an audio signal of the dependent channel group.

In operation S760, the audio decoding apparatuses 300 and 500 may decompress the compressed audio signal of the base channel group included in the audio track #n, when the identification information of the audio track #n indicates the audio signal of the base channel group.

In operation S765, the audio decoding apparatuses 300 and 500 may reproduce the audio signal of the base channel group.

In operation S770, the audio decoding apparatuses 300 and 500 may obtain the compressed audio signal of the dependent channel group of the audio track #n, when the identification information of the audio track #n indicates the audio signal of the dependent channel group. The audio decoding apparatuses 300 and 500 may decompress the compressed audio signal of the dependent channel group of the audio track #n. The audio track of the audio signal of the base channel group corresponding to the audio signal of the dependent channel group may be an audio track #n−1. That is, the compressed audio signal of the base channel group may be included in the audio track that is previous to the audio track including the compressed audio signal of the dependent channel. For example, the compressed audio signal of the base channel group may be included in the audio track that is adjacent to the audio track including the compressed audio signal of the dependent channel among previous audio tracks. Thus, prior to operation S770, the audio decoding apparatuses 300 and 500 may obtain the compressed audio signal of the base channel group of the audio track #n−1. Alternatively or additionally, the audio decoding apparatuses 300 and 500 may decompress the obtained compressed audio signal of the base channel group.

In operation S775, the audio decoding apparatuses 300 and 500 may generate an audio signal of at least one up-mixed channel group based on the audio signal of the base channel group and the audio signal of the dependent channel group.

In operation S780, the audio decoding apparatuses 300 and 500 may reproduce a multi-channel audio signal that is one of audio signals of at least one up-mixed channel group.

In operation S785, the audio decoding apparatuses 300 and 500 may identify whether processing of the next audio track is required. When the audio decoding apparatuses 300 and 500 identify that processing of the next audio track is required, the audio decoding apparatuses 300 and 500 may obtain the identification information of the next audio track #n+1 and perform operations S755 to S785 described above. That is, the audio decoding apparatuses 300 and 500 may increase the variable n by 1 to determine the new n, obtain the identification information of the audio track #n, and perform operations S755 to S785 described above.

As described above with reference to FIGS. 7C and 7D, separately from the audio track including the compressed audio signal of the base channel group, the audio track including the compressed audio signal of the dependent channel group may be generated. The conventional audio decoding apparatus may not obtain the compressed audio signal of the dependent channel group from the corresponding audio track, when the identification information of the audio track indicates the audio signal of the dependent channel group. However, unlike the foregoing description made with reference to FIGS. 7A and 7B, the conventional audio decoding apparatus may decompress the compressed audio signal of the base channel group included in the previous audio track to reproduce the audio signal of the base channel group.

Thus, referring to FIGS. 7C and 7D, backward compatibility with a stereo audio signal (e.g., the audio signal of the base channel group) may be supported.

The audio decoding apparatuses 300 and 500 may obtain the compressed audio signal of the base channel group included in a separate audio track and the compressed audio signal of the dependent channel group. The audio decoding apparatuses 300 and 500 may decompress the compressed audio signal of the base channel group obtained from the first audio track. The audio decoding apparatuses 300 and 500 may decompress the compressed audio signal of the dependent channel group obtained from the second audio track. The audio decoding apparatuses 300 and 500 may reproduce the multi-channel audio signal based on the audio signal of the base channel group and the audio signal of the dependent channel group.

In some embodiments, the number of dependent channel groups corresponding to the base channel group may be plural. In this case, a plurality of audio tracks including an audio signal of at least one dependent channel group may be generated. For example, the audio track #n including an audio signal of at least one dependent channel group #1 may be generated. The audio track #n+1 including an audio signal of at least one dependent channel group #2 may be generated. Like the audio track #n+1, an audio track #n+2 including an audio signal of at least one dependent channel group #3 may be generated. Similarly with the foregoing description, an audio track #n+m−1 including an audio signal of at least one dependent channel group #m may be generated. The audio decoding apparatuses 300 and 500 may obtain compressed audio signals of dependent channel groups #1, #2, . . . , #m included in the audio tracks #n, #n+1, . . . , #n+m−1, and decompress the obtained compressed audio signals of the dependent channel groups #1, #2, . . . , #m. The audio decoding apparatuses 300 and 500 may reconstruct the multi-channel audio signal based on the audio signal of the base channel group and the audio signals of the dependent channel groups #1, #2, . . . , #m.

The audio decoding apparatuses 300 and 500 may obtain compressed audio signals of audio tracks including an audio signal of a supported channel layout according to the supported channel layout. The audio decoding apparatuses 300 and 500 may not obtain a compressed audio signal of an audio track including an audio signal of a non-supported channel layout. The audio decoding apparatuses 300 and 500 may obtain compressed audio signals of some of total audio tracks according to the supported channel layout, and decompress the compressed audio signal of at least one dependent channel included in the some audio tracks. Thus, the audio decoding apparatuses 300 and 500 may reconstruct the multi-channel audio signal according to the supported channel layout.

Figure 8A:
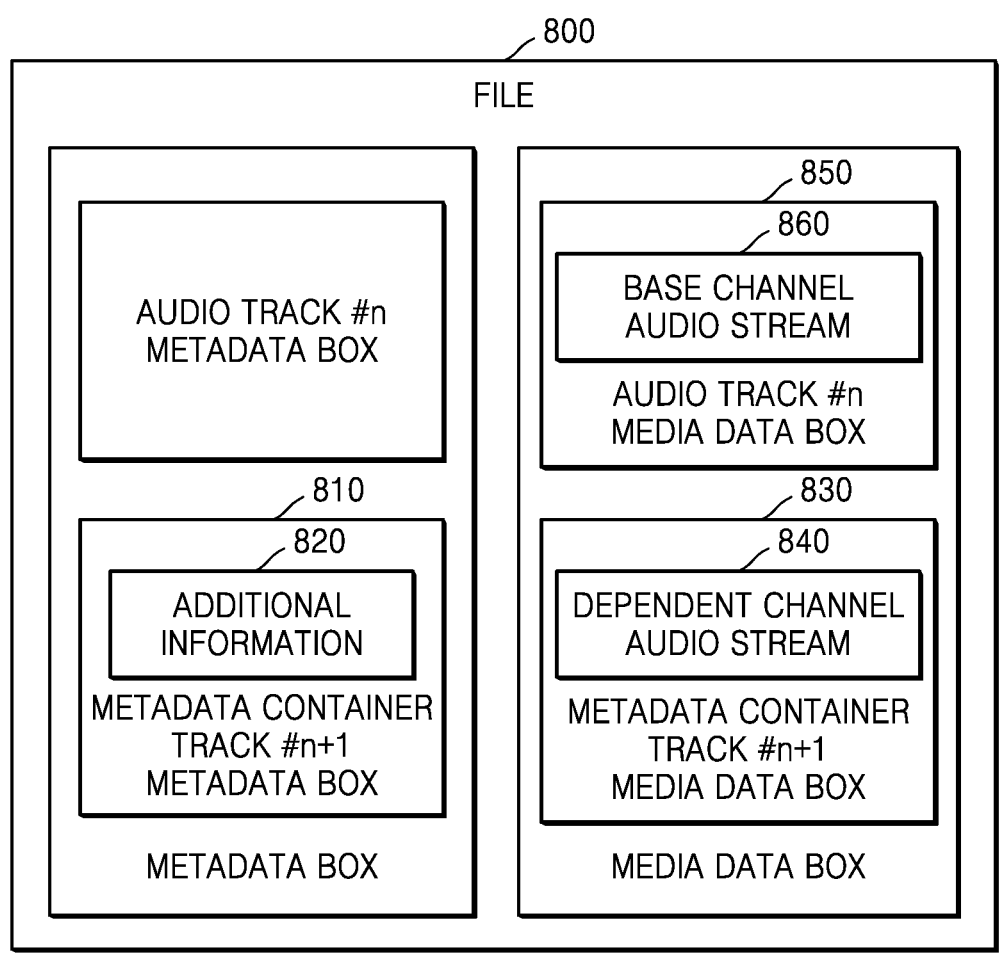
FIG. 8A is a view for describing a file structure according to various embodiments of the disclosure.

FIG. 8A is a view for describing a file structure according to various embodiments of the disclosure.

Referring to FIG. 8A, additional information 820 may be included in a metadata box 810 of a metadata container track #n+1 rather than the metadata box of the audio track #n+1 of FIG. 7C. Alternatively or additionally, a dependent channel audio stream 840 may be included in a media data box 830 of the metadata container track #n+1 rather than a media data box of the audio track #n+1. That is, the additional information 820 may be included in the metadata container track rather than the audio track. However, the metadata container track and the audio track may be managed in the same track group, such that when the audio track of the base channel audio stream has #n, the metadata container track may have #n+1 of the dependent channel audio stream.

Figure 8B:
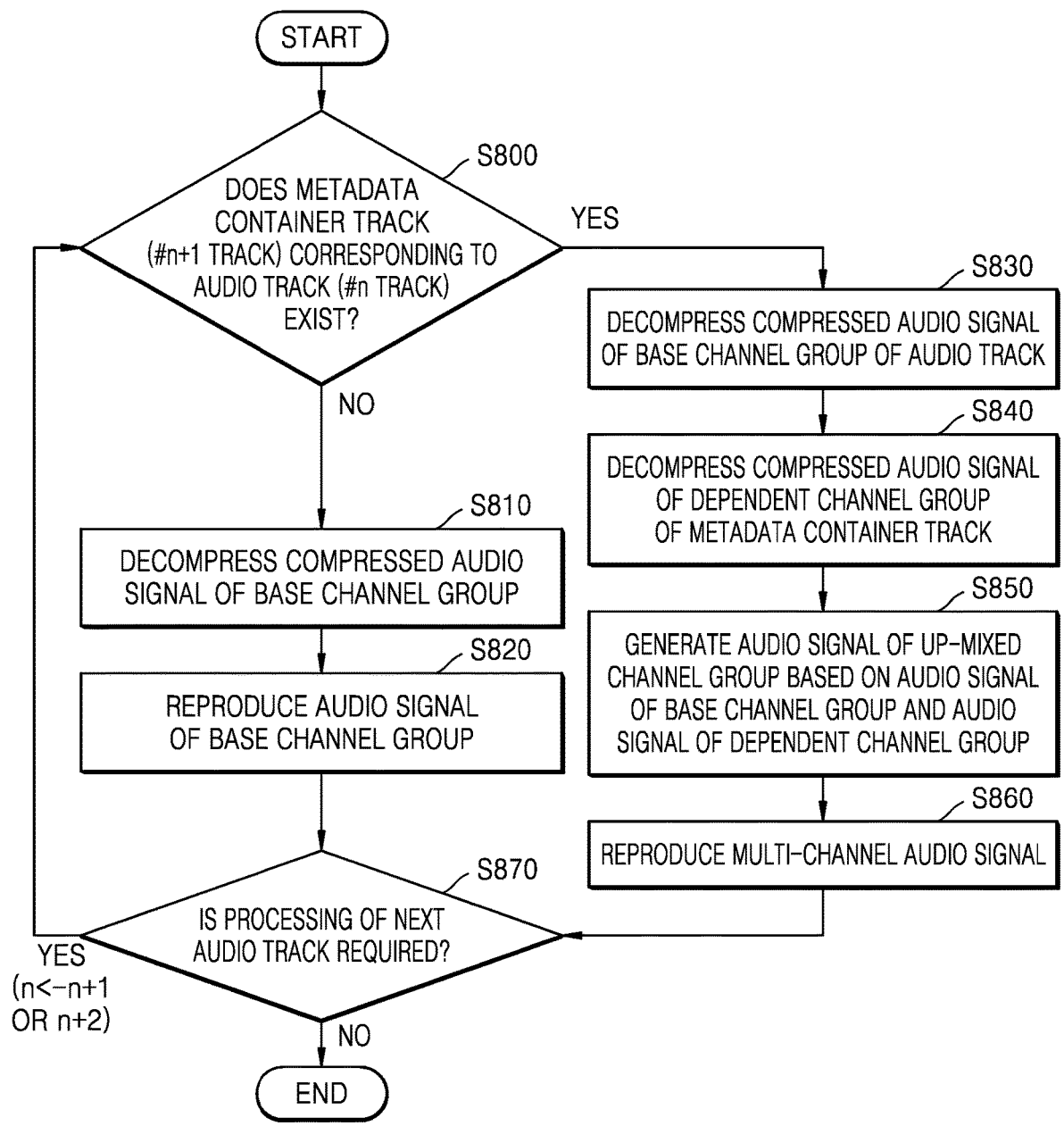
FIG. 8B is a flowchart of a method of reproducing an audio signal by an audio decoding apparatus according to the file structure of FIG. 8A.

FIG. 8B is a flowchart of a method of reproducing an audio signal by an audio decoding apparatus according to a file structure of FIG. 8A.

The audio decoding apparatuses 300 and 500 may identify a type of each track.

In operation S800, the audio decoding apparatuses 300 and 500 may identify whether a metadata container track the audio track #n+1 corresponding to the audio track #n exists. That is, the audio decoding apparatuses 300 and 500 may identify that the audio track #n is one of audio tracks and may identify the track #n+1. The audio decoding apparatuses 300 and 500 may identify whether the track #n+1 is a metadata container track corresponding to the audio track #n.

In operation S810, when the audio decoding apparatuses 300 and 500 identify that the metadata container track #n+1 track corresponding to an audio track the audio track #n does not exist, the audio decoding apparatuses 300 and 500 may decompress the compressed audio signal of the base channel group.

In operation S820, the audio decoding apparatuses 300 and 500 may reproduce the decompressed audio signal of the base channel group.

In operation S830, when the audio decoding apparatuses 300 and 500 identify that the metadata container track #n+1 track corresponding to the audio track #n exists, the audio decoding apparatuses 300 and 500 may decompress the compressed audio signal of the base channel group.

In operation S840, the audio decoding apparatuses 300 and 500 may decompress the compressed audio signal of the dependent channel group of the metadata container track.

In operation S850, the audio decoding apparatuses 300 and 500 may generate an audio signal of at least one up-mixed channel group, based on the decompressed audio signal of the base channel group and the decompressed audio signal of at least one up-mixed channel group.

In operation S860, the audio decoding apparatuses 300 and 500 may reproduce a multi-channel audio signal that is one of audio signals of at least one up-mixed channel group.

In operation S870, the audio decoding apparatuses 300 and 500 may identify whether processing of the next audio track is required. When the metadata container track #n+1 corresponding to the audio track #n exists, the audio decoding apparatuses 300 and 500 may identify whether a track #n+2 exists as a next track, and when the track #n+2 exists, the audio decoding apparatuses 300 and 500 may obtain identification information of the tracks #n+2 and #n+3 and perform operations S800 to S870 described above. That is, the audio decoding apparatuses 300 and 500 may increase the variable n by 2 to determine new n, obtain identification information of the tracks #n and #n+1, and perform operations S800 to S870 described above.

When the metadata container track #n+1 corresponding to the audio track #n does not exist, the audio decoding apparatuses 300 and 500 may identify whether the track #n+1 exists as the next track, and when the track #n+1 exists, the audio decoding apparatuses 300 and 500 may obtain the identification information of the tracks #n+1 and #n+2 and perform operations S800 to S870 described above. That is, the audio decoding apparatuses 300 and 500 may increase the variable n by 1 to determine new n, obtain the identification information of the tracks #n+1 and #n+2, and perform operations S800 to S870 described above.

Figure 9A:
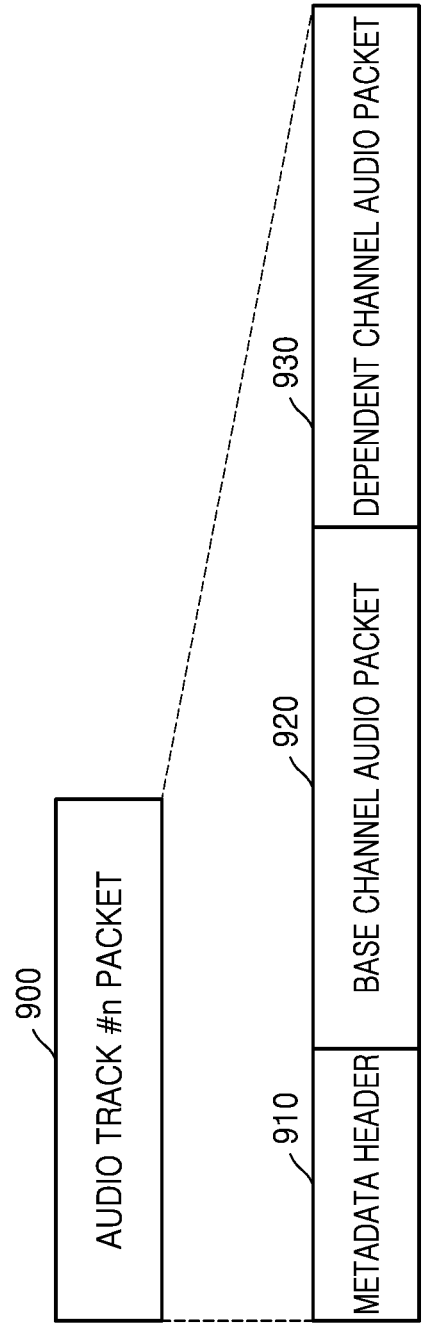
FIG. 9A is a view for describing a packet of an audio track according to the file structure of FIG. 7A.

FIG. 9A is a view for describing a packet of an audio track according to a file structure of FIG. 7A.

As described above with reference to FIG. 7A, the media data box 735 of the audio track #n may include the base channel audio stream or the dependent channel audio stream 740.

Referring to FIG. 9A, an audio track #n packet 900 may include a metadata header 910, a base channel audio packet 920, and a dependent channel audio packet 930. The base channel audio packet 920 may include a part of a base channel audio stream, and the dependent channel audio packet 930 may include a part of the dependent channel audio stream. The metadata header 910 may be located in a header part of the audio track #n packet 900. The metadata header 910 may include additional information. However, without being limited thereto, the additional information may be located in a header part of the dependent channel audio packet 930.

Figure 9B:
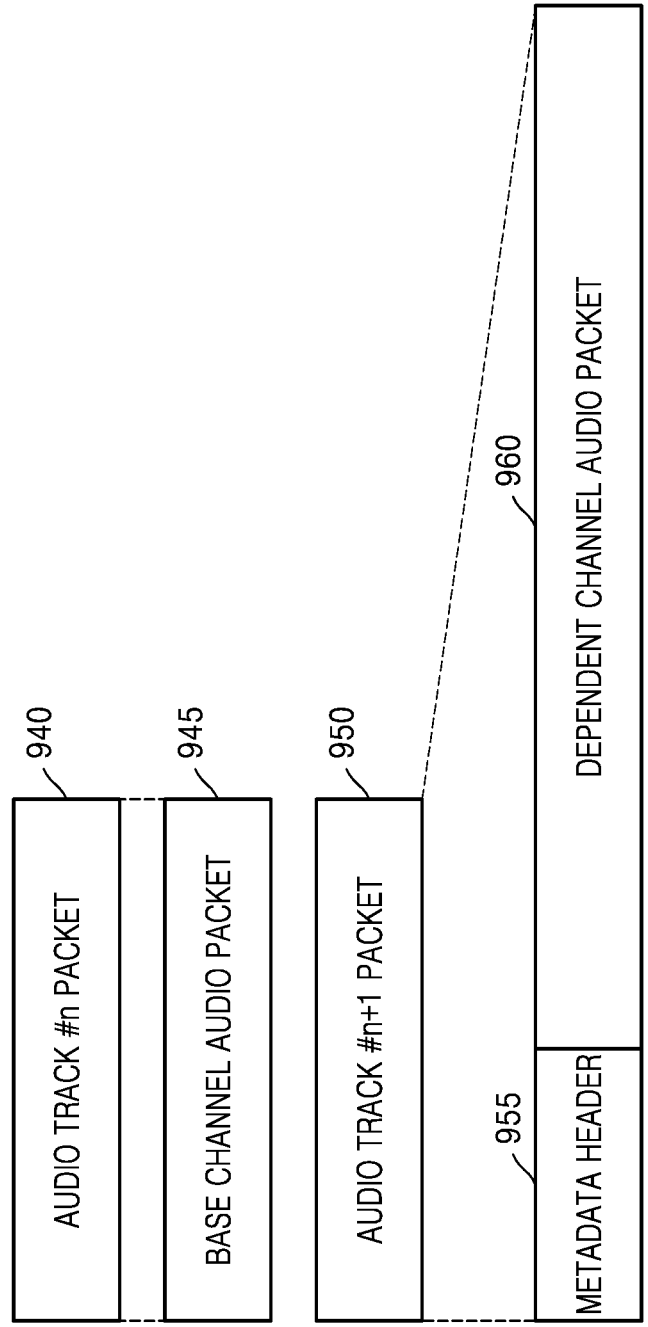
FIG. 9B is a view for describing a packet of an audio track according to the file structure of FIG. 7C.

FIG. 9B is a view for describing a packet of an audio track according to a file structure of FIG. 7C.

As described with reference to FIG. 7C, a media data box 762 of the audio track #n may include a base channel audio stream 764, and a media data box 786 of the audio track #n+1 may include a dependent channel audio stream 788.

Referring to FIG. 9B, an audio track #n packet 940 may include a base channel audio packet 945. An audio track #n+1 packet 950 may include a metadata header 955 and a dependent channel audio packet 960. The metadata header 955 may be located in a header part of the audio track #n+1 packet 950. The metadata header 955 may include additional information.

However, without being limited thereto, there may be one or more dependent channel audio packets 960. Additional information may be included in the header part of the one or more dependent channel audio packets 960.

FIG. 9C is a view for describing a packet of an audio track according to a file structure of FIG. 8A.

As described with reference to FIG. 8A, a media data box 850 of the audio track #n may include a base channel audio stream 860, and the media data box 830 of the metadata container track #n+1 may include the dependent channel audio stream 840.

Except that the audio track #n+1 packet 950 of FIG. 9B is replaced with a metadata container track #n+1 packet 980 of FIG. 9C, FIG. 9B and FIG. 9C are the same as each other, such that a description with reference to FIG. 9C is replaced with a description of FIG. 9B.

Figure 10:
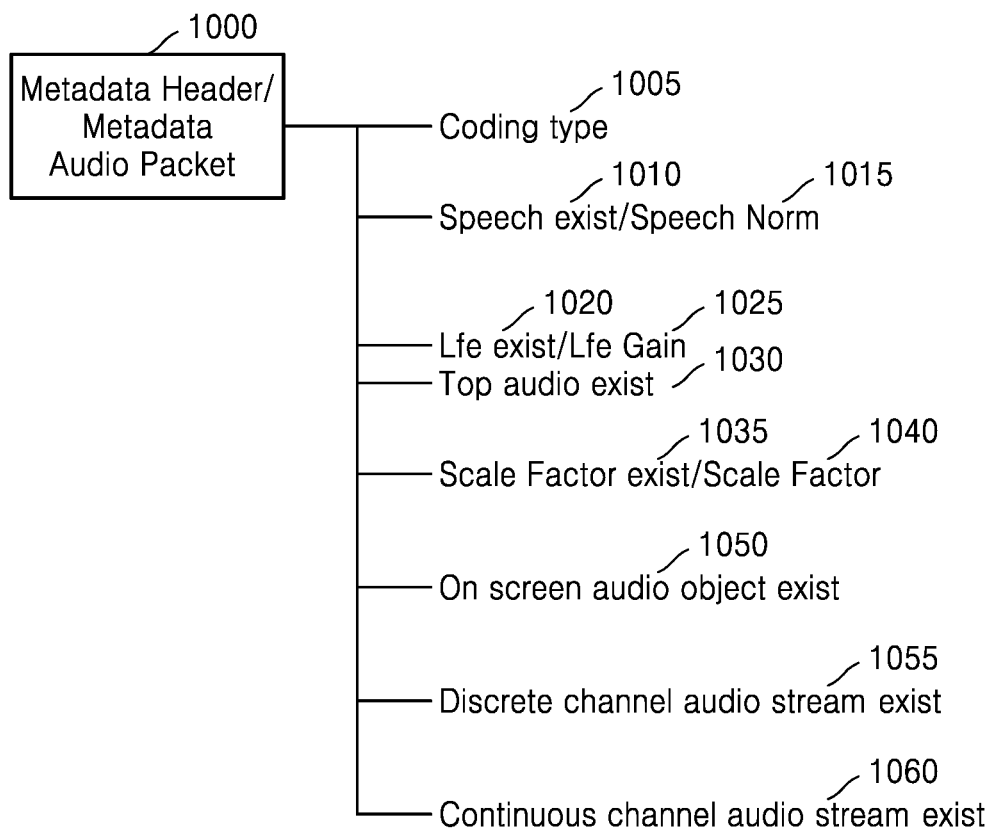
FIG. 10 is a view for describing additional information of a metadata header/a metadata audio packet according to various embodiments of the disclosure.

FIG. 10 is a view for describing additional information of a metadata header/a metadata audio packet according to various embodiments of the disclosure.

Referring to FIG. 10, a metadata header/metadata audio packet 1000 may include at least one of coding type information 1005, speech exist information 1010, speech norm information 1015, LFE existence information 1020, LFE gain information 1025, top audio existence information 1030, scale factor existence information 1035, scale factor information 1040, on-screen audio object existence information 1050, discrete channel audio stream existence information 1055, or continuous channel audio stream existence information 1060.

The coding type information 1005 may be information for identifying an encoded audio signal in media data related to the metadata header/metadata audio packet 1000. That is, the coding type information 1005 may be information for identifying an encoding structure of the base channel group and an encoding structure of the dependent channel group.

For example, when a value of the coding type information 1005 is 0x00, it may indicate that the encoded audio signal is an audio signal of the 3.1.2 channel layout. When the value of the coding type information 1005 is 0x00, the audio decoding apparatuses 300 and 500 may identify that the compressed audio signal of the base channel group included in the encoded audio signal is an audio signal A/B of the 2 channel layout, and identify that the compressed audio signals of the other dependent channel groups are T, P, and Q signals. When the value of the coding type information 1005 is 0x01, it may indicate that the encoded audio signal is an audio signal of the 5.1.2 channel layout. When the value of the coding type information 1005 is 0x01, the audio decoding apparatuses 300 and 500 may identify that the compressed audio signal of the base channel group included in the encoded audio signal is the audio signal NB of the 2 channel layout, and identify that the compressed audio signals of the other dependent channel groups are T, P, Q, and S signals.

When the value of the coding type information 1005 is 0x02, it may whether the encoded audio signal is an audio signal of the 7.1.4 channel layout. When the value of the coding type information 1005 is 0x02, the audio decoding apparatuses 300 and 500 may identify that the compressed audio signal of the base channel group included in the encoded audio signal is the audio signal A/B of the 2 channel layout, and identify that the compressed audio signals of the other dependent channel groups are T, P, Q, S, U, and V signals.

When the value of the coding type information 1005 is 0x03, it may indicate that the encoded audio signal includes an audio signal of the 3.1.2 channel layout and an ambisonic audio signal. When the value of the coding type information 1005 is 0x03, the audio decoding apparatuses 300 and 500 may identify that the compressed audio signal of the base channel group included in the encoded audio signal is the audio signal NB of the 2 channel layout, and identify that the compressed audio signals of the other dependent channel groups are T, P, and Q signals and W, X, Y, and Z signals.

When the value of the coding type information 1005 is 0x04, it may indicate that the encoded audio signal includes an audio signal of the 7.1.4 channel layout and an ambisonic audio signal. When the value of the coding type information 1005 is 0x04, the audio decoding apparatuses 300 and 500 may identify that the compressed audio signal of the base channel group included in the encoded audio signal is the audio signal NB of the 2 channel layout, and identify that the compressed audio signals of the other dependent channel groups are T, P, Q, S, U, and V signals and W, X, Y, and Z signals.

The speech existence information 101 may be information for identifying whether dialogue information exists in an audio signal of a center channel included in media data related to the metadata header/metadata audio packet 1000. The speech norm information 1015 may indicate a norm value of a dialogue included in the audio signal of the center channel. The audio decoding apparatuses 300 and 500 may control a volume of a voice signal based on the speech normal information 1015. That is, the audio decoding apparatuses 300 and 500 may control a volume level of a surrounding sound and a volume level of a dialogue sound differently. Thus, a clearer dialogue sound may be reconstructed. Alternatively or additionally, the audio decoding apparatuses 300 and 500 may uniformly set the volume level of voice included in several audio signals to a target volume based on the speech norm information 1015, and sequentially reproduce the several audio signals.

The LFE existence information 1020 may be information for identifying whether an LFE exists in media data related to the metadata header/metadata audio packet 1000.

An audio signal showing an LFE may be included in a designated audio signal section according to an intention of a content manufacturer, without being allocated to the center channel. Thus, when LFE existence information is on, an audio signal of an LFE channel may be reconstructed.

The LFE gain information 1025 may information indicating a gain of an audio signal of an LFE channel when the LFE existence information is on. The audio decoding apparatuses 300 and 500 may output the audio signal of the LFE according to an LFE gain based on the LFE gain information 1025.

The top audio existence information 1030 may indicate whether an audio signal of a top front channel exists in media data related to the metadata header/metadata audio packet 1000. Herein, the top front channel may be the Hfl3 channel (a top front left (TFL) channel) and the Hfr3 channel (a top front right (TFR) channel) of the 3.1.2 channel layout.

The scale factor existence information 1035 and the scale factor information 1040 may be included in the information about the scale factor of FIG. 5A. The scale factor existence information 1035 may be information indicating whether an RMS scale factor for an audio signal of a particular channel exists. The scale factor information 1040 may be information indicating a value of the RMS scale factor for the particular channel, when the scale factor existence information 1035 indicates that the RMS scale factor for the audio signal of the particular channel exists.

The on-screen audio object existence information 1050 may be information indicating whether an audio object exists on the screen. When the on-screen audio object information 1050 is on, the audio decoding apparatuses 300 and 500 may identify that there is an audio object on the screen, convert a multi-channel audio signal reconstructed based on the audio signal of the base channel group and the audio signal of the dependent channel group into an audio signal of a listener front-centered 3D audio channel, and output the same.

The discrete channel audio stream existence information 1055 may be information indicating whether an audio stream of a discrete channel is included in the media data related to the metadata header/metadata audio packet 1000. In this case, the discrete channel may be a 5.1.2 channel or a 7.1.4 channel.

The continuous channel audio stream existence information 1060 may be information indicating whether an audio stream of an audio signal (WXYZ value) of a continuous channel is included in the media data related to the metadata header/metadata audio packet 1000. In this case, the audio decoding apparatuses 300 and 500 may convert an audio signal into an audio signal of various channel layouts, regardless of a channel layout, based on an audio signal of an ambisonic channel such as a WXYZ value.

Alternatively or additionally, when the on-screen audio object exist information 1050 is on, the audio decoding apparatuses 300 and 500 may convert the WXYZ value to emphasize an audio signal on the screen in the audio signal of the 3.1.2 channel layout.

Hereinbelow, Table 2 includes a pseudo code (Pseudo Code 1) regarding an audio data structure.

TABLE 2

```
struct Metadata Header {
    metadata_version : 4 bits;
    metadata_header_length : 9 bits;
    speech exist : 1 bit; // '1' is to have dialog audio in
    center channel, '0' is not to have a dialog audio
    if (speech_exist == 1) {
        speech_norm : 8 bits; }
    lfe_exist : 1 bit; // '1' is to LFE audio in center
    channel, '0' is not to have a dialog audio
    if (lfe__exist == 1) {
        lfe_gain : 8 bits;
    }
    on_screen_audio_object_exist : 1 bit; // '1' is to
    have an audio object on screen, '0' is not to have
    an audio object on screen
        if (on_screen_audio_object_exist == 1) {
            object_S : 8 bits x 5; // object sound object mixing
            level about 3.1.2ch(L3, R3, C, Hfl3, Hfr3)
            object_G: 8 bits x 2; // size of sound source shape/
            area from center of object sound source
            object_V: 8 bits x 2; // object sound source moving
            vector (cartesian coordinate dx, dy) in 1 audio
            frame (e.g., 980 sample)
            object_L: 8 bits x 2; // object sound source start
            location (cartesian coordinate x, y) in 1 audio
            frame (e.g., 980 sample)
        }
        audio_metadata_exist: 3 bits: first bit is descrete_
        audio_exist, second bit is continuous_audio_exist,
        third bit is reserved
        if (discrete_audio_exist == 1) {
            length_of_discrete_audio_stream : 16 bits; }
        if (continuous_audio_exist == 1) {
            length_of_continuous_audio_stream : 16 bits; }
        zero bit padding for byte alignment: N bits};
    struct MetadataAudioPacket
    {
        coding_type : 8 bits;
        cancelation error ratio exist(3.1.2ch) : 1 bit;
        if (cancelation error ratio exist(3.1.2ch)== 1) {
            cancelation error ratio(3.1.2ch): 8bit * 2; }
        cancelation error ratio exist(5.1.2ch) : 1 bit;
        if (cancelation error ratio exist(5.1.2ch)== 1) {
            cancelation error ratio (5.1.2ch): 8bit * 4; }
        if (cancelation error ratio exist(7.1.4ch)== 1) {
            cancelation error ratio(7.1.4ch): 8bit * 4; }
        zero bit padding for byte alignment: N bits
```

TABLE 2-continued

```
        if (discrete_audio_exist == 1) {
            base_channel_audio_data_length[N1]: 16 bits
            dependent_channel_audio_data_length{N2}: 16 bits
        }
        if (continuous_audio_exist == 1)
        {
            continuous_channel_audio_data_length[N3]: 16 bits
        }
        base_channel_audio_data[N1];
        dependant_channel_audio_data[N2];
        continuous_channel_audio_data[N3];
    };
```

In a structure of a metadata header of Pseudo Code 1, metadata_version[4 bits], metadata_header_length[9 bits], etc., may be sequentially included. metadata_version may represent the version of the metadata, and metadata_header_length may indicate the length of the header of the metadata. speech_exist may indicate whether dialogue audio exists in the center channel. speech_norm may indicate a norm value obtained by measuring the volume of the dialogue audio. Ife_exist may indicate whether the audio signal of the LFE channel exists in the center channel. Ife_gain may indicate the gain of the audio signal of the LFE channel.

on_screen_audio_object_exist may indicate whether the audio object exists on the screen. object_S may indicate a mix level in the channel in the 3.1.2 audio channel of the audio object on the screen. object_G may indicate the area and shape of the object on the screen, based on the center of the audio object on the screen. object_V may indicate a moving vector (dx, dy) of the object on the screen in one audio frame. object_L may indicate position coordinates (x, y) of the object on the screen in one audio frame.

audio_meta_data_exist may be information indicating whether base metadata exists, whether audio metadata of a discrete channel exists, and audio metadata of a continuous channel exists.

discrete_audio_metadata_offset may indicate the address of the audio metadata of the discrete channel when the audio metadata of the discrete channel exists.

continuous_audio_metadata_offset may indicate the address of the audio metadata of the continuous channel when the audio metadata of the continuous channel exists.

In a structure of a metadata audio packet of Pseudo Code 1, coding_type[8 bits], etc., may be sequentially included.

coding type may indicate a type of a coding structure of an audio signal.

Information such as cancelation error ratio exist, etc., may be sequentially included.

cancelation error ratio exist (3.1.2 channel) may indicate whether a cancelation error ratio (CER) for the audio signal of the 3.1.2 channel layout exists. The cancelation error ratio (3.1.2 channel) may indicate the CER for the audio signal of the 3.1.2 channel layout. Likewise, cancelation error ratio (5.1.2 channel), cancelation error ratio (5.1.2 channel), cancelation error ratio exist (7.1.4 channel), and cancelation error ratio (7.1.4 channel) may exist.

discrete_audio_channel_data may indicate audio channel data of a discrete channel. The audio channel data of the discrete channel may include base_audio_channel_data and dependent_audio_channel_data.

When discrete_audio_level_audio_exist has a value of 1, base_audio_channel_data_length, dependent_audio_channel_data_length, etc., may be sequentially included in a metadata audio packet.

base_audio_channel_data_length may indicate the length of the base audio channel data. dependent_audio_channel_data_length may indicate the length of the dependent audio channel data.

Alternatively or additionally, base_audio_channel_data may indicate the base audio channel data.

dependent_audio_channel_data may indicate the dependent audio channel data.

continouous_audio_channel_data may indicate the audio channel data of the continuous channel.

Figure 11:
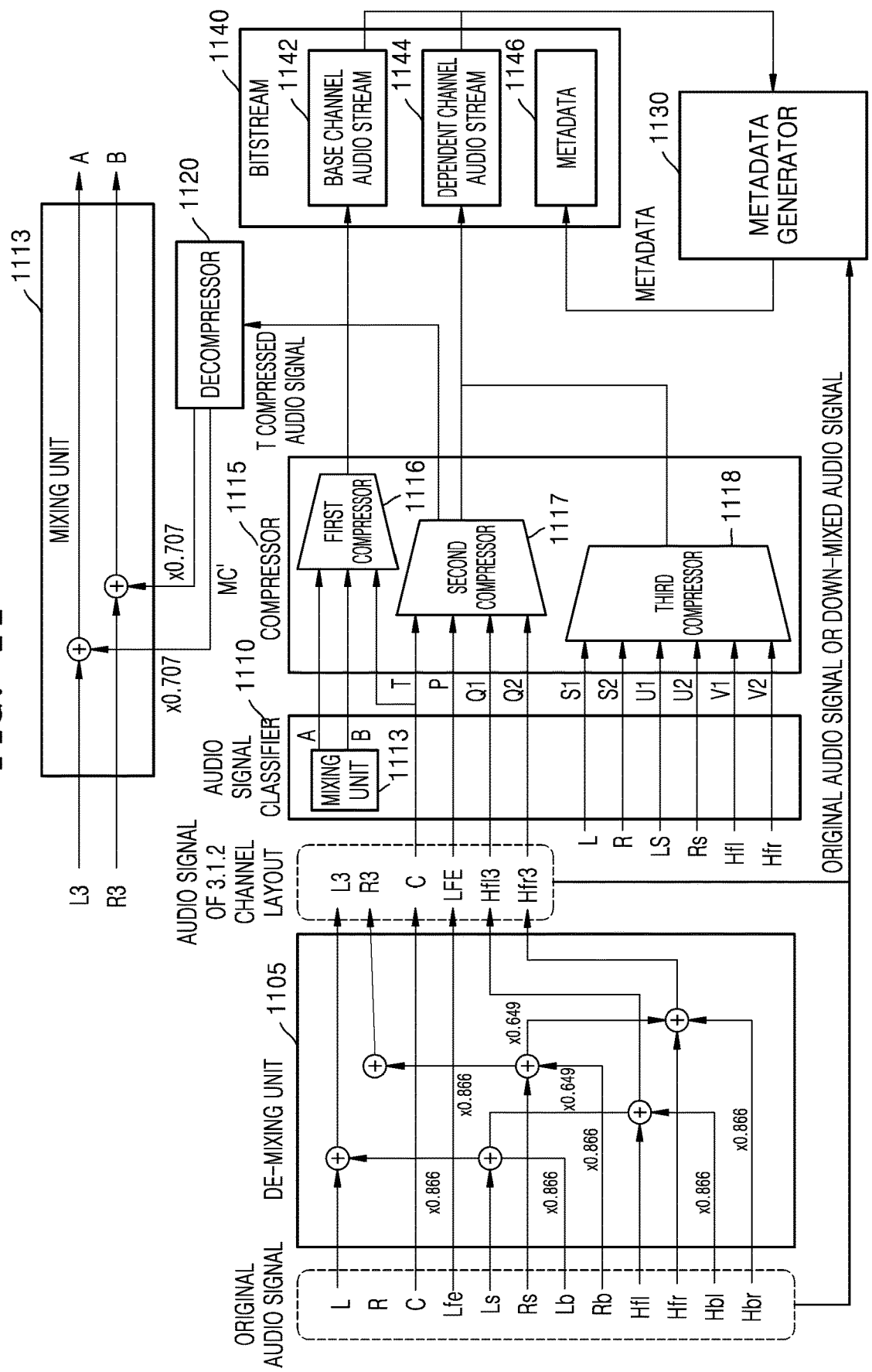
FIG. 11 is a view for describing an audio encoding apparatus according to various embodiments of the disclosure.

FIG. 11 is a view for describing an audio encoding apparatus according to various embodiments of the disclosure.

The audio encoding apparatuses 200 and 400 may include a de-mixing unit 1105, an audio signal classifier 110, a compressor 1115, a decompressor 1120, and a metadata generator 1130.

The de-mixing unit 1105 may obtain an audio signal of a lower channel layout by de-mixing the original audio signal. In this case, the original audio signal may be the audio signal of the 7.1.4 channel layout, and the audio signal of the lower channel layout may be the audio signal of the 3.1.2 channel layout.

The audio signal classifier 1110 may classify audio signals to be used for compression from an audio signal of at least one channel layout. The mixing unit 1113 may generate a mixed channel audio signal by mixing audio signals of some channels. The audio signal classifier 1110 may output the mixed channel audio signal.

For example, the mixing unit 1113 may mix the audio signals L3 and R3 of the 3.1.2 channel layout with a center channel signal C_1 of the 3.1.2 channel layout. In this case, audio signals A and B of a new mixed channel may be generated. C_1 may be a signal obtained by decompressing a compressed signal C of the center channel among the audio signals of the 3.1.2 channel layout.

That is, the signal C of the center channel among the audio signals of the 3.1.2 channel layout may be classified as a T signal. A second compressor 1117 of the compressor 1115 may obtain a T compressed audio signal by compressing the T signal. The decompressor 1120 may obtain C_1 by decompressing the T compressed audio signal.

The compressor 1115 may compress at least one audio signal classified by the audio signal classifier 1110. The compressor 1115 may include a first compressor 1116, the second compressor 1117, and a third compressor 1118. The first compressor 1116 may compress the audio signals A and B of the base channel group and generate a base channel audio stream 1142 including the compressed audio signals A and B. The second compressor 1117 may compress audio signals T, P, Q1, and Q2 of a first dependent channel group to generate a dependent channel audio stream 1144 including the compressed audio signals T, P, Q1, and Q2.

The third compressor 1118 may compress audio signals S1, S2, U1, U2, V1, and V2 of a second dependent channel group to generate the dependent channel audio stream 1144 including the compressed audio signals S1, S2, U1, U2, V1, and V2.

In this case, by classifying audio signals of the L, R, C, Lfe, Ls, Rs, Hfl, and Hfr channels close to the screen among the audio signals of the 7.1.4 channel layout as the audio signals S1, S2, U1, U2, V1, and V2 and compressing them, the sound quality of the screen-centered audio channel may be improved.

The metadata generator 1130 may generate metadata including additional information based on at least one of an audio signal or a compressed audio signal. The audio signal may include the original audio signal and an audio signal of the lower channel layout generated by down-mixing the original audio signal. The metadata may be included in a metadata header 1146 of a bitstream 1140.

The mixing unit 1113 may mix generate the audio signal A and the audio signal B by mixing the non-compressed audio signal C with L3 and R3. However, when the audio decoding apparatuses 300 and 500 obtain L3_1 and R3_1 by de-mixing the audio signals A and B mixed with the non-compressed audio signal C, the sound quality is degraded more than the original audio signals L3 and R3.

The mixing unit 1113 may generate the audio signal A and the audio signal B by mixing C_1 that is obtained by decompressing compressed C, in place of C. In this case, when the audio decoding apparatuses 300 and 500 generate L3_1 and R3_1 by de-mixing the audio signals A and B mixed with the audio signal C1, L3_1 and R3_1 may have improved sound quality when compared to L3_1 and R3_1 in which the audio signal C is mixed.

Figure 12:
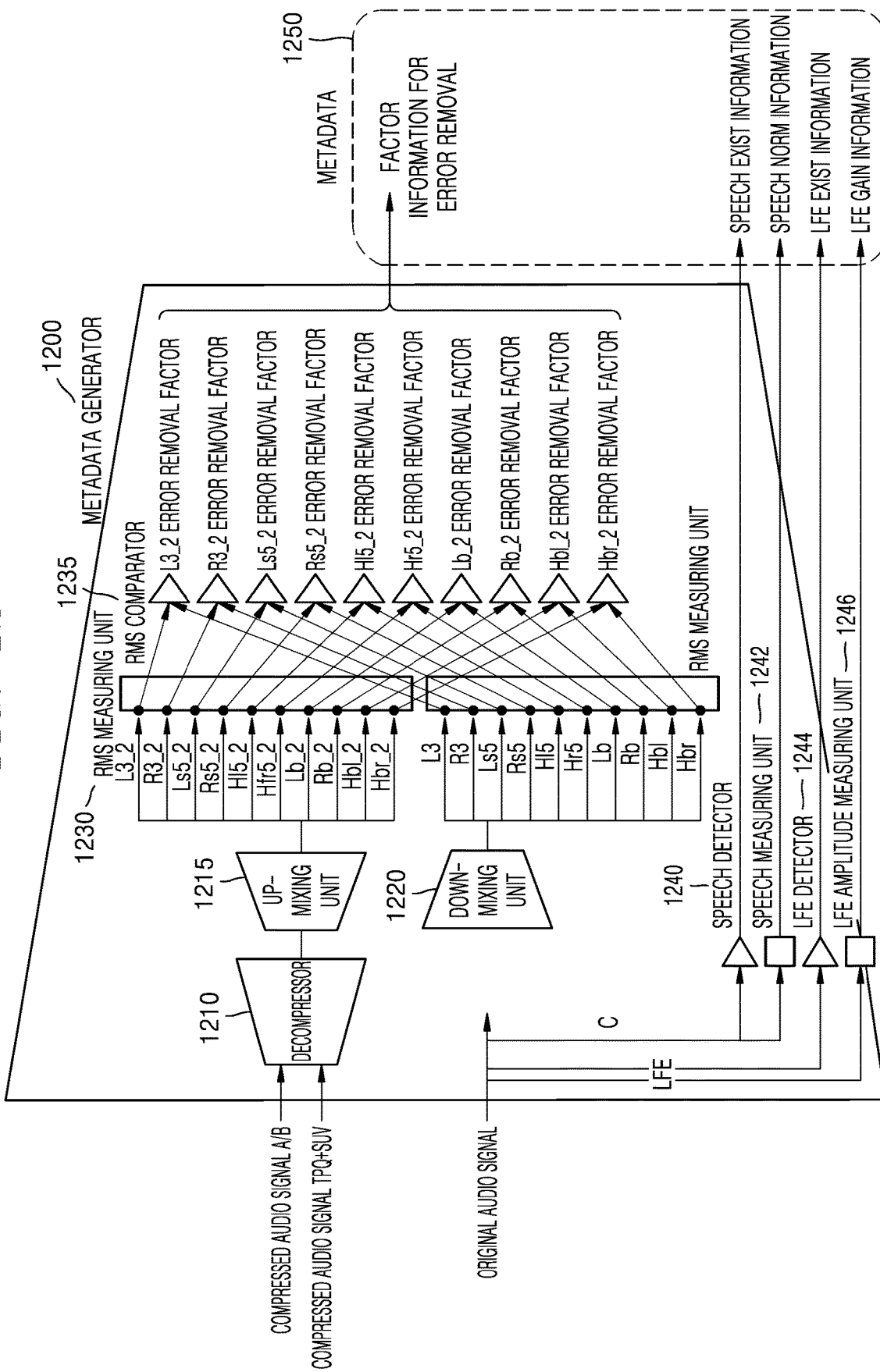
FIG. 12 is a view for describing a metadata generator according to various embodiments of the disclosure.

FIG. 12 is a view for describing a metadata generator according to various embodiments of the disclosure.

Referring to FIG. 12, a metadata generator 1200 may generate metadata 1250 such as factor information for error removal, etc., with the original audio signal, the compressed audio signals A/B, and the compressed audio signals T/P/Q and S/U/V as inputs.

A decompressor 1210 may decompress the compressed audio signals A/B, T/P/Q, and S/U/V. The up-mixing unit 1215 may reconstruct an audio signal of a lower channel layout of the original channel audio signal by de-mixing some of the audio signals A/B, T/P/Q, and S/U/V. For example, an audio signal of the 5.1.4 channel layout may be reconstructed.

A down-mixing unit 1220 may generate the audio signal of the lower channel layout by mixing the original audio signal. In this case, an audio signal of the same channel layout as the audio signal reconstructed by the up-mixing unit 1215 may be generated.

An RMS measuring unit 1230 may measure an RMS value of the audio signal of each up-mixed channel reconstructed by the up-mixing unit 1215. The RMS measuring unit 1230 may measure the RMS value of the audio signal of each channel generated from the down-mixing unit 1220.

An RMS comparator 1235 may one-to-one compare an RMS value of the audio signal of the up-mixed channel reconstructed by the up-mixing unit 1215 with an RMS value of the audio signal of a channel generated by the down-mixing unit 1220 for each channel to generate an error removal factor of each up-mixed channel.

The metadata generator 1200 may generate the metadata 1250 including information about the factor for error removal of each up-mixed channel.

A speech detector 1240 may identify whether speech exists from the audio signal C of the center channel included in the original audio signal. The metadata generator 1200 may generate the metadata 1250 including speech exist information, based on a result of identification of the speech detector 1240.

A speech measuring unit 1242 may measure a norm value of speech from the audio signal C of the center channel included in the original audio signal. The metadata generator 1200 may generate the metadata 1250 including speech norm information, based on a result of measurement of the speech measuring unit 1242.

An LFE detector 1244 may detect an LFE from an audio signal of an LFE channel included in the original audio signal. The metadata generator 1200 may generate the metadata 1250 including LFE exist information, based on a result of detection of the LFE detector 1244.

An LFE amplitude measuring unit 1246 may measure an amplitude of the audio signal of the LFE channel included in the original audio signal. The metadata generator 1200 may generate the metadata 1250 including LFE gain information, based on a result of measurement of the LFE amplitude measuring unit 1246.

Figure 13:
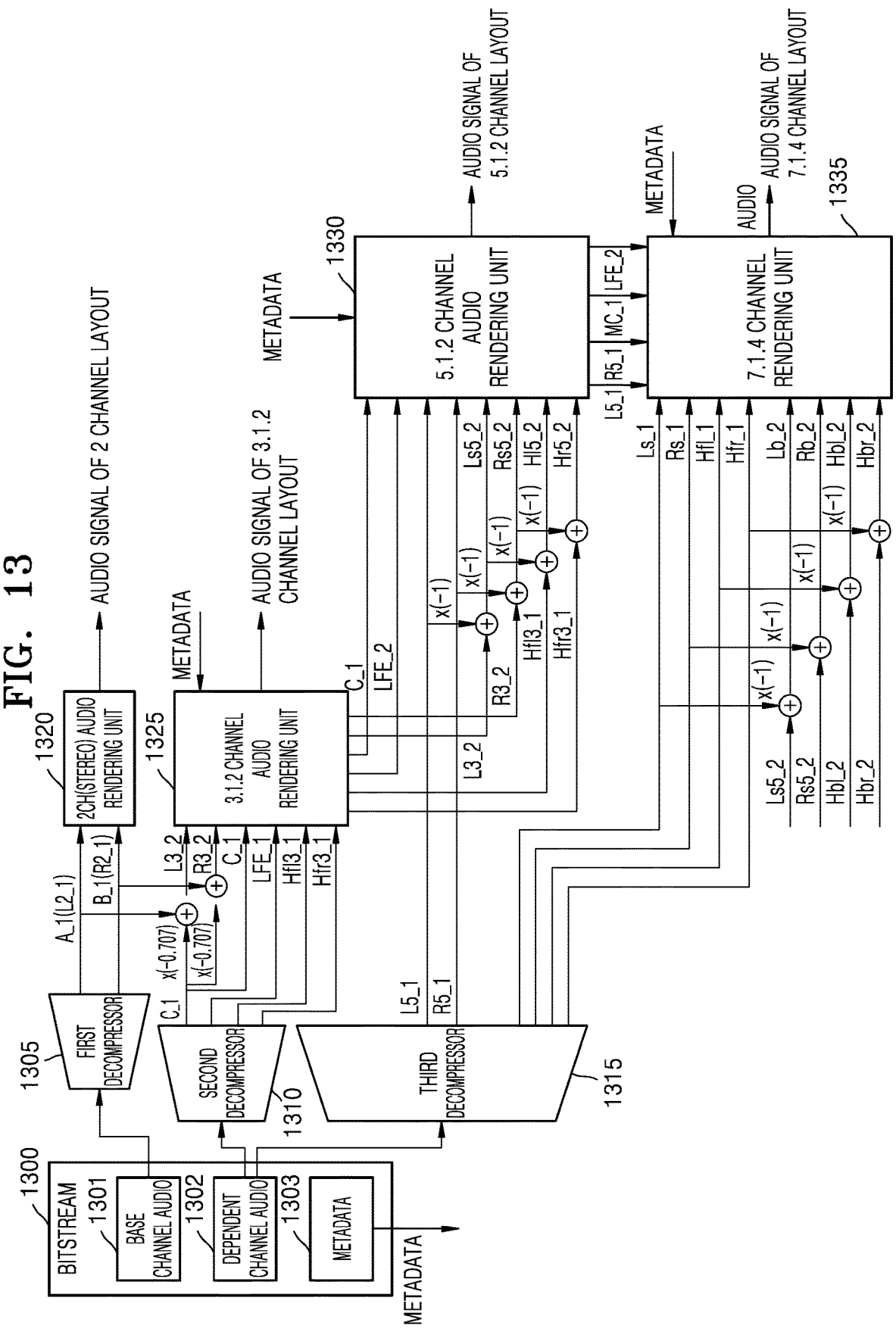
FIG. 13 is a view for describing an audio decoding apparatus according to various embodiments of the disclosure.

FIG. 13 is a view for describing an audio decoding apparatus according to various embodiments of the disclosure.

Referring to FIG. 13, the audio decoding apparatuses 300 and 500 may reconstruct an audio signal of at least one channel layout, with a bitstream 1300 as an input.

A first decompressor 1305 may reconstruct A_1 (L2_1) and B_1 (R2_1) signals by decompressing a compressed audio signal of base channel audio 1301 included in a bitstream. A 2-channel audio rendering unit 1320 may reconstruct the audio signals L2_1 and R2_1 of the 2 channel (stereo channel) layout, based on the reconstructed A_1 and B_1 signals L2_1 and R2_1.

A second decompressor 1310 may reconstruct the C_1, LFE_1, Hfl3_1, and Hfr3_1 signals by decompressing a compressed audio signal of dependent channel audio 1302 included in the bitstream.

The audio decoding apparatuses 300 and 500 may generate an L3_2 signal by de-mixing the C_1 and A_1 signals. The audio decoding apparatuses 300 and 500 may generate an R3_2 signal by de-mixing the C_1 and B_1 signals.

A 3.1.2 channel audio rendering unit 1325 may output an audio signal of the 3.1.2 channel layout with the L3_2, R3_2, C_1, LFE_1, Hfl3_1, and Hfr3_1 signals as inputs. The 3.1.2 channel audio rendering unit 1325 may reconstruct the audio signal of the 3.1.2 channel layout, based on metadata included in a metadata header 1303.

A third decompressor 1315 may reconstruct L_1 and R_1 signals by decompressing a compressed audio signal of dependent channel audio 1302 included in the bitstream 1300.

The audio decoding apparatuses 300 and 500 may generate an Ls5_2 signal by de-mixing the L3_2 and L_1 signals.

The audio decoding apparatuses 300 and 500 may generate an Rs5_2 signal by de-mixing the R3_1 and R_1 signals.

The audio decoding apparatuses 300 and 500 may generate an Hl5_2 signal by de-mixing the Hfl3_1 and Ls5_2 signals. The audio decoding apparatuses 300 and 500 may generate a Hr5_2 signal by de-mixing the Hfr3_1 and Rs_2 signals.

A 5.1.2 channel audio rendering unit 1330 may output an audio signal of the 5.1.2 channel layout with the C_1, LFE_1, L_1, R_1, Ls5_2, Rs5_2, Hl5_2, and Hr5_2 signals as inputs. The 5.1.2 channel audio rendering unit 1330 may reconstruct the audio signal of the 5.1.2 channel layout, based on metadata included in the metadata header 1303.

A third decompressor 1315 may reconstruct the Ls_1, Rs_1, Hfl_1, and Hfr_1 signals by decompressing a compressed audio signal of dependent channel audio 1302 included in the bitstream 1300.

The audio decoding apparatuses 300 and 500 may generate an Lb_2 signal by de-mixing the Ls5_2 and Ls signals. The audio decoding apparatuses 300 and 500 may generate an Rb_2 signal by de-mixing the Rs5_2 and Rs signals. The audio decoding apparatuses 300 and 500 may generate an Hbl_2 signal by de-mixing the Hl5_2 and Hfl_1 signals. The audio decoding apparatuses 300 and 500 may generate an Hbr_2 signal by de-mixing the MHR_2 and Hfr_1 signals.

A 7.1.4 channel audio rendering unit 1335 may output an audio signal of the 7.1.4 channel layout with the L_1, R_1, C_1, LFE_2, Ls, Rs, HFL_1, Hfr_1, Lb_2, Rb_2, Hbl_2, and Hbr_2 signals as inputs.

The 7.1.4 channel audio rendering unit 1335 may reconstruct the audio signal of the 7.1.4 channel layout, based on metadata included in the metadata header 1303.

Figure 14:
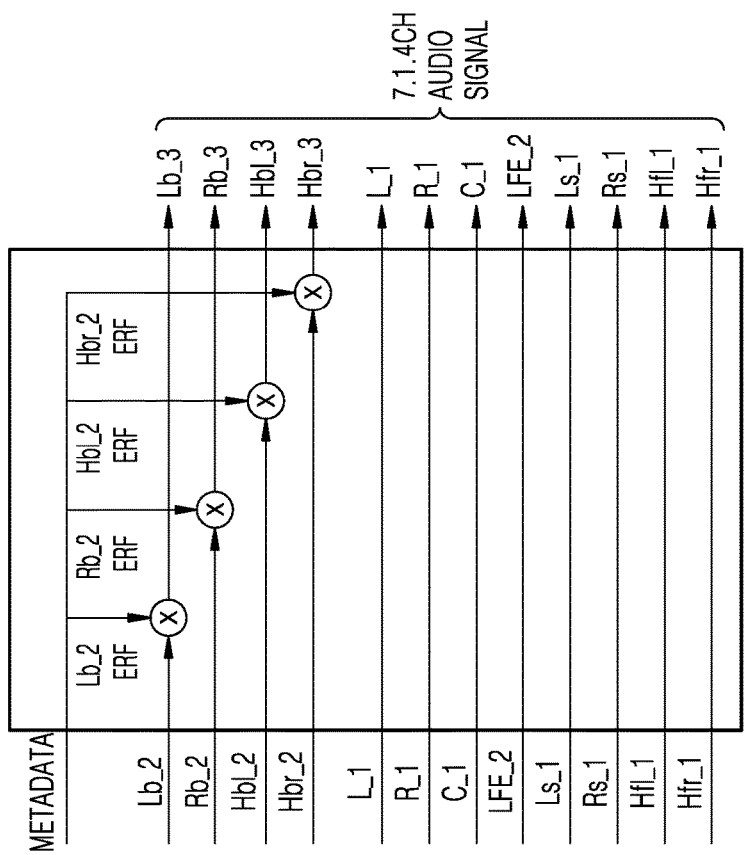
FIG. 14 is a view for describing a 3.1.2 channel audio rendering unit, a 5.1.2 channel audio rendering unit, and a 7.1.4 channel audio rendering unit, according to various embodiments of the disclosure.
Figure 14:
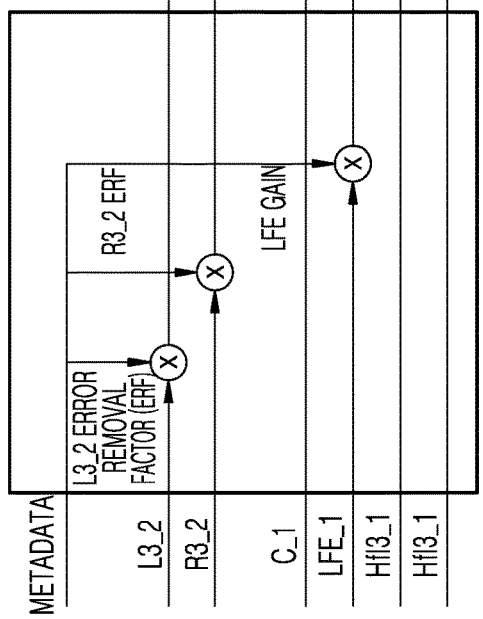
Figure 14:
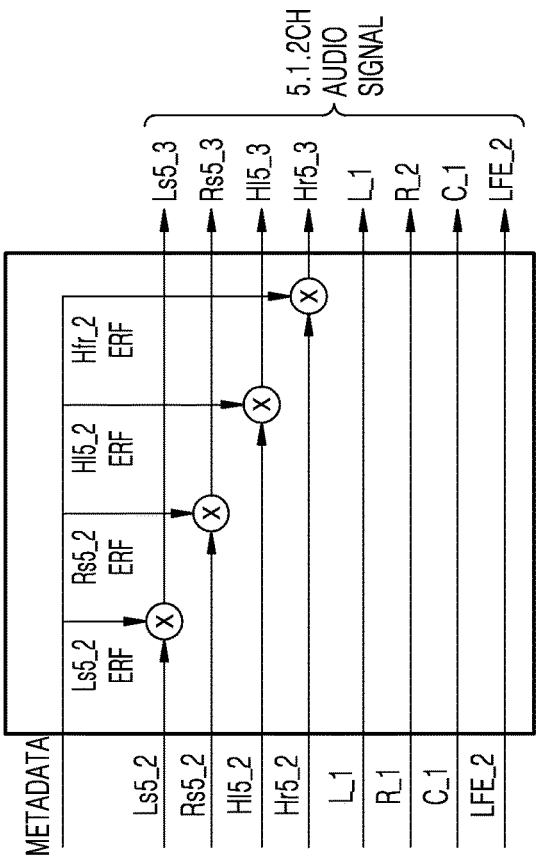

FIG. 14 is a view for describing a 3.1.2 channel audio rendering unit 1410, a 5.1.2 channel audio rendering unit 1420, and a 7.1.4 channel audio rendering unit 1430, according to various embodiments of the disclosure.

Referring to FIG. 14, the 3.1.2 channel audio rendering unit 1410 may generate an L3_3 signal using an L3_2 signal and an L3_2 error removal factor (ERF) included in metadata. The 3.1.2 channel audio rendering unit 1410 may generate an R3_3 signal using an R3_2 signal and an R3_2 ERF included in the metadata.

The 3.1.2 channel audio rendering unit 1410 may generate an LFE_2 signal using an LFE_1 signal and an LFE gain included in the metadata.

The 3.1.2 channel audio rendering unit 1410 may reconstruct a 3.1.2 channel audio signal including the L3_3, R3_3, C_1, LFE_3, Hfl3_1, and Hfr3_1 signals.

The 5.1.2 channel audio rendering unit 1420 may generate Ls5_3 using an Ls5_2 signal and an Ls5_3 ERF included in the metadata.

The 5.1.2 channel audio rendering unit 1420 may generate Rs5_3 using an Rs5_2 signal and an Rs5_3 ERF included in the metadata. The 5.1.2 channel audio rendering unit 1420 may generate Hl5_3 using an Hl5_2 signal and an Hl5_2 ERF included in the metadata. The 5.1.2 channel audio rendering unit 1420 may generate Hr5_3 using a Hr5_2 signal and an Hr5_2 ERF.

The 5.1.2 channel audio rendering unit 1420 may reconstruct a 5.1.2 channel audio signal including the Ls5_3, Rs5_3, Hl5_3, Hr5_3, L_1, R_1, C_1, and LFE_2 signals.

A 7.1.4 channel audio rendering unit 1430 may generate Lb_3 using an Lb_2 signal and an Lb_2 ERF.

The 7.1.4 channel audio rendering unit 1430 may generate an Rb_3 using an Rb_2 signal and an Rb_2 ERF.

The 7.1.4 channel audio rendering unit 1430 may generate an Hbl_3 using an Hbl_2 signal and an Hbl_2 ERF.

The 7.1.4 channel audio rendering unit 1430 may generate an Hbr_3 using an Hbr_2 signal and an Hbr_2 ERF.

The 7.1.4 channel audio rendering unit 1430 may reconstruct a 7.1.4 channel audio signal including the Lb_3, Rb_3, Hbl_3, Hbr_3, L_1, R_1, C_1, LFE_2, Ls_1, Rs_1, HFL_1, and Hfr_1 signals.

Figure 15A:
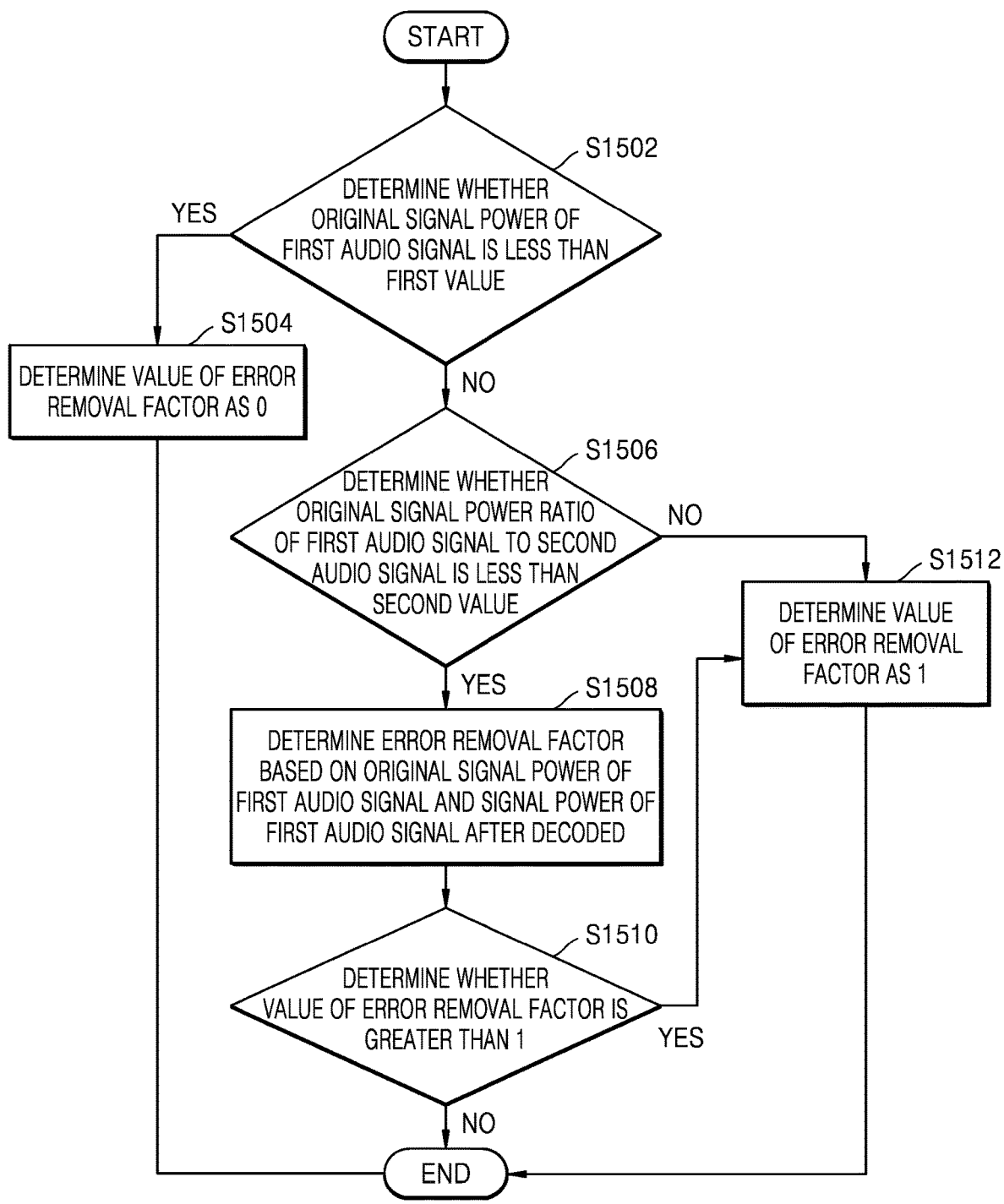
FIG. 15A is a flowchart for describing a process of determining a factor for error removal by an audio encoding apparatus, according to various embodiments of the disclosure.

FIG. 15A is a flowchart for describing a process of determining a factor for removing an error by an audio encoding apparatus 400, according to various embodiments of the disclosure.

In operation S1502, the audio encoding apparatus 400 may determine whether the original signal power of a first audio signal is less than a first value. Herein, the original signal power may refer to a signal power of the original audio signal or a signal power of an audio signal down-mixed from the original audio signal. That is, the first audio signal may be an audio signal of at least some channel of the original audio signal or the audio signal down-mixed from the original audio signal.

In operation S1504, when the original signal power of the first audio signal is less than a first value (Yes), the audio encoding apparatus 400 may determine a value of an error removal factor as 0 for the first audio signal.

In operation S1506, when the original signal power of the first audio signal is equal to or greater than the first value (No), the audio encoding apparatus 400 may determine whether an original signal power ratio of the first audio signal to the second audio signal is less than a second value.

In operation S1508, when the original signal power of the first audio signal is less than the second value (Yes), the audio encoding apparatus 400 may determine an error removal factor based on the original signal power of the first audio signal and the signal power of the first audio signal after decoded.

In operation S1510, the audio encoding apparatus 400 may determine whether the value of the error removal factor is greater than 1.

In operation S1512, when the signal power ratio of the first audio signal and the second audio signal is equal to or greater than the second value (No), the audio encoding apparatus 400 may determine the value of the error removal factor as 1 for the first audio signal.

Alternatively or additionally, in operation S1510, when the value of the error removal factor is greater than 1 (Yes), the audio encoding apparatus 400 may determine the value of the error removal factor as 1 for the first audio signal.

Figure 15B:
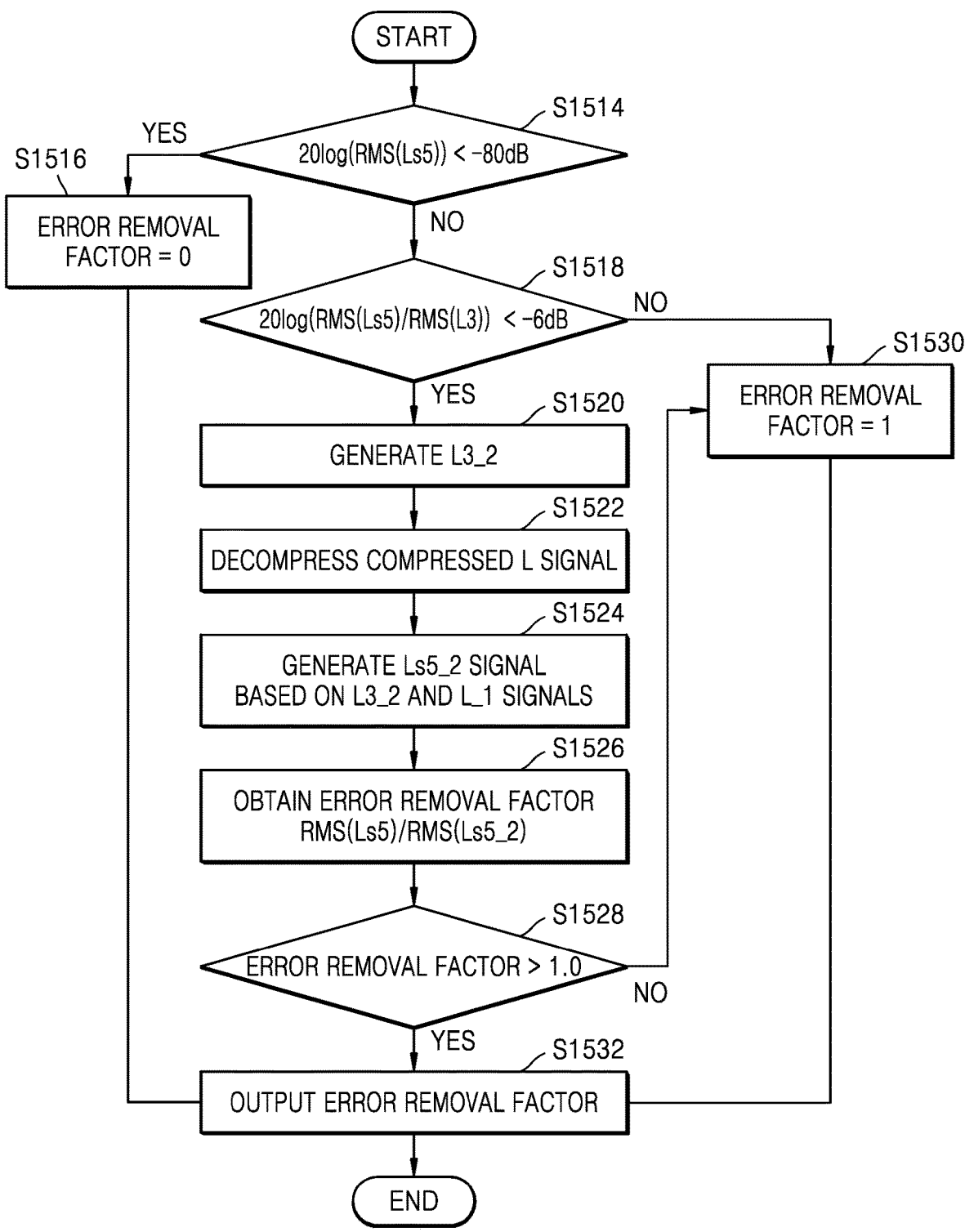
FIG. 15B is a flowchart for describing a process of determining a scale factor for an Ls5 signal by the audio encoding apparatus, according to various embodiments of the disclosure.

FIG. 15B is a flowchart for describing a process of determining a scale factor for an Ls5 signal by the audio encoding apparatus 400, according to various embodiments of the disclosure.

Referring to FIG. 15B, in operation S1514, the audio encoding apparatus 400 may determine whether a power 20 log(RMS(Ls5)) of the Ls5 signal is less than −80 dB. Herein, the RMS value may be calculated in the unit of a frame. For example, one frame may include, but not limited to, audio signals of 960 samples, and one frame may include audio signals of a plurality of samples. An RMS value of X, RMS(X), may be calculated by Eq. 1. Herein, N indicates the number of samples.

$$S(X) = SQRT(\text{MEAN}(X^2)) = \sqrt{\frac{\sum_{i=1}^{N-1} X_i^2}{N}} \quad [\text{Eq. 1}]$$

In operation S1516, the audio encoding apparatus 400 may determine an error removal factor as 0 for the Ls5_2 signal, when the power of the Ls5 signal is less than −80 dB.

In operation S1518, the audio encoding apparatus 400 may determine whether a ratio of the power of the Ls5 signal to the power of the L3 signal, 20 log(RMS(Ls5)/RMS(L3)), for one frame is less than −6 dB.

In operation S1520, when the ratio of the power of the Ls5 signal to the power of the L3 signal, 20 log(RMS(Ls5)/RMS(L3)), for one frame is less than −6 dB (Yes), the audio encoding apparatus 400 may generate the L3_2 signal. For example, the audio encoding apparatus 400 may compress the C signal and the L2 signal by down-mixing the original audio signal to obtain the C_1 signal and the L2_1 signal, and obtain the C_1 signal and the L2_1 signal by decompressing the compressed C signal and L2 signal. The audio encoding apparatus 400 may generate an L3_2 signal by de-mixing the C_1 and L2_1 signals.

In operation S1522, the audio encoding apparatus 400 may obtain the L_1 signal by decompressing the compressed L signal.

In operation S1524, the audio encoding apparatus 400 may generate the Ls5_2 signal based on the L3_2 signal and the L_1 signal.

In operation S1526, the audio encoding apparatus 400 may determine an error removal factor RMS(Ls5)/RMS(Ls5_2) based on a power value of Ls5, RMS(Ls5), and a power value of Ls5_2, RMS(Ls5_2).

In operation S1528, the audio encoding apparatus 400 may determine whether the value of the error removal factor is greater than 1.

In operation S1530, when the value of the error removal factor is greater than 1 (Yes), the audio encoding apparatus 400 may determine the value of the error removal factor as 1.

In operation S1532, the audio encoding apparatus 400 may store and output an error removal factor of the Ls5_2 signal. The audio encoding apparatus 400 may generate error removal-related information, which includes information about the error removal factor, and generate additional information including the error removal-related information. The audio encoding apparatus 400 may generate and output a bitstream including the additional information.

Figure 15C:
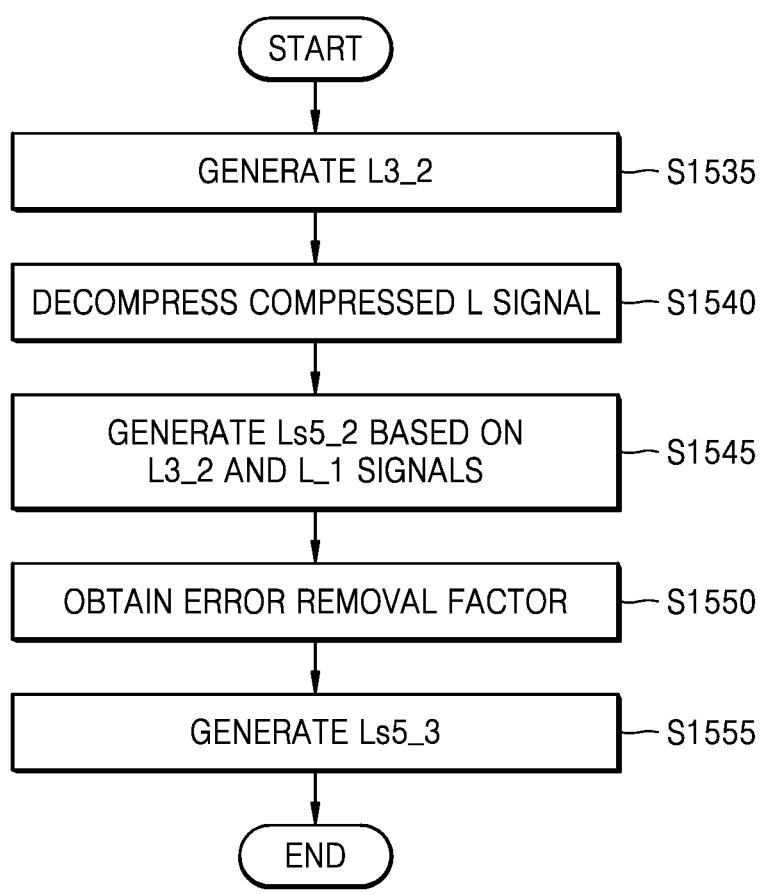
FIG. 15C is a flowchart for describing a process of generating an Ls5_3 signal, based on a factor for error removal by an audio encoding apparatus according to various embodiments of the disclosure.

FIG. 15C is a flowchart for describing a process of generating an Ls5_3 signal, based on a factor for error removal by an audio encoding apparatus 500, according to various embodiments of the disclosure.

In operation S1535, the audio decoding apparatus 500 may generate the L3_2 signal.

For example, the audio decoding apparatus 500 may obtain the C_1 signal and the L2_1 signal by decompressing the compressed C signal and L2 signal. The audio encoding apparatus 400 may generate the L3_2 signal by de-mixing the C_1 and L2_1 signals.

In operation S1540, the audio decoding apparatus 500 may obtain the L_1 signal by decompressing the compressed L signal.

In operation S1545, the audio decoding apparatus 500 may generate the Ls5_2 signal based on the L3_2 signal and the L_1 signal. That is, the audio decoding apparatus 500 may generate the Ls5_2 signal by de-mixing the L3_2 signal and the L_1 signal.

In operation S1550, the audio decoding apparatus 500 may obtain the error removal factor for the Ls_2 signal.

In operation S1555, the audio decoding apparatus 500 may generate the Ls5_3 signal by applying the error removal factor to the Ls5_2 signal. The Ls5_3 signal having an RMS value (e.g., an RMS value that is almost equal to an RMS value of Ls5) that is a product of the RMS value of Ls5_2 and the error removal factor may be generated.

In a process of performing lossy coding on a mixed channel audio signal obtained by mixing audio signals of a plurality of audio channels, an error may occur in the audio signal. For example, an encoding error may occur in an audio signal in a process of quantization with respect to the audio signal.

In particular, an encoding error may occur in an encoding process (e.g., quantization) with respect to an audio signal using a model based on psycho-auditory characteristics. For example, when a strong sound and a weak sound are generated at the same time at an adjacent frequency, a masking feature, which is a phenomenon where a listener may not hear the weak sound, may occur. That is, because of a strong interrupting sound of the adjacent frequency, the minimum audible limit of a weak target sound is increased.

Thus, when the audio encoding apparatus 400 performs quantization using a psychoacoustic model for a band of a weak sound, an audio signal in the band of the weak sound may not be encoded.

For example, when a masked sound (e.g., a weak sound) exists in the Ls5 signal and a maker sound (e.g., a strong sound) exists in the L signal, the L3_2 signal may be a signal in which the masked sound is substantially removed from a signal (L3 signal) in which the masked sound and the masker sound are mixed, due to masking characteristics.

In some embodiments, when the Ls5_2 is generated by de-mixing the L3_2 signal and the L_1 signal, the Ls5_2 signal may include the masker sound of very small energy in the form of noise due to an encoding error based on the masking characteristics.

The masker sound included in the Ls5_2 signal may have very small energy when compared to an existing masker sound, but may have larger energy than the masked sound. In this case, in the Ls5_2 channel where the masked sound is to be output, the masker sound having larger energy may be output. Thus, to reduce noise in the Ls5_2 channel, the Ls5_2 signal may be scaled to have the same signal power as that of the Ls5 signal including the masked sound, an error caused by lossy encoding may be removed. In this case, a factor for a scaling operation (e.g., a scale factor) may be an error removal factor. The error removal factor may be expressed as a ratio of the original signal power of the audio signal to the signal power after decoding of the audio signal, and the audio decoding apparatus 500 may reconstruct the audio signal having the same signal power as the original signal power by performing the scaling operation on the decoded signal based on the scale factor.

Thus, the listener may expect improvement of sound quality as the energy of the masker sound output in the form of noise in a particular channel decreases.

In some embodiments, when the signal power of the masked sound is less than the signal power of the masker sound by a certain value by comparing the original signal powers of the masked sound and the masker sound, it may be identified that an encoding error caused by a masking phenomenon occurs and an error removal factor may be determined as a value between 0 and 1. For example, as a value of an error removal factor, a ratio of the original signal power to the signal power after decoding may be determined. However, depending on circumstances, when the ratio is greater than 1, the value of the error removal factor may be determined as 1. That is, for the value of error removal factor greater than 1, the energy of the decoded signal may increase, but when the energy of the decoded signal in which the masker sound is inserted in the form of noise increases, the noise may further increase.

Thus, in this case, the value of the error removal factor may be determined as 1 to maintain the current energy of the decoded signal.

When the ratio of the signal power of the masked sound to the signal power of the masker sound is greater than or equal to a certain value, it may be identified that the encoding error caused by the masking phenomenon does not occur, and the value of the error removal factor may be determined as 1 to maintain the current energy of the decoded signal.

Thus, the audio encoding apparatus 200 may generate the error removal factor based on the signal power of the audio signal, and transmit information about the error removal factor to the audio decoding apparatus 300. The audio decoding apparatus 300 may reduce the energy of the masker sound in the form of noise to match the energy of the masked sound of the target sound, by applying the error removal factor to the audio signal of the up-mixed channel, based on the information about the error removal factor.

Figure 16A:
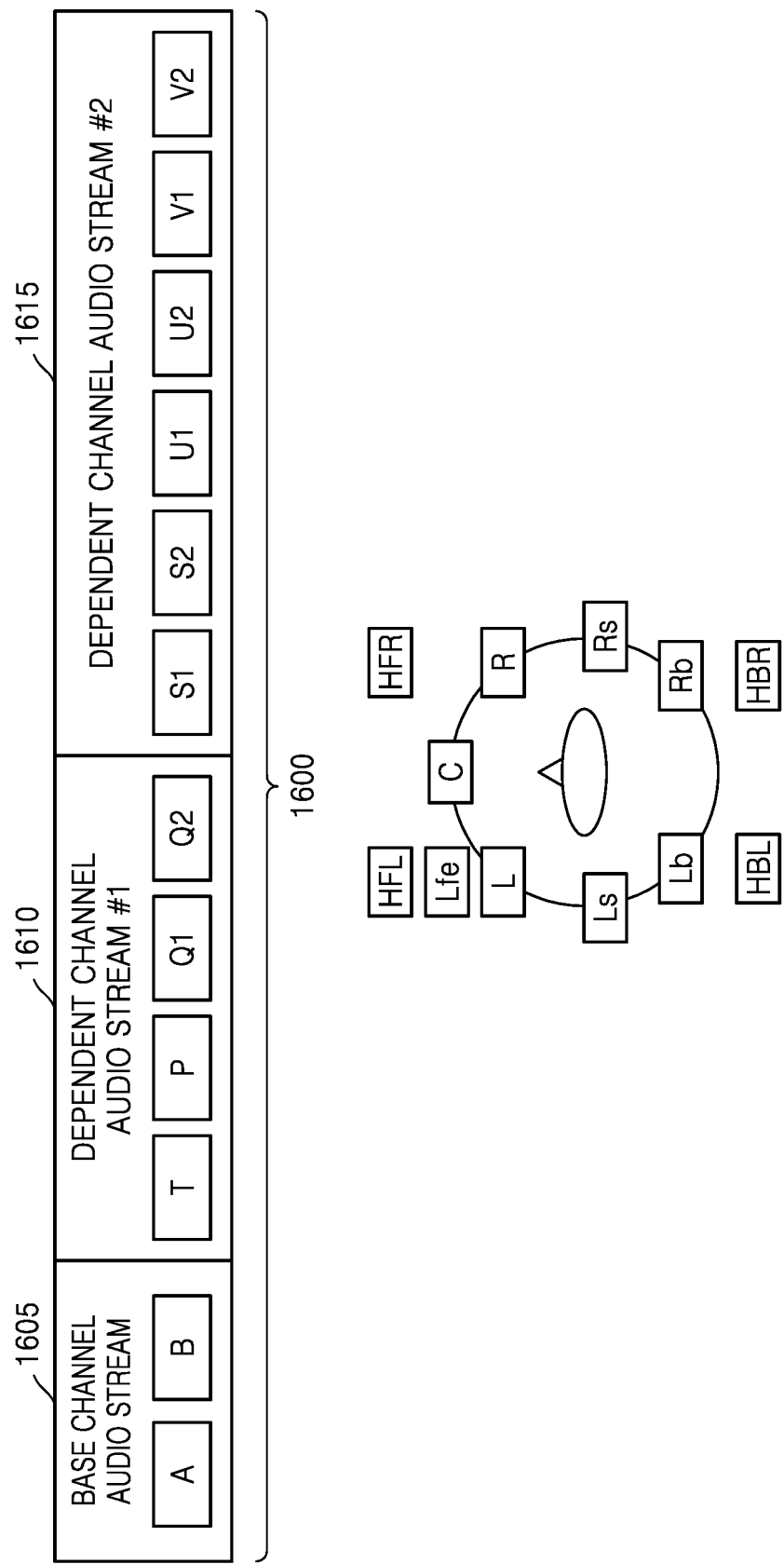
FIG. 16A is a view for describing a configuration of a bitstream for channel layout extension, according to various embodiments of the disclosure.

FIG. 16A is a view for describing a configuration of a bitstream for channel layout extension, according to various embodiments of the disclosure.

Referring to FIG. 16A, a bitstream 6000 may include a base channel audio stream 1605, a dependent channel audio stream #1 1610, and a dependent channel audio stream #2 1615. The base channel audio stream 1605 may include the A signal and the B signal. The audio decoding apparatuses 300 and 500 may decompress the A signal and the B signal included in the base channel audio stream 1605, and reconstruct the audio signals (L2 and R2 signals) of the 2-channel layout based on the decompressed A and B signals.

The dependent channel audio stream #1 1610 may include the other 4 channel audio signals T, P, Q1, and Q2 except for the reconstructed 2-channel of the 3.1.2 channel. The audio decoding apparatuses 300 and 500 may decompress the audio signals T, P, Q1, and Q2 included in the dependent channel audio stream #1 1610, and reconstruct the audio signals (L3, R3, C, LFE, Hfl3, and Hfr3 signals) of the 3.1.2 channel layout based on the decompressed audio signals T, P, Q1, and Q2 and the existing decompressed A signal and B signal.

Alternatively or additionally, the dependent channel audio stream #2 1615 may include audio signals S1, S2, U1, U2, V1, and V2 of the other 6 channels except for the reconstructed 3.1.2 channel of the 7.1.4 channel. The audio decoding apparatuses 300 and 500 may reconstruct audio signals (L5, R5, Ls5, Rs5, C, LFE, Hl5, and Hr5 signals) of the 5.1.2 channel layout, based on the audio signals S1, S2, U1, U2, V1, and V2 included in the dependent channel audio stream #2 1615 and the previously reconstructed audio signal of the 3.1.2 channel layout.

As described above, the dependent channel audio stream #2 1615 may include audio signals of discrete channels. To extend the number of channels, audio signals of a number being equal to the number of channels may be compressed and included in the audio stream #2 1615. Thus, as the number of channels is extended, the amount of data included in the dependent channel audio stream #2 1615 may increase.

Figure 16B:
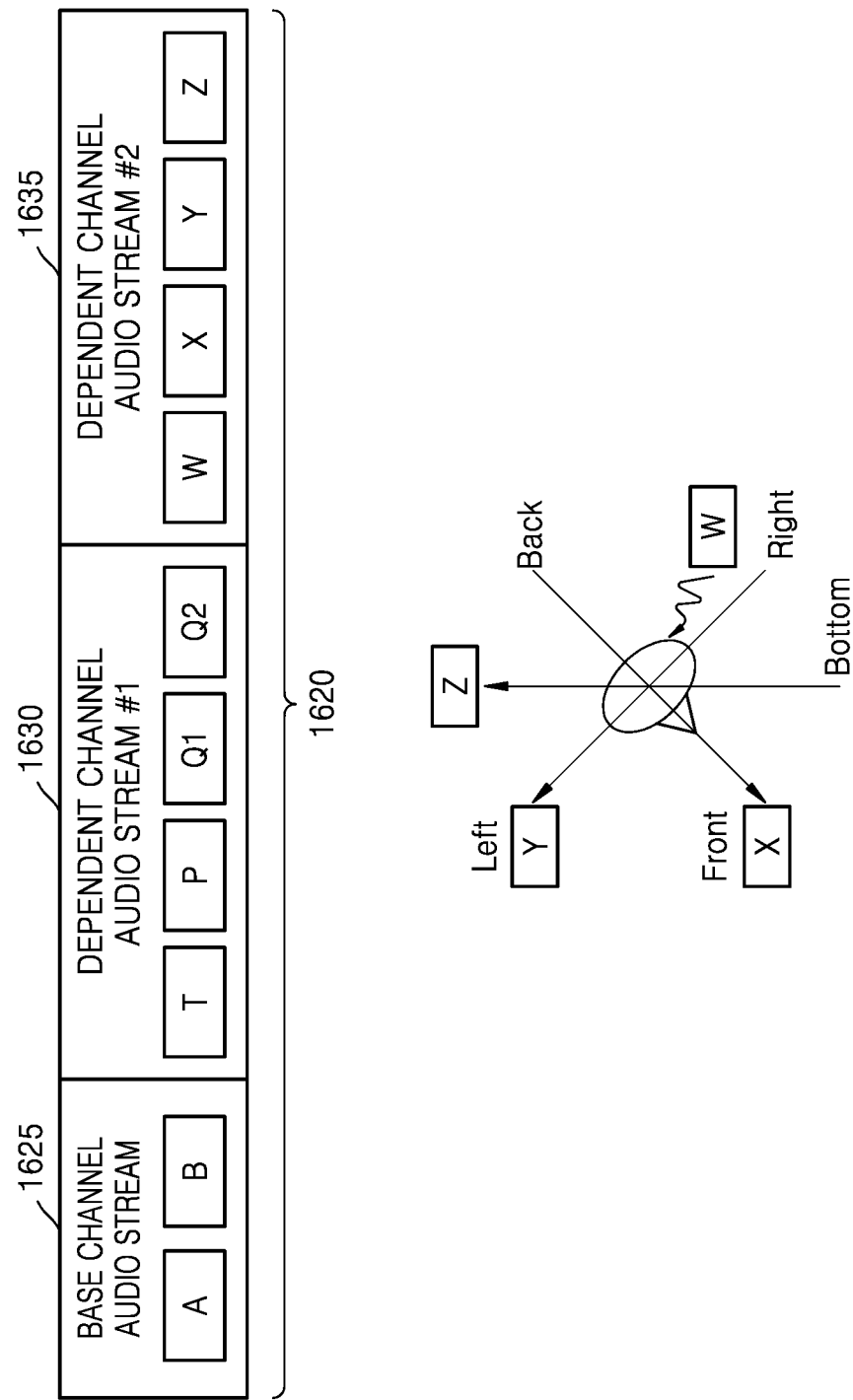
FIG. 16B is a view for describing a configuration of a bitstream for channel layout extension, according to various embodiments of the disclosure.

FIG. 16B is a view for describing a configuration of a bitstream for channel layout extension, according to various embodiments of the disclosure.

Referring to FIG. 16B, a bitstream 1620 may include a base channel audio stream 1625, a dependent channel audio stream #1 1630, and a dependent channel audio stream #2 1635.

Unlike the dependent channel audio stream #2 1615 of FIG. 16A, the dependent channel audio stream #2 1635 of FIG. 16B may include an audio signal of a WXYZ channel, which is an ambisonic audio signal. The ambisonic audio signal is an audio stream of a continuous channel, and may be expressed as an audio signal of a WXYZ channel even when the extended number of channels is large. Thus, as the extended number of channels increases or audio signals of various channel layouts are reconstructed, the dependent channel audio stream #2 1630 may include an ambisonic audio signal. As described above, the audio encoding apparatuses 200 and 400 may generate additional information including information indicating whether an audio stream of a discrete channel (e.g., the dependent channel audio stream #2 1615 of FIG. 16A) exists and information indicating whether an audio stream of a continuous channel (e.g., the dependent channel audio stream #2 1635 of FIG. 16B)

exists. Thus, the audio encoding apparatuses 200 and 400 may selectively generate bitstreams in various forms, by taking the degree of extension of the number of channels into account.

Figure 16C:
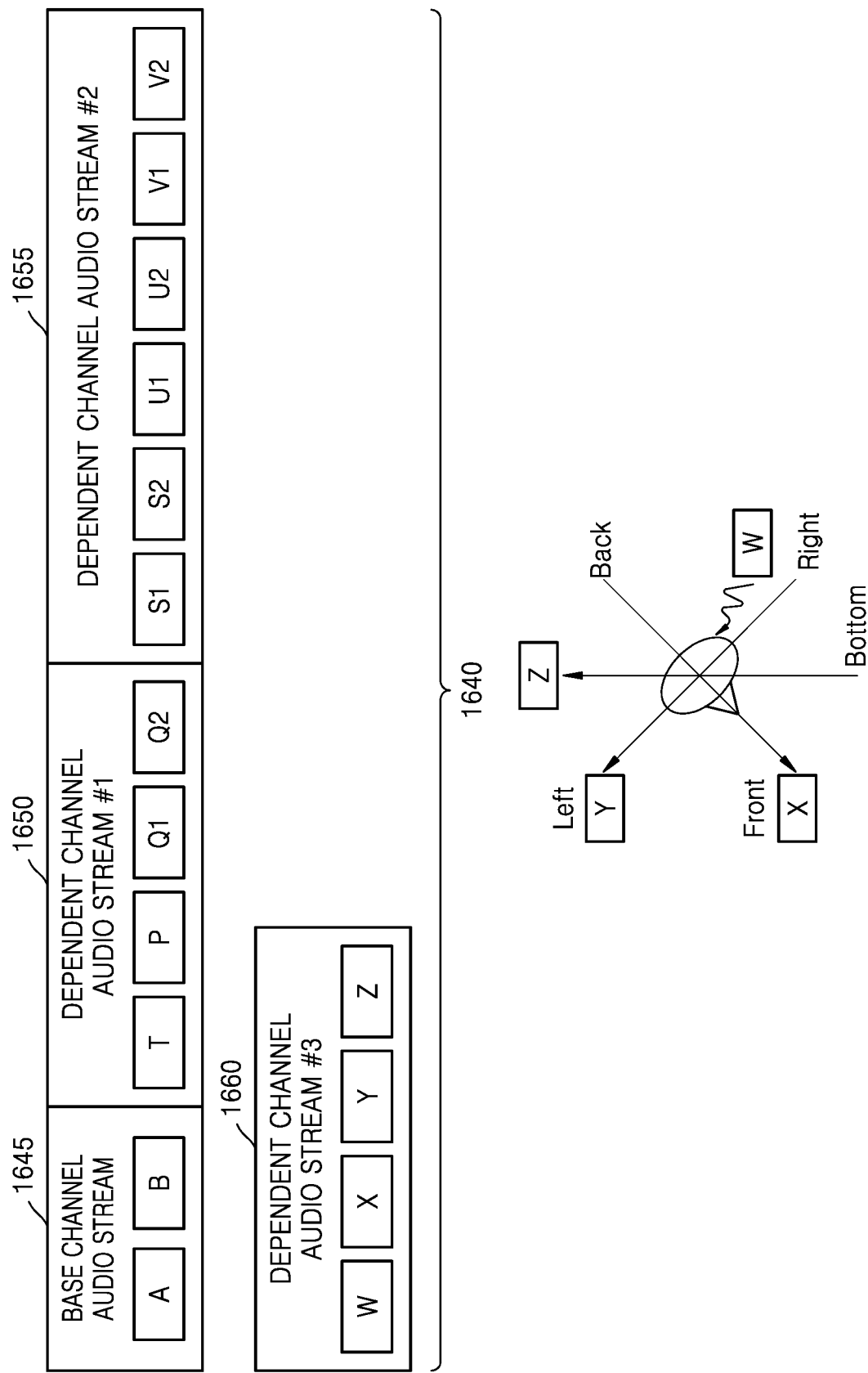
FIG. 16C is a view for describing a configuration of a bitstream for channel layout extension, according to various embodiments of the disclosure.

FIG. 16C is a view for describing a configuration of a bitstream for channel layout extension, according to various embodiments of the disclosure.

Referring to FIG. 16C, a bitstream 1640 may include a base channel audio stream 1645, a dependent channel audio stream #1 1650, a dependent channel audio stream #2 1655, and a dependent channel audio stream #3 1660. Configurations of the base channel audio stream 1645, the dependent channel audio stream #1 1650, and the dependent channel audio stream #2 1655 of FIG. 16C may be the same as those of the base channel audio stream 1605, the dependent channel audio stream #1 1610, and the dependent channel audio stream #2 1615 of FIG. 16A. Thus, the audio decoding apparatuses 300 and 500 may reconstruct an audio signal of the 7.1.4 channel layout based on the base channel audio stream 1645, the dependent channel audio stream #1 1650, and the dependent channel audio stream #2 1655.

Alternatively or additionally, the audio encoding apparatuses 200 and 400 may generate a bitstream 1640 including the dependent channel audio stream #3 1660 including an ambisonic audio signal. Thus, the audio encoding apparatuses 200 and 400 may reconstruct an audio signal of a free channel layout, which is independent of a channel layout. The audio encoding apparatuses 200 and 400 may convert the reconstructed audio signal of the free channel layout into audio signals of various discrete channel layouts.

That is, the audio encoding apparatuses 200 and 400 may freely reconstruct audio signals of various channel layouts by generating a bitstream including the dependent channel audio stream #3 1660 further including an ambisonic audio signal.

Figure 17:
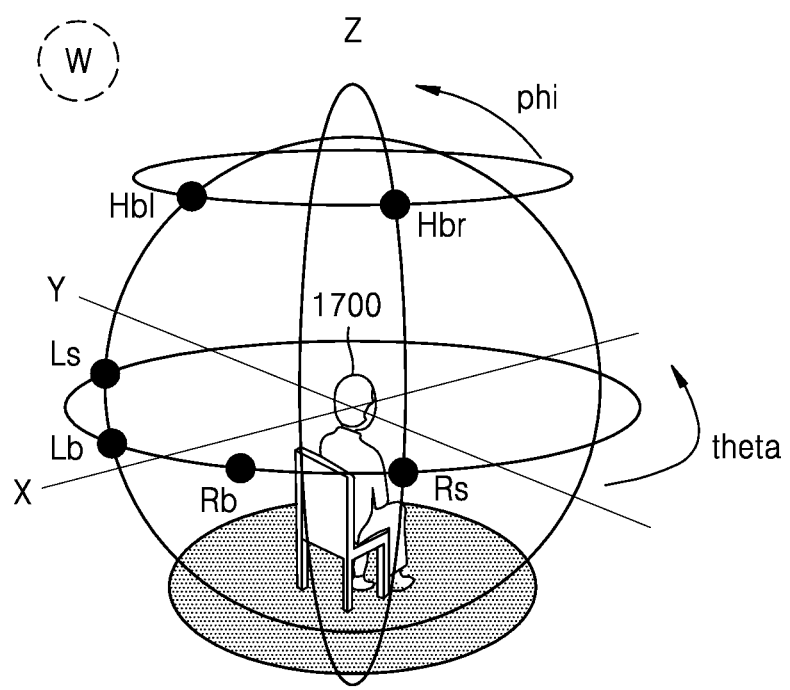
FIG. 17 is a view for describing an ambisonic audio signal added to an audio signal of a 3.1.2 channel layout for channel layout extension, according to various embodiments of the disclosure.

FIG. 17 is a view for describing an ambisonic audio signal added to an audio signal of a 3.1.2 channel layout for channel layout extension, according to various embodiments of the disclosure.

The audio encoding apparatuses 200 and 400 may compress an ambisonic audio signal and generate a bitstream including the compressed ambisonic audio signal. Thus, according to the ambisonic audio signal, the channel layout may be extended from the 3.1.2 channel layout.

For example, referring to FIG. 17, the audio signal of the 3.1.2 channel layout may be an audio signal of a channel located in front of a listener 1700. The audio encoding apparatuses 200 and 400 may obtain an ambisonic audio signal as an audio signal behind the listener 1700 using an ambisonic audio signal capturing device such as an ambisonic microphone. Alternatively or additionally, the audio encoding apparatuses 200 and 400 may obtain an ambisonic audio signal as the audio signal behind the listener 1700 based on audio signals of channels behind the listener 1700.

For example, an Ls signal, an Rs signal, a Lb signal, an Rb signal, an Hbl signal, and an Hbr signal may be defined by theta, phi, and an audio signal S, as in Eq. 2 provided below. Theta and phi are as shown in FIG. 17.

$Ls(theta, phi, S) = (100, 0, S_{Ls})$ $Rs(theta, phi, S) = (250, 0, S_{Rs})$ $Lb(theta, phi, S) = (150, 0, S_{Lb})$ $Rb(theta, phi, S) = (210, 0, S_{Rb})$ $Hbl(theta, phi, S) = (140, 45, S_{Hbl})$ $Hbr(theta, phi, S) = (220, 135, S_{Hbr})$ [Eq. 2]

The audio encoding apparatuses 200 and 400 may generate the signals W, X, Y, and Z based on Eq. 3 provided below. Herein, N1, N2, N3, and N4 may be normalization factors, and $S_x = \cos(theta)*\cos(phi)*S$, $S_y = \sin(theta)*\cos(phi)*S$, and $S_z = \sin(phi)*S$.

$$W = N1\sqrt{\frac{Ls^2 + Rs^2 + Lb^2 + Rb^2 + Hbl^2 + Hbr^2}{6}}$$

$$X = N2\frac{Ls_X + Rs_X + Lb_X + Rb_X + Hbl_X + Hbr_X}{6}$$

$$Y = N3\frac{Ls_y + Rs_y + Lb_y + Rb_y + Hbl_y + Hbr_y}{6}$$

$$Z = N4\frac{Ls_z + Rs_z + Lb_z + Rb_z + Hbl_z + Hbr_z}{6}$$ [Eq. 3]

The audio encoding apparatuses 200 and 400 may compress ambisonic audio signals W, X, Y, and Z and generate a bitstream including the compressed ambisonic audio signals W, X, Y, and Z.

The audio decoding apparatuses 300 and 500 may obtain a bitstream including a compressed audio signal of the 3.1.2 channel layout and a compressed ambisonic audio signal. The audio decoding apparatuses 300 and 500 may generate an audio signal of the 5.1.2 channel layout based on the compressed audio signal of the 3.1.2 channel layout and the compressed ambisonic audio signal.

The audio decoding apparatuses 300 and 500 may generate an audio signal of a channel behind the listener based on the compressed ambisonic audio signal, according to Eq. 4 provided below.

$Ls\_1 = \cos(100)*\cos(0)*X + \sin(100)*\cos(0)*Y + \sin(0)*Z + W$ $Rs\_1 = \cos(250)*\cos(0)*X + \sin(250)*\cos(0)*Y + \sin(0)*Z + W$ $Lb\_1 = \cos(150)*\cos(0)*X + \sin(150)*\cos(0)*Y + \sin(0)*Z + W$ $Rb\_1 = \cos(210)*\cos(0)*X + \sin(210)*\cos(0)*Y + \sin(0)*Z + W$ $Hbl\_1 = \cos(140)*\cos(45)*X + \sin(140)*\cos(45)*Y + \sin(45)*Z + W$ $Hbr\_1 = \cos(220)*\cos(220)*X + \sin(220)*\cos(135)*Y + \sin(135)*Z + W$ [Eq. 4]

The audio decoding apparatuses 300 and 500 may generate C and LFE signals among audio signals of the 5.1.2 channel layout, using the C and LFE signals of the 3.1.2 channel layout.

The audio decoding apparatuses 300 and 500 may generate Hl5, Hr5, L, R, Ls5, and Rs5 signals among audio signals of the 5.1.2 channel layout, according to Eq. 5.

$HL5 = hfl3 - 0.649(Ls\_1 + 0.866 \times Lb\_1)$ $Hr5 = HfR3 - 0.649(Rs\_1 + 0.866 \times Rb\_1)$ $L = L3 - 0.866(Ls\_1 + 0.866 \times Lb\_1)$ $R = R3 - 0.866(Ls\_1 + 0.866 \times Lb\_1)$ $$Ls5 = Ls\_1 + 0.866 \times Lb\_1$$

$$Rs5 = Rs\_1 + 0.866 \times Rb\_1 \qquad [\text{Eq. 5}]$$

The audio decoding apparatuses 300 and 500 may generate C and LFE signals among audio signals of the 7.1.4 channel layout, using the C and LFE signals of the 3.1.2 channel layout.

The audio decoding apparatuses 300 and 500 may generate Ls, Rs, Lb, Rb, Hbl, and Hbr signals among the audio signals of the 7.1.4 channel layout, using Ls_1, Rs_1, Lb_1, Rb_1, Hbl_1, and Hbr_1 obtained from the compressed ambisonic audio signal, other than the compressed audio signal of the 3.1.2 channel layout.

The audio decoding apparatuses 300 and 500 may generate Hfl, Hfr, L, and R signals among the audio signals of the 7.1.4 channel layout, according to Eq. 6.

$$Hfl = Hl5 - Hbl\_1$$

$$Hfr = Hr5 - Hbr\_1$$

$$L = L3 - 0.866(Ls\_1 + 0.866 \times Lb\_1)$$

$$R = R3 - 0.866(Ls\_1 + 0.866 \times Lb\_1) \qquad [\text{Eq. 6}]$$

The audio decoding apparatuses 300 and 500 may reconstruct an audio signal of an extended channel layout from the 3.1.2 channel layout, using the compressed ambisonic audio signal, other than the compressed audio signal of the 3.1.2 channel layout.

Figure 18:
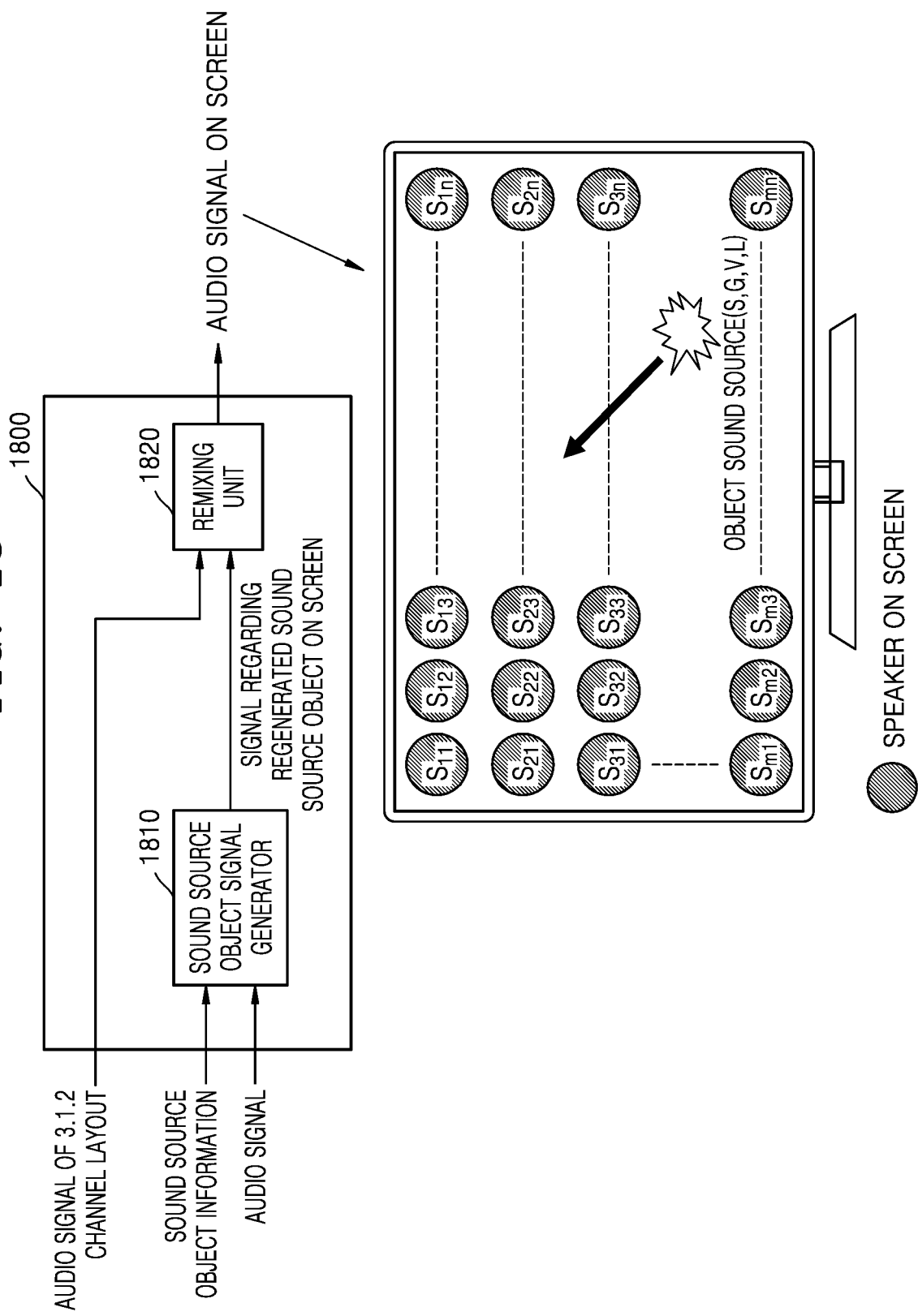
FIG. 18 is a view for describing a process of generating, by an audio decoding apparatus, an object audio signal on a screen, based on an audio signal of a 3.1.2 channel layout and sound source object information, and according to various embodiments of the disclosure.

FIG. 18 is a view for describing a process of generating, by an audio decoding apparatus 1800, an object audio signal on a screen, based on an audio signal of a 3.1.2 channel layout and sound source object information.

The audio encoding apparatuses 200 and 400 may convert an audio signal on a space into an audio signal on a screen, based on sound source object information. Herein, the sound source object information may include sound source object information indicating a mixing level signal object_S of an object on the screen, a size/shape object_G of the object, a location object_L of the object, and a direction object_V of the object.

A sound source object signal generator 1810 may generate S, G, V, and L signals from the audio signals W, X, Y, Z, L3, R3, C, LFE, Hfl3, and Hfr3.

$$\begin{bmatrix} S \\ G \\ V \\ L \end{bmatrix} = M1 \times \begin{bmatrix} W \\ X \\ Y \\ Z \\ L3 \\ R3 \\ C \\ LFE \\ Hfl3 \\ Hfr3 \end{bmatrix} \qquad [\text{Eq. 7}]$$

The sound source object signal generator 1810 may generate a signal regarding a regenerated sound source object on the screen, based on the audio signals S, G, V, and L of a sound source object 3.1.2 channel layout and the sound source object information.

A remixing unit 1820 may generate remixed object audio signals (audio signals on the screen) S11 to Snm, based on the audio signals L3, R3, C, LFE, Hfl3, and Hfr3 of the 3.1.2 channel layout and the signal regarding the regenerated sound source object on the screen.

That is, the sound source object signal generator 1810 and the remixing unit 1820 may generate the audio signal on the screen, based on the sound source object information, according to Eq. 8 provided below.

$$\begin{bmatrix} S_{11} & S_{12} & S_{13} & S_{14} & \ldots & S_{1n} \\ S_{21} & S_{22} & S_{23} & S_{24} & \ldots & S_{2n} \\ S_{31} & S_{32} & S_{33} & S_{34} & \ldots & S_{3n} \\ S_{41} & S_{42} & S_{43} & S_{4} & \ldots & S_{1n} \\ \ldots \\ S_{m1} & S_{m2} & S_{m3} & S_{m4} & \ldots & S_{mn} \end{bmatrix} = \begin{bmatrix} object\_S \\ object\_G \\ object\_V \\ object\_L \end{bmatrix} \times \begin{bmatrix} S \\ G \\ V \\ L \end{bmatrix} \times \begin{bmatrix} L3 \\ R3 \\ C \\ LFE \\ Hfl3 \\ Hfr3 \end{bmatrix} \qquad [\text{Eq. 8}]$$

The audio decoding apparatus 1800 may improve a sound image of the sound source object on the screen, by remixing the signal regarding the regenerated sound source object on the screen with the reconstructed audio signal of the 3.1.2 channel layout, based on the sound source object information and the S, G, V, and L signals.

FIG. 19 is a view for describing a transmission order and a rule of an audio stream in each channel group by the audio encoding apparatuses 200 and 400 according to various embodiments of the disclosure.

In a scalable format, transmission order and rule of an audio stream in each channel group may be as described below.

The audio encoding apparatuses 200 and 400 may first transmit a coupled stream and then transmit a non-coupled stream.

The audio encoding apparatuses 200 and 400 may first transmit a coupled stream for a surround channel and then transmit a coupled stream for a height channel.

The audio encoding apparatuses 200 and 400 may first transmit a coupled stream for a front channel and then transmit a coupled stream for a side or back channel.

For non-coupled stream transmission, the audio encoding apparatuses 200 and 400 may first transmit a stream for a center channel, and then transmit a stream for the LFE channel and another channel. Herein, the other channel may exist when the base channel group includes a mono channel signal. In this case, the other channel may be one of a left channel L2 or a right channel R2 of a stereo channel.

The audio encoding apparatuses 200 and 400 may compress audio signals of coupled channels into one pair. The audio encoding apparatuses 200 and 400 may first transmit a coupled stream including the audio signals compressed into one pair. For example, the coupled channels may refer to left-right symmetric channels such as L/R, Ls/Rs, Lb/Rb, Hfl/Hfr, Hbl/Hbr channels, etc.

Hereinbelow, according to the above-described transmission order and rule of streams in each channel group, a stream configuration of each channel group in a bitstream 1910 of Case 1 is described.

Referring to FIG. 19, for example, the audio encoding apparatuses 200 and 400 may compress L1 and R1 signals that are 2-channel audio signals, and the compressed L1 and R1 signals may be included in a C1 bitstream of a base channel group (BCG).

Next to the base channel group, the audio encoding apparatuses 200 and 400 may compress a 4-channel audio signal into an audio signal of a dependent channel group #1.

The audio encoding apparatuses 200 and 400 may compress the Hfl3 signal and the Hfr3 signal, and the compressed Hfl3 signal and Hfr3 signal may be included in a C2 bitstream of bitstreams of the dependent channel group #1.

The audio encoding apparatuses 200 and 400 may compress the C signal, and the compressed C signal may be included in an M1 bitstream of the bitstreams of the dependent channel group #1.

The audio encoding apparatuses 200 and 400 may compress the LFE signal, and the compressed LFE signal may be included in an M2 bitstream of the bitstreams of the dependent channel group #1.

The audio decoding apparatuses 300 and 500 may reconstruct the audio signal of the 3.1.2 channel layout, based on compressed audio signals of the base channel group and the dependent channel group #1.

Next to a dependent channel group #2, the audio encoding apparatuses 200 and 400 may compress a 6-channel audio signal into an audio signal of the dependent channel group #2.

The audio encoding apparatuses 200 and 400 may first compress the L signal and the R signal, and the compressed L signal and R signal may be included in a C3 bitstream of bitstreams of the dependent channel group #2.

Next to the C3 bitstream, the audio encoding apparatuses 200 and 400 may compress the Ls signal and the Rs signal, and the compressed Ls and Rs signals may be included in a C4 bitstream of the bitstreams of the dependent channel group #2.

Next to a C4 bitstream, the audio encoding apparatuses 200 and 400 may compress the Hfl signal and the Hfr signal, and the compressed Hfl and Hfr signals may be included in a C5 bitstream of the bitstreams of the dependent channel group #2.

The audio decoding apparatuses 300 and 500 may reconstruct the audio signal of the 7.1.4 channel layout, based on compressed audio signals of the base channel group, the dependent channel group #1, and the dependent channel group #2.

Hereinbelow, according to the above-described transmission order and rule of streams in each channel group, a stream configuration of each channel group in a bitstream 1920 of Case 2 is described.

The audio encoding apparatuses 200 and 400 may compress the L2 signal and the R2 signal which are 2-channel audio signals, and the compressed L2 and R2 signals may be included in the C1 bitstream of the bitstreams of the base channel group.

Next to the base channel group, the audio encoding apparatuses 200 and 400 may compress a 6-channel audio signal into an audio signal of the dependent channel group #1.

The audio encoding apparatuses 200 and 400 may first compress the L signal and the R signal, and the compressed L signal and R signal may be included in the C2 bitstream of the bitstreams of the dependent channel group #1.

The audio encoding apparatuses 200 and 400 may compress the Ls signal and the Rs signal, and the compressed Ls signal and Rs signal may be included in the C3 bitstream of the bitstreams of the dependent channel group #1.

The audio encoding apparatuses 200 and 400 may compress the C signal, and the compressed C signal may be included in the M1 bitstream of the bitstreams of the dependent channel group #1.

The audio encoding apparatuses 200 and 400 may compress the LFE signal, and the compressed LFE signal may be included in the M2 bitstream of the bitstreams of the dependent channel group #1.

The audio encoding apparatuses 200 and 400 may reconstruct the audio signal of the 7.1.0 channel layout, based on the compressed audio signals of the base channel group and the dependent channel group #1.

Next to the dependent channel group #1, the audio encoding apparatuses 200 and 400 may compress the 4-channel audio signal into the audio signal of the dependent channel group #2.

The audio encoding apparatuses 200 and 400 may compress the Hfl signal and the Hfr signal, and the compressed Hfl signal and Hfr signal may be included in the C4 bitstream of the bitstreams of the dependent channel group #2.

The audio encoding apparatuses 200 and 400 may compress the Hbl signal and the Hbr signal, and the compressed Hfl signal and Hfr signal may be included in the C5 bitstream of the bitstreams of the dependent channel group #2.

The audio decoding apparatuses 300 and 500 may reconstruct the audio signal of the 7.1.4 channel layout, based on compressed audio signals of the base channel group, the dependent channel group #1, and the dependent channel group #2.

Hereinbelow, according to the above-described transmission order and rule of streams in each channel group, a stream configuration of each channel group in a bitstream 1930 of Case 3 is described.

The audio encoding apparatuses 200 and 400 may compress the L2 signal and the R2 signal which are 2-channel audio signals, and the compressed L2 and R2 signals may be included in the C1 bitstream of the bitstreams of the base channel group.

Next to the base channel group, the audio encoding apparatuses 200 and 400 may compress a 10-channel audio signal into the audio signal of the dependent channel group #1.

The audio encoding apparatuses 200 and 400 may first compress the L signal and the R signal, and the compressed L signal and R signal may be included in the C2 bitstream of the bitstreams of the dependent channel group #1.

The audio encoding apparatuses 200 and 400 may compress the Ls signal and the Rs signal, and the compressed Ls signal and Rs signal may be included in the C3 bitstream of the bitstreams of the dependent channel group #1.

The audio encoding apparatuses 200 and 400 may compress the Hfl signal and the Hfr signal, and the compressed Hfl signal and Hfr signal may be included in the C4 bitstream of the bitstreams of the dependent channel group #1.

The audio encoding apparatuses 200 and 400 may compress the Hbl signal and the Hbr signal, and the compressed Hfl signal and Hfr signal may be included in the C5 bitstream of the bitstreams of the dependent channel group #1.

The audio encoding apparatuses 200 and 400 may compress the C signal, and the compressed C signal may be included in the M1 bitstream of the bitstreams of the dependent channel group #1.

The audio encoding apparatuses 200 and 400 may compress the LFE signal, and the compressed LFE signal may be included in the M2 bitstream of the bitstreams of the dependent channel group #1.

The audio encoding apparatuses 200 and 400 may reconstruct the audio signal of the 7.1.4 channel layout, based on the compressed audio signals of the base channel group and the dependent channel group #1.

In some embodiments, the audio decoding apparatuses 300 and 500 may perform de-mixing in a stepwise manner, using at least one up-mixing unit. De-mixing may be performed based on audio signals of channels included in at least one channel group.

For example, a 1.x to 2.x up-mixing unit (first up-mixing unit) may de-mix an audio signal of a right channel from an audio signal of a mono channel that is a mixed right channel.

Alternatively or additionally, a 2.x to 3.x up-mixing unit (second up-mixing unit) may de-mix an audio signal of a center channel from audio signals of the L2 and R2 channels corresponding to a mixed center channel. Alternatively or additionally, the 2.x to 3.x up-mixing unit (second up-mixing unit) may de-mix an audio signal of an L3 channel and an audio signal of an R3 channel from audio signals of the L2 and R2 channels of the mixed L3 and R3 channels and the audio signal of the C channel.

A 3.x to 5.x up-mixing unit (third up-mixing unit) may de-mix audio signals of the Ls5 channel and the Rs5 channel from the audio signals of the L3, R3, L(5), and R(5) channels that correspond to an Ls5/Rs5 mixed channel.

A 5.x to 7.x up-mixing unit (fourth up-mixing unit) may de-mix an audio signal of a Lb channel and an audio signal of an Rb channel from audio signals of the Ls5, Ls7, and Rs7 channels that correspond to the mixed Lb/Rb channel.

An x.x.2(FH) to x.x.2(H) up-mixing unit (fourth up-mixing unit) may de-mix audio signals of the Hl channel and the Hr channel from the audio signals of the Hfl3, Hfr3, L3, L5, R3, and R5 channels that correspond to the mixed Ls/Rs channel.

An x.x.2(H) to x.x.4 up-mixing unit (fifth up-mixing unit) may de-mix audio signals of the Hbl channel and the Hbr channel from the audio signals of the Hl, Hr, Hfl, and Hfr channels that correspond to the mixed Hbl/Hbr channel.

For example, the audio decoding apparatuses 300 and 500 may perform de-mixing to the 3.2.1 channel layout using the first up-mixing unit.

The audio decoding apparatuses 300 and 500 may perform de-mixing to the 7.1.4 channel layout using the second up-mixing unit and the third mixing unit for the surround channel and the fourth up-mixing unit and the fifth up-mixing unit for the height channel.

Alternatively or additionally, the audio decoding apparatuses 300 and 500 may perform de-mixing to the 7.1.0 channel layout using the first mixing unit, the second mixing unit, and the third mixing unit. The audio decoding apparatuses 300 and 500 may not perform de-mixing to the 7.1.4 channel layout from the 7.1.0 channel layout.

Alternatively or additionally, the audio decoding apparatuses 300 and 500 may perform de-mixing to the 7.1.4 channel layout using the first mixing unit, the second mixing unit, and the third mixing unit. The audio decoding apparatuses 300 and 500 may not perform de-mixing on the height channel.

Hereinafter, rules for generating a channel group by the audio encoding apparatuses 200 and 400 is described. For a channel layout CLi (where i is an integer from 0 to n, and Cli indicates Si, Wi, and Hi) for a scalable format, Si+Wi+Hi may refer to the number of channels for a channel group #i. The number of channels for the channel group #i may be greater than the number of channels for a channel group #i−1.

The channel group #i may include as many original channels of Cli (display channels) as possible. The original channels may follow a priority described below.

When $H_{i-1}$ is 0, the priority of the height channel may be higher than those of other channels. The priorities of the center channel and the LFE channel may precede other channels.

The priority of the height front channel may precede the priorities of the side channel and the height back channel.

The priority of the side channel may precede the priority of the back channel. Moreover, the priority of the left channel may precede the priority of the right channel.

For example, when n is 4, CL0 is a stereo channel, CL1 is a 3.1.2 channel, CL2 is a 5.1.2 channel, and CL3 is a 7.1.4 channel, the channel group may be generated as described below.

The audio encoding apparatuses 200 and 400 may generate the base channel group including the A(L2) and B(R2) signals. The audio encoding apparatuses 200 and 400 may generate the dependent channel group #1 including the Q1(Hfl3), Q2(Hfr3), T(=C), and P(=LFE) signals. The audio encoding apparatuses 200 and 400 may generate the dependent channel group #2 including the S1(=L) and S2(=R) signals.

The audio encoding apparatuses 200 and 400 may generate the dependent channel group #3 including the V1(Hfl), V2(Hfr), U1(Ls), and U2(Rs) signals.

In some embodiments, the audio decoding apparatuses 300 and 500 may reconstruct the audio signal of the 7.1.4 channel from the decompressed audio signals using a down-mixing matrix. In this case, the down-mixing matrix may include, for example, a down-mixing weight parameter as in Table 3 provided below.

TABLE 3

|          | L | R | C  | LFE | Ls         | Rs         | Lb         | Rb         | Hfl | Hfr | Hbl | Hbr |
|----------|---|---|----|-----|------------|------------|------------|------------|-----|-----|-----|-----|
| A(L2/L3) | 1 |   | cw |     | $\delta*\alpha$ |            | $\delta*\beta$ |            |     |     |     |     |
| B(L2/L3) |   | 1 | cw |     |            | $\delta*\alpha$ |            | $\delta*\beta$ |     |     |     |     |
| T(C)     |   |   | 1  |     |            |            |            |            |     |     |     |     |
| P(LFE)   |   |   |    | 1   |            |            |            |            |     |     |     |     |
| Q1(Hfl3) |   |   |    |     | $w*\delta*\alpha$ |            | $w*\delta*\beta$ |            | 1   |     | Y   |     |
| Q2(Hfr3) |   |   |    |     |            | $w*\delta*\alpha$ |            | $w*\delta*\beta$ |     | 1   |     | Y   |
| S1(L)    | 1 |   |    |     |            |            |            |            |     |     |     |     |
| S2(R)    |   | 1 |    |     |            |            |            |            |     |     |     |     |
| U1(Ls7)  |   |   |    |     | 1          |            |            |            |     |     |     |     |
| U2(Rs7)  |   |   |    |     |            | 1          |            |            |     |     |     |     |
| V1(Hfl3) |   |   |    |     |            |            |            |            | 1   |     |     |     |
| V2(Hfr3) |   |   |    |     |            |            |            |            |     | 1   |     |     |

Herein, cw indicates a center weight that may be 0 when the channel layout of the base channel group is the 3.1.2 channel layout and may be 1 when the channel layout of the base channel group is the 2-channel layout. w may indicate a surround-to-height mixing weight. α, β, γ, and δ may indicate down-mixing weight parameters and may be variable. The audio encoding apparatuses 200 and 400 may generate a bitstream including down-mixing weight parameter information such as α, β, γ, δ, and w, and the audio decoding apparatuses 300 and 500 may obtain the down-mixing weight parameter information from the bitstream. On the other hand, the weight parameter information of the down-mixing matrix (or the de-mixing matrix) may be in the form of an index. For example, the weight parameter information of the down-mixing matrix (or the de-mixing matrix) may be index information indicating one down-mixing (or de-mixing) weight parameter set among a plurality of down-mixing (or de-mixing) weight parameter sets, and at least one down-mixing (or de-mixing) weight parameter corresponding to one down-mixing (or de-mixing) weight parameter set may exist in the form of a lookup table (LUT). For example, the weight parameter information of the down-mixing (or de-mixing) matrix may be information indicating one down-mixing (or de-mixing) weight parameter set among a plurality of down-mixing (or de-mixing) weight parameter sets, and at least one of α, β, γ, δ, or w may be predefined in the LUT corresponding to the one down-mixing (or de-mixing) weight parameter set. Thus, the audio decoding apparatuses 300 and 500 may obtain α, β, γ, δ, and w corresponding to one down-mixing (de-mixing) weight parameter set. A matrix for down-mixing from a first channel layout to a second channel layout may include a plurality of matrixes. For example, the matrix may include a first matrix for down-mixing from the first channel layout to a third channel layout and a second matrix for down-mixing from the third channel layout to the second channel layout. In particular, for example, a matrix for down-mixing from an audio signal of the 7.1.4 channel layout to an audio signal of the 3.1.2 channel layout may include a first matrix for down-mixing from the audio signal of the 7.1.4 channel layout to the audio signal of the 5.1.4 channel layout and a second matrix for down-mixing from the audio signal of the 5.1.4 channel layout to the audio signal of the 3.1.2 channel layout.

Tables 4 and 5 show the first matrix and the second matrix for down-mixing from the audio signal of the 7.1.4 channel layout to the audio signal of the 3.1.2 channel layout based on a content-based down-mixing parameter and a surround-to-height-based weight.

TABLE 4

| first matrix | L | R | C | Lfe | Ls | Rs | Lb | Rb |
|---|---|---|---|---|---|---|---|---|
| Ls5 | | | | | α | | β | |
| Rs5 | | | | | | α | | β |

TABLE 5

| second matrix | L | R | C | Lfe | Ls5 | Rs5 | Hfl | Hfr | Hbl | Hbr |
|---|---|---|---|---|---|---|---|---|---|---|
| L3 | 1 | 0 | 0 | 0 | Y | 0 | 0 | 0 | 0 | 0 |
| R3 | 0 | 1 | 0 | 0 | 0 | Y | 0 | 0 | 0 | 0 |
| C | 0 | 0 | 1 | 0 | 0 | 0 | 0 | 0 | 0 | 0 |
| Lfe | 0 | 0 | 0 | 1 | 0 | 0 | 0 | 0 | 0 | 0 |
| Hfl3 | 0 | 0 | 0 | 0 | Y*w | 0 | 0 | 0 | δ | 0 |
| Hfr3 | 0 | 0 | 0 | 0 | 0 | Y*w | 0 | 0 | 0 | δ |

Herein, α, β, γ, or δ indicates one of down-mixing parameters, and w indicates a surround-to-height weight. Herein, A, B, or C indicates one of down-mixing parameters, and w indicates a surround-to-height weight. For up-mixing (or de-mixing) from a 5.x channel to a 7.x channel, the de-mixing weight parameters α and β may be used. For up-mixing from an x.x.2(H) channel to an x.x.4 channel, the de-mixing weight parameter Y may be used.

For up-mixing from a 3.x channel to a 5.x channel, the de-mixing weight parameter δ may be used.

For up-mixing from an x.x.2(FH) channel to an x.x.2(H) channel, the de-mixing weight parameters w and δ may be used.

For up-mixing from a 2.x channel to a 3.x channel, a de-mixing weight parameter of −3 dB may be used. That is, the de-mixing weight parameter may be a fixed value and may not be signalled.

Further, for up-mixing to the 1.x channel and the 2.x channel, a de-mixing weight parameter of −6 dB may be used. That is, the de-mixing weight parameter may be a fixed value and may not be signalled. In some embodiments, the de-mixing weight parameter used for de-mixing may be a parameter included in one of a plurality of types. For example, the de-mixing weight parameters α, β, γ, and δ of Type 1 may be 0 dB, 0 dB, −3 dB, and −3 dB. The de-mixing weight parameters α, β, γ, and δ of Type 2 may be −3 dB, −3 dB, −3 dB, and −3 dB. The de-mixing weight parameters α, β, γ, and δ of Type 3 may be 0 dB, −1.25 dB, −1.25 dB, and −1.25 dB.

Type 1 may be a type indicating a case where an audio signal is a general audio signal, Type 2 may be a type (a dialogue type) indicating a case where a dialogue is included in an audio signal, and Type 3 may be a type (a sound effect type) indicating a case where a sound effect exists in the audio signal.

The audio encoding apparatuses 200 and 400 may analyze an audio signal and one of a plurality of types according to the analyzed audio signal. The audio encoding apparatuses 200 and 400 may perform down-mixing with respect to the original audio using a de-mixing weight parameter of the determined type to generate an audio signal of a lower channel layout.

The audio encoding apparatuses 200 and 400 may generate a bitstream including index information indicating one of the plurality of types. The audio decoding apparatuses 300 and 500 may obtain the index information from the bitstream and identify one of the plurality of types based on the obtained index information. The audio decoding apparatuses 300 and 500 may up-mix an audio signal of a decompressed channel group using a de-mixing weight parameter of the identified type to reconstruct an audio signal of a particular channel layout.

Alternatively or additionally, the audio signal generated according to down-mixing may be expressed as Eq. 9 provided below. That is, down-mixing may be performed based on an operation using an equation in the form of a first-degree polynomial, and each down-mixed audio signal may be generated.

$$Ls5 = \alpha \times Ls7 + \beta \times Lb7 \qquad [\text{Eq. 9}]$$

$$Rs5 = \alpha \times Rs7 + \beta \times Rb7$$

$$L3 = L5 + \delta \times Ls5$$

$$R3 = R5 + \delta \times Rs5$$

$$L2 = L3 + p_2 \times C$$

$$R2 = R3 + p_2 \times C$$

$$Mono = p_1 \times (L2 + R2)$$

$$Hl = Hfl + \gamma \times Hbl$$

-continued $$Hr = Hfr + \gamma \times Hbr$$

$$Hfl3 = Hl \times w' \times \delta \times Ls5$$

$$Hfr3 = Hr \times w' \times \delta \times Rs5$$

Herein, $p_1$ may be about 0.5 (e.g., −6 dB), and $p_2$ may be about 0.707 (e.g., −3 dB). α and β may be values used for down-mixing the number of surround channels from 7 channels to 5 channels. For example, α or β may be one (e.g., 0 dB), 0.866 (e.g., −1.25 dB), and 0.707 (e.g., −3 dB). γ may be a value used to down-mix the number of height channels from 4 channels to 5 channels. For example, γ may be one of 0.866 or 0.707. δ may be a value used to down-mix the number of surround channels from 5 channels to 3 channels. δ may be one of 0.866 or 0.707. w' may be a value used for down-mixing from H2 (e.g., a height channel of the 5.1.2 channel layout or the 7.1.2 channel layout) to Hf2 (the height channel of the 3.1.2 channel layout).

Likewise, an audio signal generated by de-mixing may be expressed like Eq. 10. That is, de-mixing may be performed in a stepwise manner (an operation process of each equation corresponds to one de-mixing process) based on an operation using an equation in the form of a first-degree polynomial, without being limited to an operation using a de-mixing matrix, and each de-mixed audio signal may be generated.

$$R2 = \frac{1}{p_1} \times Mono - L2 \qquad [Eq.\ 10]$$

$$L3 = L2 - p_2 \times C$$

$$R3 = R2 - p_2 \times C$$

$$Ls5 = \frac{1}{\delta} \times (L3 - L5)$$

$$Rs5 = \frac{1}{\delta} \times (R3 - R5)$$

$$Lb7 = \frac{1}{\beta} \times (Ls5 - \alpha \times Ls7)$$

$$Rb7 = \frac{1}{\beta} \times (Rs5 - \alpha \times Rs7)$$

$$Hl = Hfl3 - w' \times (L3 - L5)$$

$$Hr = Hfr3 - w' \times (R3 - R5)$$

$$Hbl = \frac{1}{\gamma} \times (Hl - Hfl)$$

$$Hbr = \frac{1}{\gamma} \times (Hr - Hfr)$$

[Eq. 10]

w' may be a value used for down-mixing from H2 (e.g., the height channel of the 5.1.2 channel layout or the 7.1.2 channel layout) to Hf2 (the height channel of the 3.1.2 channel layout) or for de-mixing from Hf2 (the height channel of the 3.1.2 channel layout) to the H2 (e.g., the height channel of the 5.1.2 channel layout or the 7.1.2 channel layout).

A value of $sum_w$ and w' corresponding thereto may be updated according to w. w may be about −1 or 1, and may be transmitted for each frame.

For example, an initial value of $sum_w$ may be 0, and when w is 1 for each frame, the value of $sum_w$ may increase by 1, and when w is −1 for each frame, the value of $sum_w$ may decrease by 1. When the value of $sum_w$ increases or decreases by 1, the value of $sum_w$ may be maintained as 0 or 10 when the value is out of a range of 0-10. Table 6 showing a relationship between w' and $sum_w$ may be as below. That is, w' may be gradually updated for each frame and thus may be used for de-mixing from Hf2 to H2.

TABLE 6

| $sum_w$ | 0 | 1 | 2 | 3 | 4 | 5 |
|---|---|---|---|---|---|---|
| w' | 0 | 0.0179 | 0.0391 | 0.0658 | 0.1038 | 0.25 |
| $sum_w$ | 6 | 7 | 8 | 9 | 10 | |
| w' | 0.3962 | w' | 0.4609 | 0.4821 | 0.5 | |

Without being limited thereto, de-mixing may be performed by integrating a plurality of de-mixing processes. For example, a signal of an Ls5 channel or an Rs5 channel de-mixed from 2 surround channels of L2 and R2 may be expressed as Eq. 11 that arranges second to fifth equations of Equation 10.

$$Ls5 = \frac{1}{\delta} \times (L2 - p_2 \times C - L5) \qquad [Eq.\ 11]$$

$$Rs5 = \frac{1}{\delta} \times (R2 - p_2 \times C - R5)$$

A signal of an Hl channel or an Hr channel de-mixed from the 2 surround channels of L2 and R2 may be expressed as Eq. 12 that arranges the second and third equations and eighth and ninth equations of Eq. 10.

$$Hl = Hfl3 - w \times (L2 - p_2 \times C - L5) \qquad [Eq.\ 12]$$

$$Hr = Hfr3 - w \times (R2 - p_2 \times C - R5)$$

Figure 23:
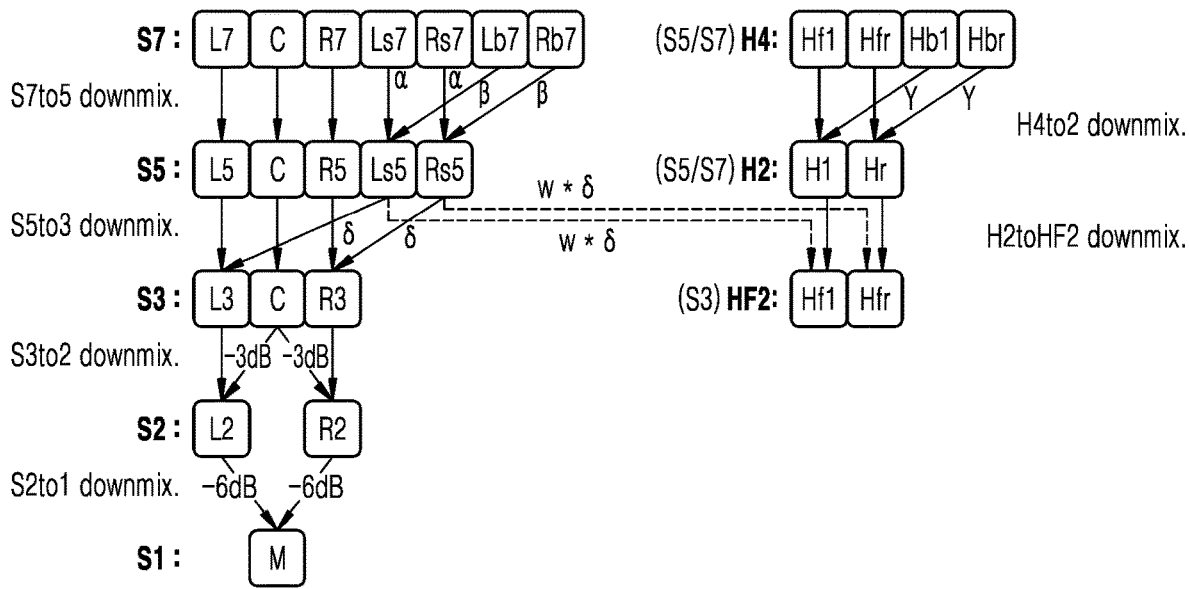
FIG. 23 illustrates a mechanism of stepwise down-mixing for the surround channel and the height channel according to various embodiments of the disclosure.
Figure 23:
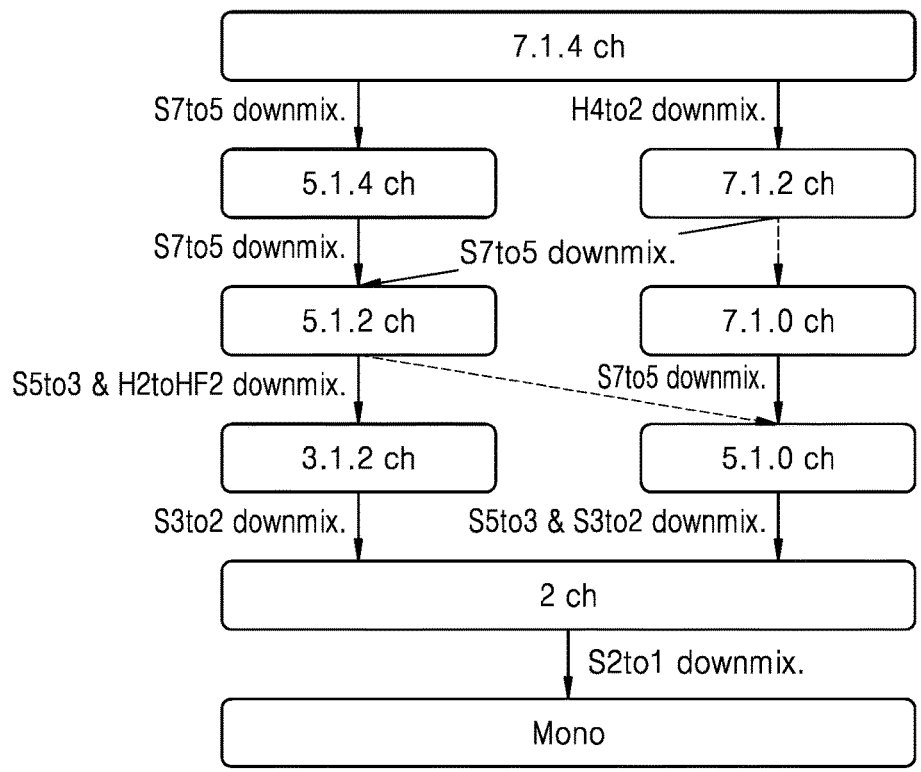

In some embodiments, stepwise down-mixing for the surround channel and the height channel may have a mechanism as in FIG. 23.

Down-mixing-related information (or de-mixing-related information) may be index information indicating one of a plurality of modes based on combinations of preset 5 down-mixing weight parameters (or de-mixing weight parameters). For example, as shown in Table 7, down-mixing weight parameters corresponding to a plurality of modes may be previously determined.

TABLE 7

| Mode | Down-mixing weight parameter (α, β, γ, δ, w) (or de-mixing weight parameter) |
|---|---|
| 1 | (1, 1, 0.707, 0.707, −1) |
| 2 | (0.707, 0.707, 0.707, 0.707, −1) |
| 3 | (1, 0.866, 0.866, 0.866, −1) |
| 4 | (1, 1, 0.707, 0.707, 1) |
| 5 | (0.707, 0.707, 0.707, 0.707, 1) |
| 6 | (1, 0.866, 0.866, 0.866, 1) |

Figure 20A:
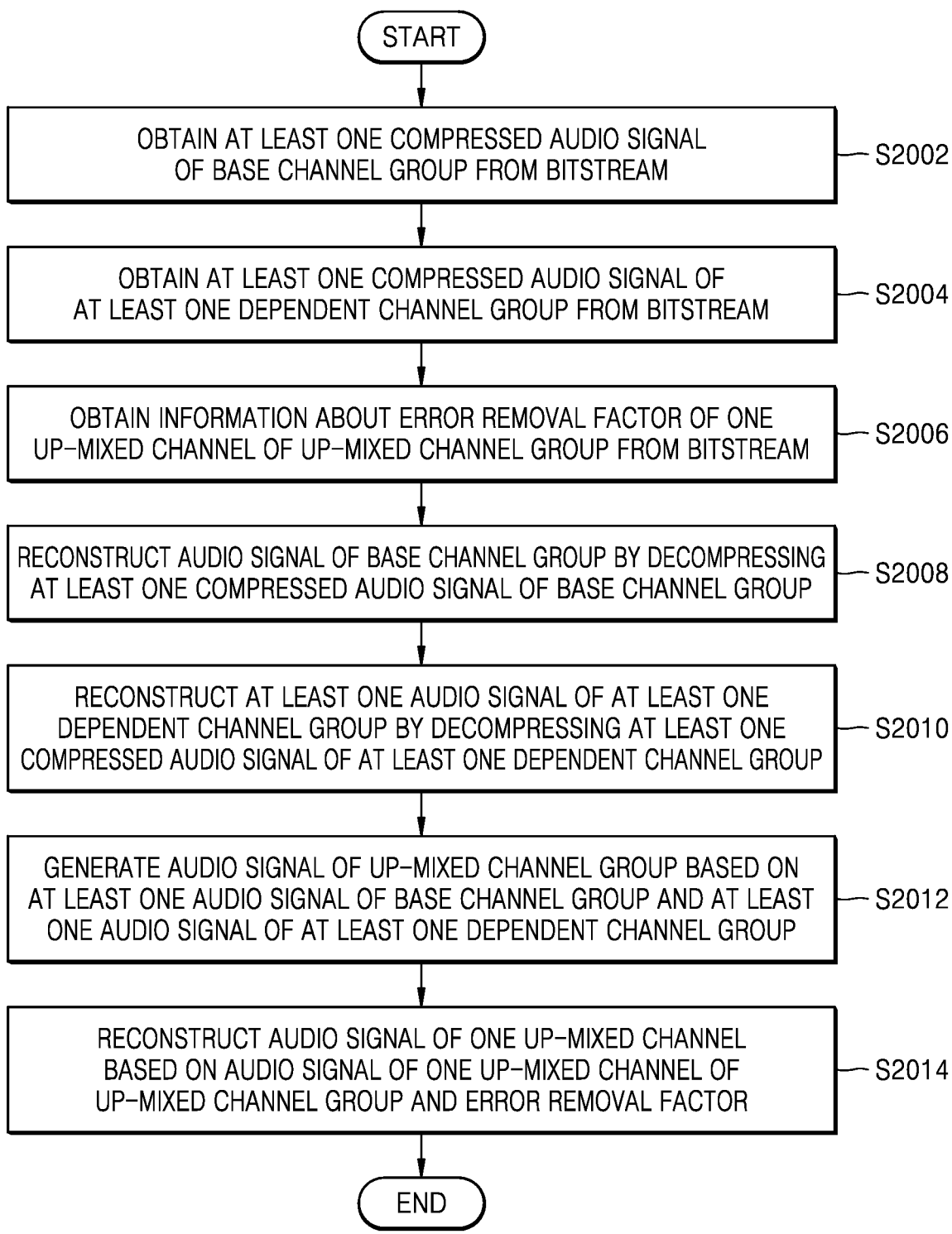
FIG. 20A is a flowchart of a first audio processing method according to various embodiments of the disclosure.

FIG. 20A is a flowchart of an audio processing method according to various embodiments of the disclosure. In operation S2002, the audio decoding apparatus 500 may obtain at least one compressed audio signal of a base channel group from a bitstream. In operation S2004, the audio decoding apparatus 500 may obtain at least one compressed audio signal of at least one dependent channel group from the bitstream.

In operation S2006, the audio decoding apparatus 500 may obtain information about an error removal factor for one up-mixed channel of an up-mixed channel group from the bitstream.

In operation S2008, the audio decoding apparatus 500 may reconstruct an audio signal of the base channel group by decompressing the at least one compressed audio signal of the base channel group.

In operation S2010, the audio decoding apparatus 500 may reconstruct at least one audio signal of at least one dependent channel group by decompressing the at least one compressed audio signal of at least one dependent channel group.

In operation S2012, the audio decoding apparatus 500 may generate an audio signal of the up-mixed channel group based on at least one audio signal of the base channel and at least one audio signal of at least one dependent channel group.

In operation S2014, the audio decoding apparatus 500 may reconstruct an audio signal of one up-mixed channel, based on the audio signal of one up-mixed channel of the up-mixed channel group and the error removal factor.

The audio decoding apparatus 500 may reconstruct a multi-channel audio signal including at least one audio signal of one up-mixed channel of the up-mixed channel group, reconstructed by application of the error removal factor, and audio signals of the other channels of the up-mixed channel group. That is, the error removal factor may not be applied to some of the audio signals of the other channels.

Figure 20B:
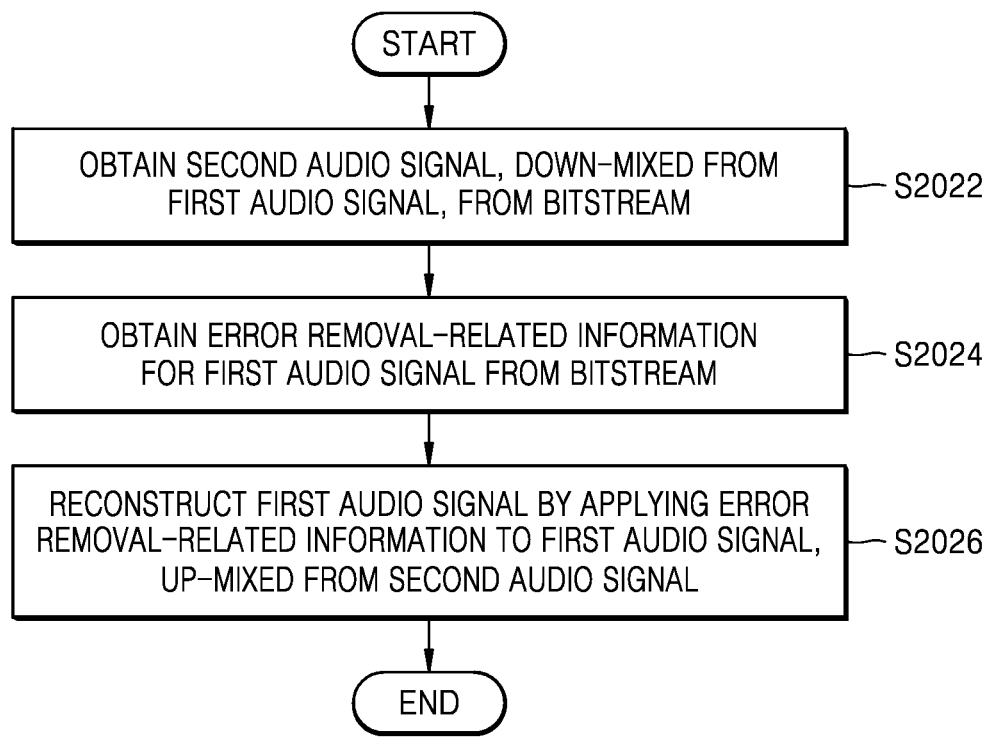
FIG. 20B is a flowchart of a second audio processing method according to various embodiments of the disclosure.

FIG. 20B is a flowchart of an audio processing method according to various embodiments of the disclosure.

In operation S2022, the audio decoding apparatus 500 may obtain a second audio signal, down-mixed from at least one first audio signal, from a bitstream.

In operation S2024, the audio decoding apparatus 500 may obtain error removal-related information for the first audio signal from the bitstream.

In operation S2026, the audio decoding apparatus 500 may reconstruct the first audio signal by applying the error removal-related information to the up-mixed first audio signal.

Figure 20C:
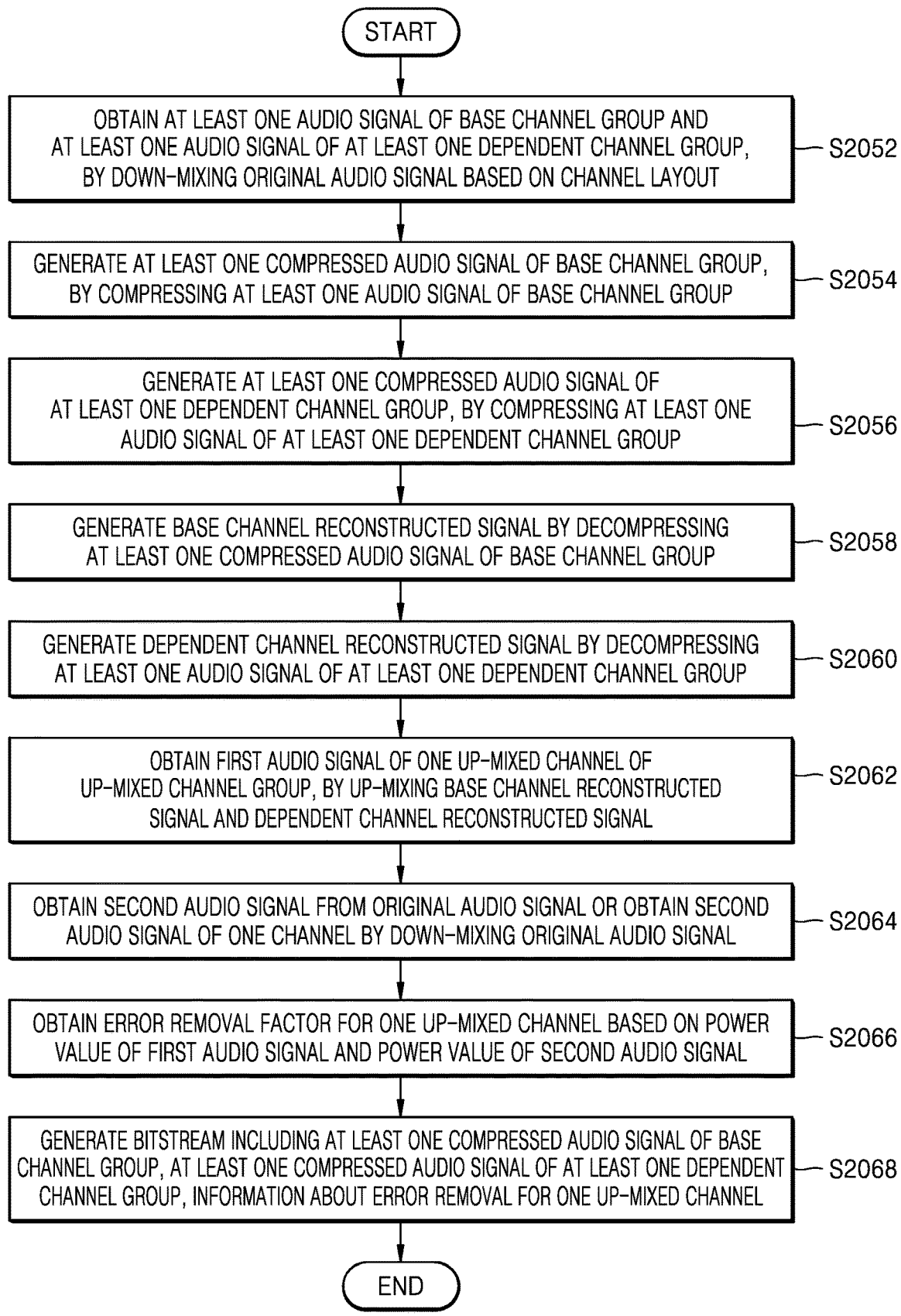
FIG. 20C is a flowchart of a third audio processing method according to various embodiments of the disclosure.

FIG. 20C is a flowchart of an audio processing method according to various embodiments of the disclosure.

In operation S2052, the audio encoding apparatus 400 may obtain at least one audio signal of a base channel group and an audio signal of at least one dependent channel group, by down-mixing the original audio signal based on a certain channel layout.

In operation S2054, the audio encoding apparatus 400 may generate at least one compressed audio signal of the base channel group by compressing at least one audio signal of the base channel group.

In operation S2056, the audio encoding apparatus 400 may generate at least one compressed audio signal of at least one dependent channel group by compressing at least one audio signal of the at least one dependent channel group.

In operation S2058, the audio encoding apparatus 400 may generate a base channel reconstructed signal by decompressing the at least one compressed audio signal of the base channel group.

In operation S2060, the audio encoding apparatus 400 may generate a dependent channel reconstructed signal by decompressing the at least one audio signal of the at least one dependent channel group.

In operation S2062, the audio encoding apparatus 400 may obtain a first audio signal of one up-mixed channel of an up-mixed channel group by up-mixing the base channel reconstructed signal and the dependent channel reconstructed signal.

In operation S2064, the audio encoding apparatus 400 may obtain a second audio signal from the original audio signal or obtain the second audio signal of one channel by down-mixing the original audio signal.

In operation S2066, the audio encoding apparatus 400 may obtain a scale factor for one up-mixed channel, based on a power value of the first audio signal and a power value of the second audio signal. Herein, the up-mixed channel of the first audio signal and the channel of the second audio signal may indicate the same channel in a certain channel layout.

In operation S2068, the audio encoding apparatus 400 may generate a bitstream including the at least one compressed audio signal of the base channel group, the at least one compressed audio signal of the at least one dependent channel group, and the error removal-related information for one up-mixed channel.

Figure 20D:
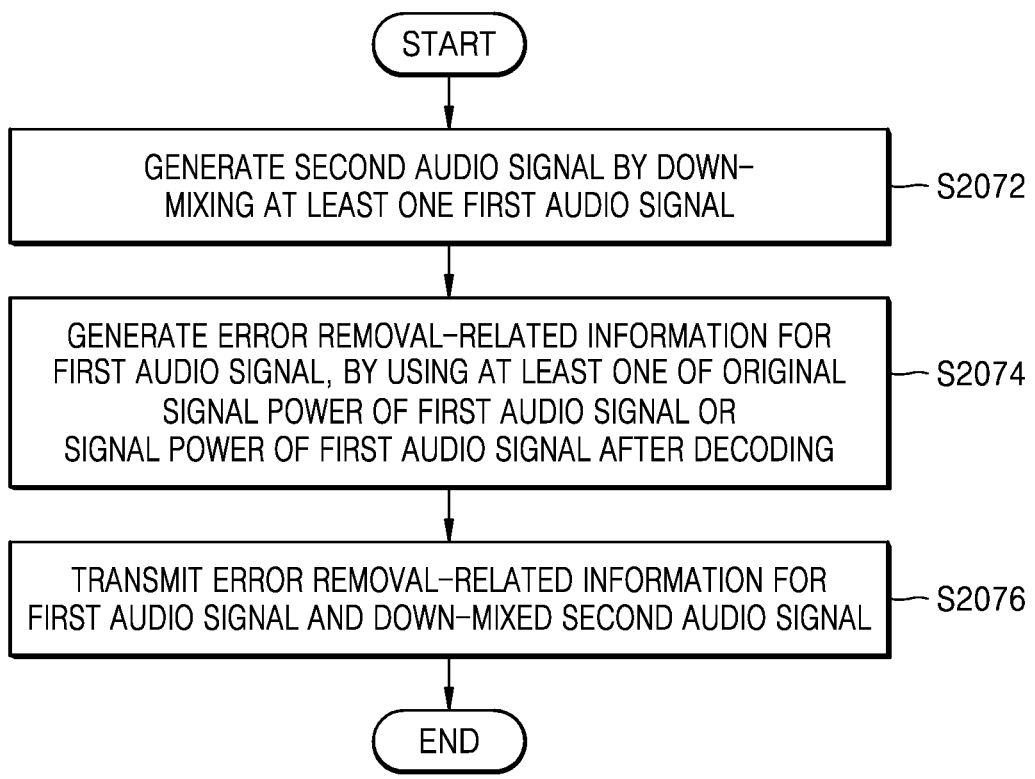
FIG. 20D is a flowchart of a fourth audio processing method according to various embodiments of the disclosure.

FIG. 20D is a flowchart of an audio processing method according to various embodiments of the disclosure.

In operation S2072, the audio encoding apparatus 400 may generate a second audio signal by down-mixing at least one first audio signal.

In operation S2074, the audio encoding apparatus 400 may generate the error removal-related information for the first audio signal using at least one of the original signal power of the second audio signal or the signal power of the first audio signal after decoding.

In operation S2076, the audio encoding apparatus 400 may transmit the error removal-related information for the first audio signal and the down-mixed second audio signal.

Figure 21:
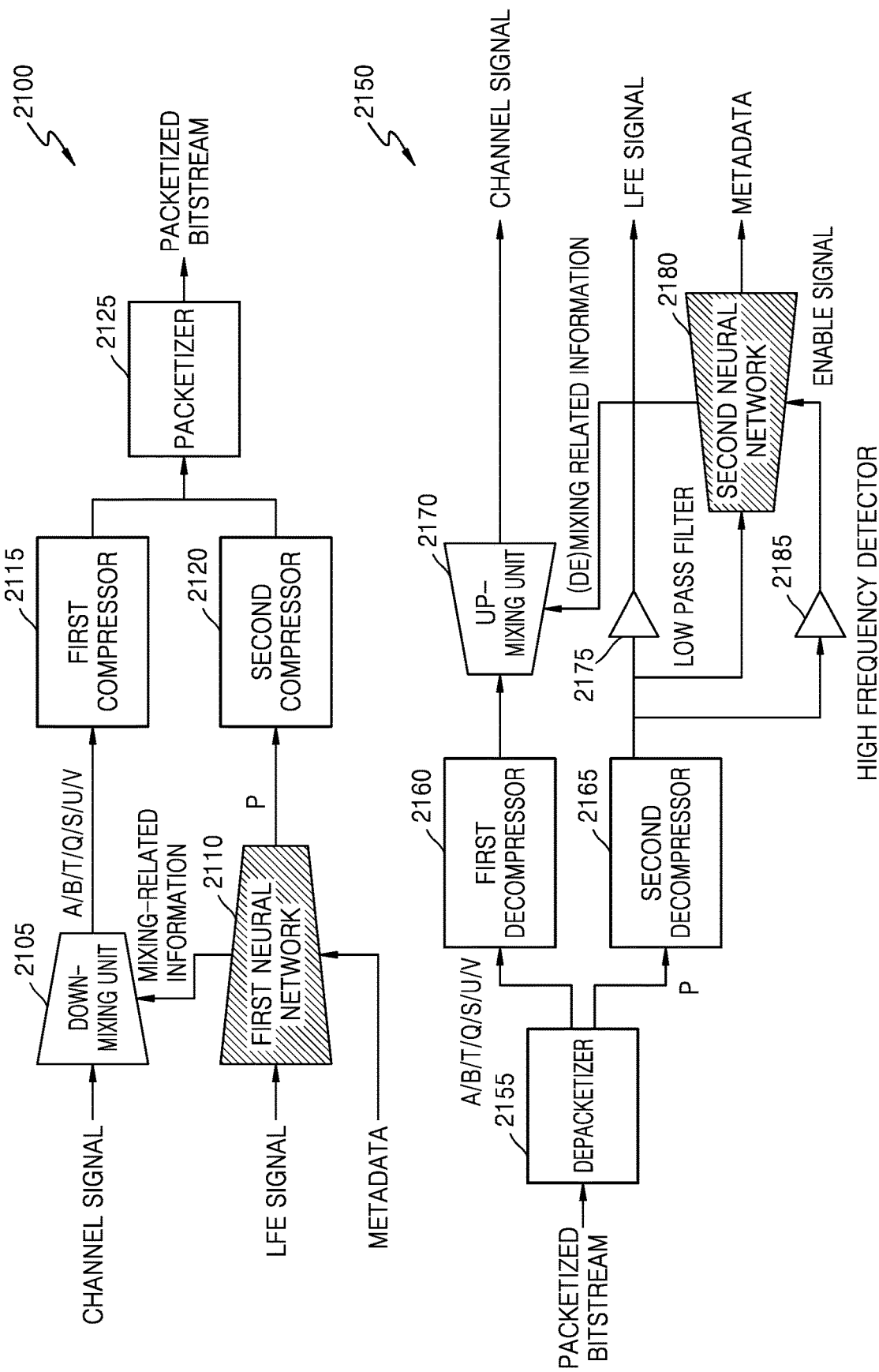
FIG. 21 is a view for describing a process of transmitting metadata through a low frequency effect (LFE) signal using a first neural network by an audio encoding apparatus and obtaining metadata from an LFE signal using a second neural network by an audio decoding apparatus, according to various embodiments of the disclosure.

FIG. 21 is a view for describing a process of transmitting metadata through an LFE signal using a first neural network by an audio encoding apparatus and obtaining metadata from an LFE signal using a second neural network by an audio decoding apparatus, according to various embodiments of the disclosure.

Referring to FIG. 21, an audio encoding apparatus 2100 may obtain A/B/T/Q/S/U/V audio signals by down-mixing channel signals L/R/C/Ls/Rs/Lb/Rb/Hfl/Hfr/Hbl/Hbr/W/X/Y/Z based on mixing-related information (down-mixing-related information) using the down-mixing unit 2105.

The audio encoding apparatus 2100 may obtain a P signal using a first neural network 2110 with an LFE signal and metadata as inputs. That is, the metadata may be included in the LFE signal using the first neural network. Herein, the metadata may include speech norm information, information about an error removal factor (e.g., a CER), on-screen object information, and mixing-related information.

The audio encoding apparatus 2100 may generate compressed A/B/T/Q/S/U/V signals using a first compressor 2115 with the A/B/T/Q/S/U/V audio signals as inputs.

The audio encoding apparatus 2100 may generate a compressed P signal using a second compressor 2115 with a P signal as an input.

The audio encoding apparatus 2100 may generate a bitstream including the compressed A/B/T/Q/S/U/V signals and the compressed P signal using a packetizer 2120. In this case, the bitstream may be packetized. The audio encoding apparatus 2100 may transmit the packetized bitstream to the audio decoding apparatus 2150.

The audio decoding apparatus 2150 may receive the packetized bitstream from the audio encoding apparatus 2100.

The audio decoding apparatus 2150 may obtain the compressed A/B/T/Q/S/U/V signals and the compressed P signal from the packetized bitstream using a depacketizer 2155.

The audio decoding apparatus 2150 may obtain A/B/T/Q/S/U/V signals from the compressed A/B/T/Q/S/U/V signals using a first decompressor 2160.

The audio decoding apparatus 2150 may obtain the P signal from the compressed P signal using a second decompressor 2165.

The audio decoding apparatus 2150 may reconstruct a channel signal from the A/B/T/Q/S/U/V signals based on (de)mixing-related information using an up-mixing unit 2170. The channel signal may be at least one of L/R/C/Ls/Rs/Lb/Rb/Hfl/Hfr/Hbl/Hbr/W/X/Y/Z signals. The (de)mixing-related information may be obtained using a second neural network 2180.

The audio decoding apparatus 2150 may obtain an LFE signal from the P signal using a low-pass filter 2175.

The audio decoding apparatus 2150 may obtain an enable signal from the P signal using a high-frequency detector 2185.

The audio decoding apparatus 2150 may determine, based on the enable signal, whether to use the second neural network 2180.

The audio decoding apparatus 2150 may obtain metadata from the P signal using the second neural network 2180 when determining to use the second neural network 2180. The metadata may include speech norm information, information about an error removal factor (e.g., a CER), on-screen object information, and (de)mixing-related information.

Parameters of the first neural network 2110 and the second neural network 2180 may be obtained through independent training, but may also be obtained through joint training, without being limited thereto. Parameter information of the first neural network 2110 and the second neural network 2180 that are pre-trained may be received from a separate training device, and the first neural network 2110 and the second neural network 2180 may be respectively set based on the parameter information.

Each of the first neural network 2110 and the second neural network 2180 may select one of a plurality of trained parameter sets. For example, the first neural network 2110 may be set based on one parameter set selected from among the plurality of trained parameter sets. The audio encoding apparatus 2100 may transmit index information indicating one parameter set selected from among a plurality of parameter sets for the first neural network 2110 to the audio decoding apparatus 2150. The audio decoding apparatus 2150 may select one parameter set among a plurality of parameter sets for the second neural network 2180, based on the index information. The parameter set selected for the second neural network 2180 by the audio decoding apparatus 2150 may correspond to the parameter set selected for the first neural network 2110 by the audio encoding apparatus 2100. The plurality of parameter sets for the first neural network and the plurality of parameter sets for the second neural network 2180 may have one-to-one correspondence, but may also have one-to-multiple or multiple-to-one correspondence without being limited thereto. In the case of one-to-multiple correspondence, additional index information may be transmitted from the audio encoding apparatus 2100. Alternatively or additionally, the audio encoding apparatus 2100 may transmit index information indicating one of the plurality of parameter sets for the second neural network 2180, in place of index information indicating one of the plurality of parameter sets for the first neural network 2110.

Figure 22A:
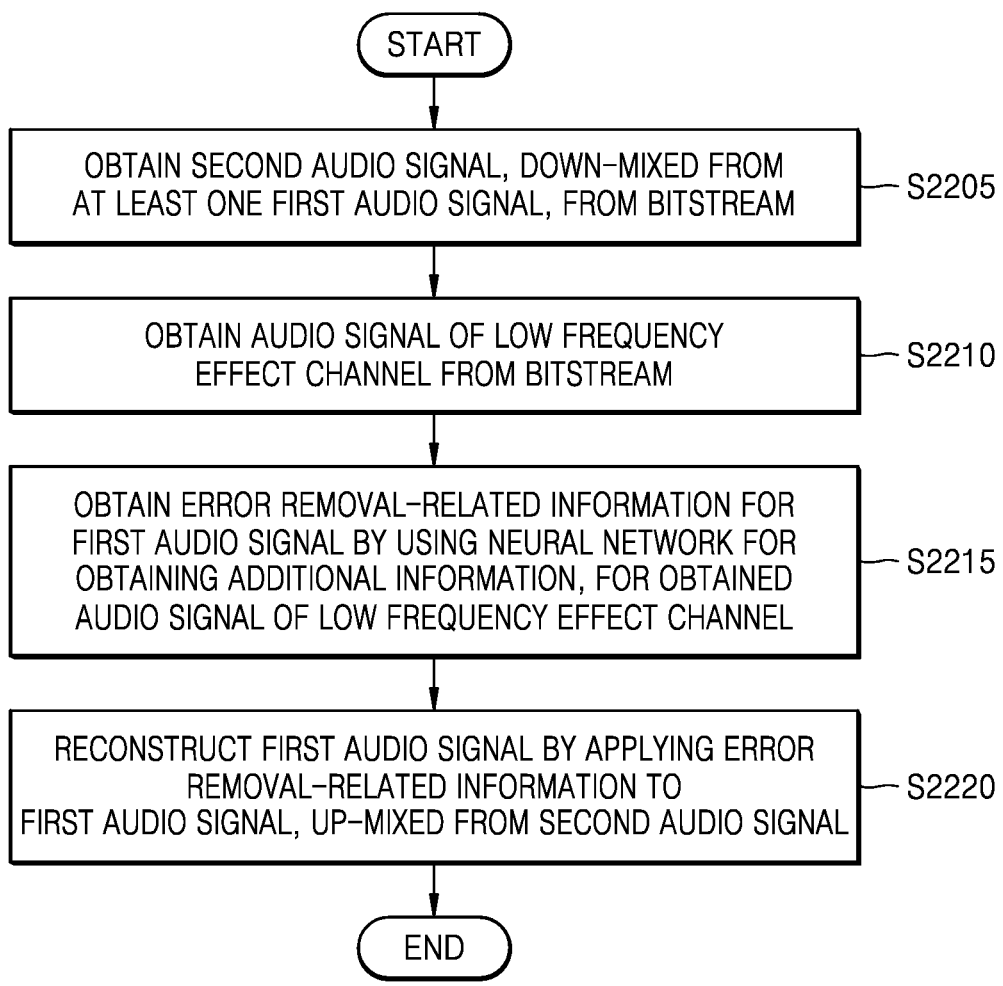
FIG. 22A is a flowchart of fifth audio processing method according to various embodiments of the disclosure.

FIG. 22A is a flowchart of an audio processing method according to various embodiments of the disclosure.

In operation S2205, the audio decoding apparatus 2150 may obtain a second audio signal, down-mixed from at least one first audio signal, from a bitstream.

In operation S2210, the audio decoding apparatus 2150 may obtain an audio signal of an LFE channel from the bitstream.

In operation S2215, the audio decoding apparatus 2150 may obtain audio information related to error removal for the first audio signal using a neural network (e.g., the second neural network 2180) for obtaining additional information, for the obtained audio signal of the LFE channel.

In operation S2220, the audio decoding apparatus 2150 may reconstruct the first audio signal by applying the error removal-related information to the first audio signal up-mixed from the second audio signal.

Figure 22B:
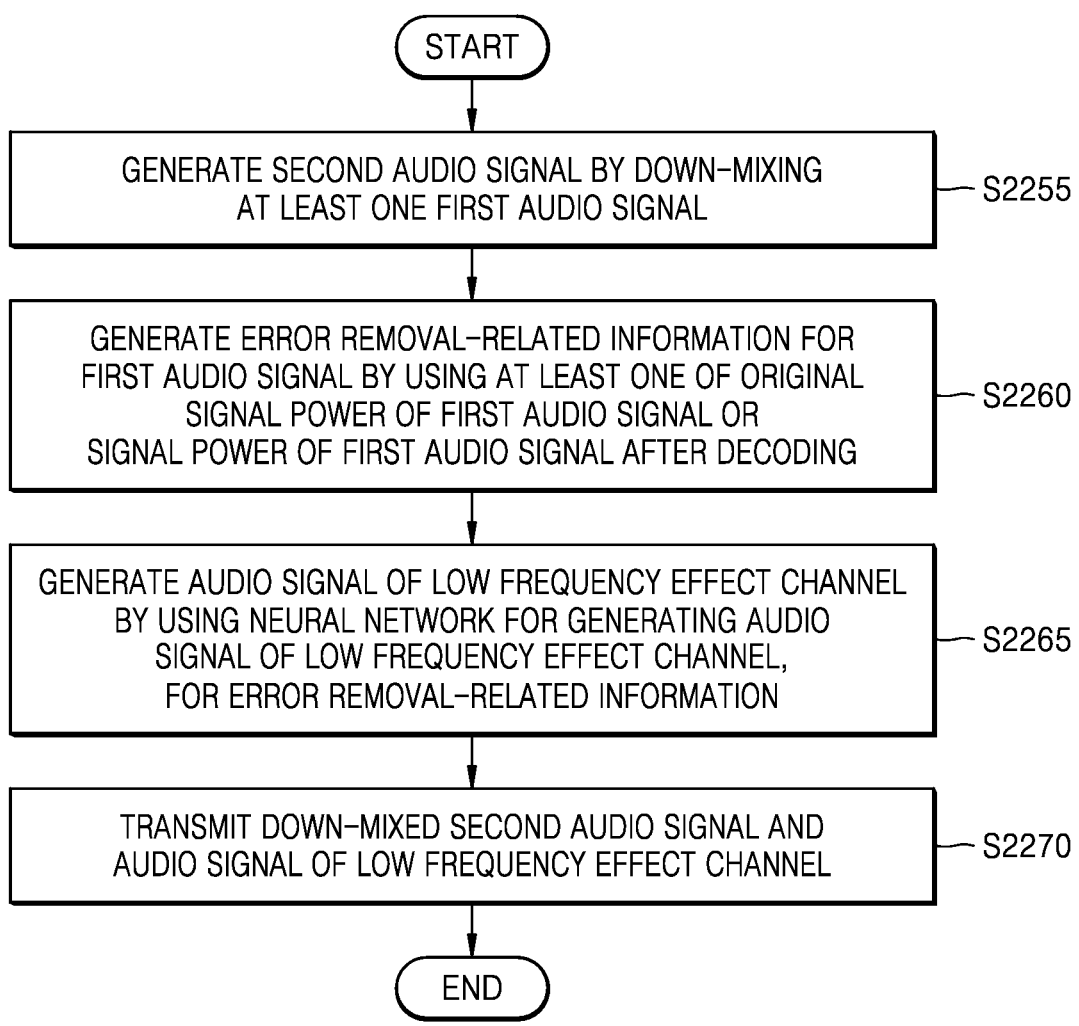
FIG. 22B is a flowchart of a sixth audio processing method according to various embodiments of the disclosure.

FIG. 22B is a flowchart of an audio processing method according to various embodiments of the disclosure.

In operation S2255, the audio encoding apparatus 2100 may generate a second audio signal by down-mixing at least one first audio signal.

In operation S2260, the audio encoding apparatus 2100 may generate error removal-related information for the first audio signal using at least one of the original signal power of the second audio signal or the signal power of the first audio signal after decoding.

In operation S2265, the audio encoding apparatus 2100 may generate an audio signal of an LFE channel using a neural network (e.g., the first neural network 2110) for generating an audio signal of the LFE channel for the error removal-related information.

In operation S2270, the audio encoding apparatus 2100 may transmit the down-mixed second audio signal and the audio signal of the LFE channel.

According to various embodiments of the disclosure, the audio encoding apparatus may generate the error removal factor based on the signal power of the audio signal, and transmit information about the error removal factor to the audio decoding apparatus. The audio decoding apparatus may reduce the energy of the masker sound in the form of noise to match the energy of the masked sound of the target sound, by applying the error removal factor to the audio signal of the up-mixed channel, based on the information about the error removal factor.

In some embodiments, the above-described embodiments of the disclosure may be written as a program or instruction executable on a computer, and the program or instruction may be stored in a storage medium.

The machine-readable storage medium may be provided in the form of a non-transitory storage medium. Wherein, the term 'non-transitory storage medium' simply means that the storage medium is a tangible device and does not include a signal (e.g., an electromagnetic wave), but this term does not differentiate between where data is semi-permanently stored in the storage medium and where the data is temporarily stored in the storage medium. For example, the 'non-transitory storage medium' may include a buffer in which data is temporarily stored.

According to various embodiments of the disclosure, the method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. When distributed online, at least a part of the computer program product (e.g., a downloadable app) may be at least temporarily stored or temporarily generated in the machine-readable storage medium, such as memory of the manufacturer's server, a server of the application store, or a relay server.

In some embodiments, the model associated with the neural network described above may be implemented as a software module. When implemented as a software module (e.g., a program module including an instruction), the neural network model may be stored on a computer-readable readable recording medium.

Alternatively or additionally, the neural network model may be integrated in the form of a hardware chip, and may be a part of the apparatus and display device described above. For example, the neural network model may be made in a dedicated hardware chip form for artificial intelligence, or as a part of a conventional universal processor (e.g., a CPU or AP) or a graphical dedicated processor (e.g., a GPU).

Alternatively or additionally, the neural network model may be provided in the form of downloadable software. The computer program product may include a product (e.g., a downloadable application) in the form of a software program electronically distributed electronically through a manufacturer or an electronic market. For the electronic distribution, at least a part of the software program may be stored in a storage medium or temporarily generated. In this case, the storage medium may be a server of the manufacturer or the electronic market, or a storage medium of a relay server.

The technical spirit of the disclosure is described in detail with reference to exemplary embodiments, but the technical spirit of the disclosure is not limited to the above embodiments, and various changes and modifications may be made to the technical spirit of the disclosure by those of ordinary skill in the art within the technical spirit of the disclosure, without being limited to the foregoing embodiments.

What is claimed is:

1. An audio processing method, comprising:
   generating a second audio signal by down-mixing at least one first audio signal;
   generating first information related to error removal for the at least one first audio signal, using at least one of an original signal power of the at least one first audio signal or a second signal power of the at least one first audio signal after decoding;
   generating an audio signal of a low frequency effect (LFE) channel for the first information related to error removal, the first information comprising at least one of speech norm information, information about an error removal factor, and on-screen object information; and
   transmitting the down-mixed second audio signal and the audio signal of the LFE channel.

2. The audio processing method of claim 1, wherein the first information related to the error removal for the at least one first audio signal comprises second information about a factor for the error removal, and
   wherein the generating of the first information related to the error removal for the at least one first audio signal comprises, when the original signal power of the at least one first audio signal is less than or equal to a first value, generating the second information about the factor for the error removal, the second information indicating that a value of the factor for the error removal is 0.

3. The audio processing method of claim 1, wherein the first information related to the error removal for the at least one first audio signal comprises second information about a factor for the error removal, and
   wherein the generating of the first information related to the error removal for the at least one first audio signal comprises, when a first ratio of the original signal power of the at least one first audio signal to an original signal power of the second audio signal is less than a second value, generating the second information about the factor for the error removal, based on the original signal power of the at least one first audio signal and the second signal power of the at least one first audio signal after decoding.

4. The audio processing method of claim 3, wherein the generating of the second information about the factor for the error removal comprises generating the second information about the factor for the error removal, the second information indicating that a value of the factor for the error removal is a second ratio of the original signal power of the at least one first audio signal to the second signal power of the at least one first audio signal after decoding.

5. The audio processing method of claim 4, wherein the generating of the second information about the factor for the error removal comprises, when the second ratio of the original signal power of the at least one first audio signal to the second signal power of the at least one first audio signal after decoding is greater than 1, generating the second information about the factor for the error removal, the second information indicating that the value of the factor for the error removal is 1.

6. The audio processing method of claim 1, wherein the first information related to the error removal for the at least one first audio signal comprises second information about a factor for the error removal, and
   wherein the generating of the first information related to the error removal for the at least one first audio signal comprises, when a ratio of the original signal power of the at least one first audio signal to the original signal power of the second audio signal is greater than or equal to a second value, generating the second information about the factor for the error removal, the second information indicating that a value of the factor for the error removal is 1.

7. The audio processing method of claim 6, wherein the generating of the second information about the factor for the error removal comprises:
   generating, for each frame of the second audio signal, the first information related to the error removal for the at least one first audio signal.

8. The audio processing method of claim 1, wherein the down-mixed second audio signal comprises a third audio signal of a base channel group and a fourth audio signal of a dependent channel group,
   wherein the fourth audio signal of the dependent channel group comprises a fifth audio signal of a first dependent channel comprising a sixth audio signal of an independent channel included in a first three-dimensional (3D) audio channel in front of a listener, and
   wherein a seventh audio signal of a second 3D audio channel on a side and a back of the listener has been obtained by mixing the fifth audio signal of the first dependent channel.

9. The audio processing method of claim 8, wherein the third audio signal of the base channel group comprises an eighth audio signal of a second channel and a ninth audio signal of a third channel,
  wherein the eighth audio signal of the second channel has been generated by mixing a tenth audio signal of a left stereo channel with a decoded audio signal of a center channel in front of the listener, and
  wherein the ninth audio signal of the third channel has been generated by mixing an eleventh audio signal of a right stereo channel with the decoded audio signal of the center channel in front of the listener.

10. The audio processing method of claim 1, wherein the down-mixed second audio signal comprises a third audio signal of a base channel group and a fourth audio signal of a dependent channel group,
  wherein the third audio signal of the base channel group comprises a fifth audio signal of a stereo channel,
  wherein the transmitting of the first information related to the error removal for the at least one first audio signal and the down-mixed second audio signal comprises:
  generating a bitstream including the first information related to the error removal for the at least one first audio signal and second information about the down-mixed second audio signal, and
  transmitting the bitstream, and
  wherein the generating of the bitstream comprises:
  generating a base channel audio stream comprising a compressed fifth audio signal of the stereo channel, and
  generating a plurality of dependent channel audio streams comprising a plurality of audio signals of a plurality of dependent channel groups, and
  wherein the plurality of dependent channel audio streams comprise a first dependent channel audio stream and a second dependent channel audio stream, and
  wherein, when for a first multi-channel audio signal used to generate the base channel audio stream and the first dependent channel audio stream, a first number of surround channels is $S_{n-1}$, a second number of subwoofer channels is $W_{n-1}$, and a third number of height channels is $H_{n-1}$, and for a second multi-channel audio signal used to generate the first dependent channel audio stream and the second dependent channel audio stream, a fourth number of surround channels is $S_n$, a fifth number of subwoofer channels is $W_n$, and a sixth number of height channels is $H_n$,
  $S_{n-1}$ is less than or equal to $S_n$, $W_{n-1}$ is less than or equal to $W_n$, and $H_{n-1}$ is less than or equal to $H_n$, but all of $S_{n-1}$, $W_{n-1}$, and $H_{n-1}$ are not equal to $S_n$, $W_n$, and $H_n$, respectively.

11. An audio processing method, comprising:
  obtaining, from a bitstream, a second audio signal down-mixed from at least one first audio signal;
  obtaining, from the bitstream, an audio signal of a low frequency effect (LFE) channel;
  obtaining first information related to error removal for the at least one first audio signal for the obtained audio signal of the LFE channel, the first information comprising at least one of speech norm information, information about an error removal factor, and on-screen object information;
  de-mixing the at least one first audio signal from the down-mixed second audio signal; and
  reconstructing the at least one first audio signal by mixing the first information related to the error removal for the at least one first audio signal to the de-mixed at least one first audio signal,
  wherein the first information related to the error removal for the at least one first audio signal has been generated using at least one of an original signal power of the at least one first audio signal or a second signal power of the at least one first audio signal after decoding.

12. The audio processing method of claim 11, wherein the first information related to the error removal for the at least one first audio signal comprises second information about a factor for the error removal, and
  wherein the factor for the error removal is greater than or equal to 0 and is less than or equal to 1.

13. The audio processing method of claim 11, wherein the reconstructing of the at least one first audio signal comprises reconstructing the at least one first audio signal to have a third signal power equal to a product of a fourth signal power of the de-mixed at least one first audio signal and a factor for the error removal.

14. The audio processing method of claim 11, wherein the bitstream comprises second information about a third audio signal of a base channel group and third information about a fourth audio signal of a dependent channel group,
  wherein the third audio signal of the base channel group has been obtained by decoding the second information about the third audio signal of the base channel group, included in the bitstream, without being de-mixed with another audio signal of another channel group, and
  wherein the audio processing method further comprises reconstructing, using the fourth audio signal of the dependent channel group, a fifth audio signal of an up-mixed channel group comprising at least one up-mixed channel through de-mixing with the third audio signal of the base channel group.

15. The audio processing method of claim 14, wherein the fourth audio signal of the dependent channel group comprises a first dependent channel audio signal and a second dependent channel audio signal,
  wherein the first dependent channel audio signal comprises a sixth audio signal of an independent channel in front of a listener, and
  wherein the second dependent channel audio signal comprises a mixed audio signal of audio signals of channels on a side and a back of the listener.

16. The audio processing method of claim 15, wherein the base channel group comprises a mono channel or a stereo channel, and
  wherein the at least one up-mixed channel is a discrete audio channel that is at least one channel except for a channel of the base channel group among a 3D audio channel in front of the listener or a 3D audio channel located omnidirectionally around the listener.

17. The audio processing method of claim 16, wherein the 3D audio channel in front of the listener is a 3.1.2 channel,
  wherein the 3.1.2 channel comprises three surround channels in front of the listener, one subwoofer channel in front of the listener, and two height channels,
  wherein the 3D audio channel located omnidirectionally around the listener comprises at least one of a 5.1.2 channel or a 7.1.4 channel,
  wherein the 5.1.2 channel comprises three surround channels in front of the listener, two surround channels on a side and a back of the listener, one subwoofer channel in front of the listener, and two height channels in front of the listener, and
  wherein the 7.1.4 channel comprises three surround channels in front of the listener, four surround channels on the side and the back of the listener, one subwoofer channel in front of the listener, two height channels in front of the listener, and two height channels on the side and the back of the listener.

18. The audio processing method of claim 14, wherein the third audio signal of the base channel group comprises sixth audio signal of a first channel and a seventh audio signal of a second channel, and
wherein the sixth audio signal of the first channel has been generated by mixing an eighth audio signal of a left stereo channel and a decoded audio signal of a center channel in front of a listener, and the seventh audio signal of the second channel has been generated by mixing a ninth audio signal of a right stereo channel and a compressed and decompressed audio signal of the center channel in front of the listener.

19. The audio processing method of claim 14, wherein the de-mixed at least one first audio signal comprises a sixth audio signal of the at least one up-mixed channel and a seventh audio signal of an independent channel, and
wherein the seventh audio signal of the independent channel comprises a first portion of the third audio signal of the base channel group and a second portion of the fourth audio signal of the dependent channel group.

20. An audio processing apparatus, comprising:
a memory storing one or more instructions; and
at least one processor communicatively coupled to the memory, and configured to execute the one or more instructions to:
obtain, from a bitstream, a second audio signal down-mixed from at least one first audio signal,
obtain, from the bitstream, an audio signal of a low frequency effect (LFE) channel,
obtain information related to error removal for the at least one first audio signal for the obtained audio signal of the LFE channel, the first information comprising at least one of speech norm information, information about an error removal factor, and on-screen object information,
de-mix the at least one first audio signal from the down-mixed second audio signal, and
reconstruct the at least one first audio signal by applying the information related to the error removal for the at least one first audio signal to the at least one first audio signal de-mixed from the second audio signal, and
wherein the information related to the error removal for the at least one first audio signal has been generated using at least one of an original signal power of the at least one first audio signal or a second signal power of the at least one first audio signal after decoding.

21. An audio processing method, comprising:
generating a second audio signal by down-mixing at least one first audio signal;
generating first information related to error removal for the at least one first audio signal, using at least one of an original signal power of the at least one first audio signal or a second signal power of the at least one first audio signal after decoding;
generating an output signal based on an audio signal of a low frequency effect (LFE) channel and the first information related to the error removal for the at least one first audio signal, the first information comprising at least one of speech norm information, information about an error removal factor, and on-screen object information; and
transmitting the output signal and the down-mixed second audio signal.

* * * * *